US011091175B2

(12) United States Patent
Grip et al.

(10) Patent No.: US 11,091,175 B2
(45) Date of Patent: Aug. 17, 2021

(54) VACUUM TRANSPORT TUBE VEHICLE, SYSTEM, AND METHOD FOR EVACUATING A VACUUM TRANSPORT TUBE

(71) Applicant: The Boeing Company, Chicago, IL (US)

(72) Inventors: Robert Erik Grip, Rancho Palos Verdes, CA (US); Mark A. DeHaan, Rancho Palos Verdes, CA (US); John C. Vassberg, Long Beach, CA (US); Ted K. Rothaupt, Lancaster, CA (US)

(73) Assignee: The Boeing Company, Chicago, IL (US)

( * ) Notice: Subject to any disclaimer, the term of this patent is extended or adjusted under 35 U.S.C. 154(b) by 25 days.

(21) Appl. No.: 16/719,919

(22) Filed: Dec. 18, 2019

(65) Prior Publication Data

US 2020/0122748 A1 Apr. 23, 2020

Related U.S. Application Data

(63) Continuation-in-part of application No. 15/476,399, filed on Mar. 31, 2017, now Pat. No. 10,538,254.

(51) Int. Cl.
*B61B 13/10* (2006.01)
*B61B 13/08* (2006.01)
(Continued)

(52) U.S. Cl.
CPC .............. *B61B 13/08* (2013.01); *B60L 13/04* (2013.01); *B60L 13/10* (2013.01); *B60L 2200/26* (2013.01);
(Continued)

(58) Field of Classification Search
CPC ......... B61B 13/08; B61B 13/10; B61B 13/12; B61B 13/122; B60L 13/04; B60L 13/10;
(Continued)

(56) References Cited

U.S. PATENT DOCUMENTS 3,525,111 A * 8/1970 Von Arx ................... B05C 7/08
15/104.061
3,565,011 A 2/1971 Edwards
(Continued)

FOREIGN PATENT DOCUMENTS

CN 105292135 2/2016
CN 105292135 A 2/2016
(Continued)

OTHER PUBLICATIONS

Wikipedia Article on Hyperloop, 13 web pages, from website web address at https://en.wikipedia.org/wiki/Hyperloop, as of Mar. 31, 2017.
(Continued)

*Primary Examiner* — Mark T Le

(57) ABSTRACT

A vacuum transport tube vehicle for evacuating a vacuum transport tube has a first end, a second end, and a body comprising a piston head. The vehicle has a blade-actuator assembly, comprising a circumferential blade member sealed to the piston head and having a blade perimeter portion defining a first end outer surface forming an annular gap with an inner surface of the vacuum transport tube. The vehicle further includes a plurality of blade segment actuators arranged circumferentially around the piston perimeter portion and configured to actively adjust a radial position of the blade member at the corresponding blade circumferential locations in a manner accommodating non-uniformities in an inner surface profile of the vacuum transport tube, and maintaining the annular gap at a substantially constant and relatively short gap distance during movement of the vehicle through the vacuum transport tube.

27 Claims, 39 Drawing Sheets

(51) Int. Cl.
*B60L 13/04* (2006.01)
*F04B 25/00* (2006.01)
*B60L 13/10* (2006.01)

(52) U.S. Cl.
CPC ........... *B60L 2240/12* (2013.01); *B61B 13/10* (2013.01); *B61L 2210/04* (2013.01); *F04B 25/005* (2013.01)

(58) Field of Classification Search
CPC .............. B60L 15/005; B60L 2200/26; B60L 2240/12; B61C 11/06; B65G 51/04; B65G 51/08; B65G 54/025; B61D 17/02; F04B 25/005; F04B 49/065; F04B 43/02; B61L 2210/04
See application file for complete search history.

(56) References Cited

U.S. PATENT DOCUMENTS

| | | | | |
|---|---|---|---|---|
| 3,734,428 A * | 5/1973 | Alexandrov | ........... | B65G 51/06 406/185 |
| 4,042,190 A * | 8/1977 | Ueno | ........... | B65G 51/06 406/185 |
| 5,653,175 A | 8/1997 | Milligan | | |
| 5,950,543 A * | 9/1999 | Oster | ........... | B61B 13/10 104/138.1 |
| 6,418,857 B1 | 7/2002 | Okano | | |
| 8,261,669 B2 * | 9/2012 | Grundlingh | ........... | E21F 13/061 104/138.2 |
| 8,950,338 B2 * | 2/2015 | Early | ........... | F16L 55/34 104/138.2 |
| 2004/0244635 A1 | 12/2004 | Schlienger | | |
| 2011/0283914 A1 | 11/2011 | Kwon et al. | | |
| 2013/0276665 A1 | 10/2013 | Dalrymple | | |
| 2014/0261054 A1 | 9/2014 | Oster | | |
| 2018/0281820 A1 | 10/2018 | Grip et al. | | |

FOREIGN PATENT DOCUMENTS

| | | |
|---|---|---|
| CN | 107161160 A | 9/2017 |
| WO | 2014177914 A1 | 11/2014 |
| WO | 2018233430 A1 | 12/2018 |

OTHER PUBLICATIONS

Wikipedia Article on Maglev, 27 web pages, from website web address at https://en.wikipedia.org/wiki/Maglev, as of Mar. 31, 2017.

Extended European Search Report (EESR), European Patent Office, dated May 21, 2021, for corresponding EP Application No. EP20213127.2, Applicant The Boeing Company, 4 pages.

* cited by examiner

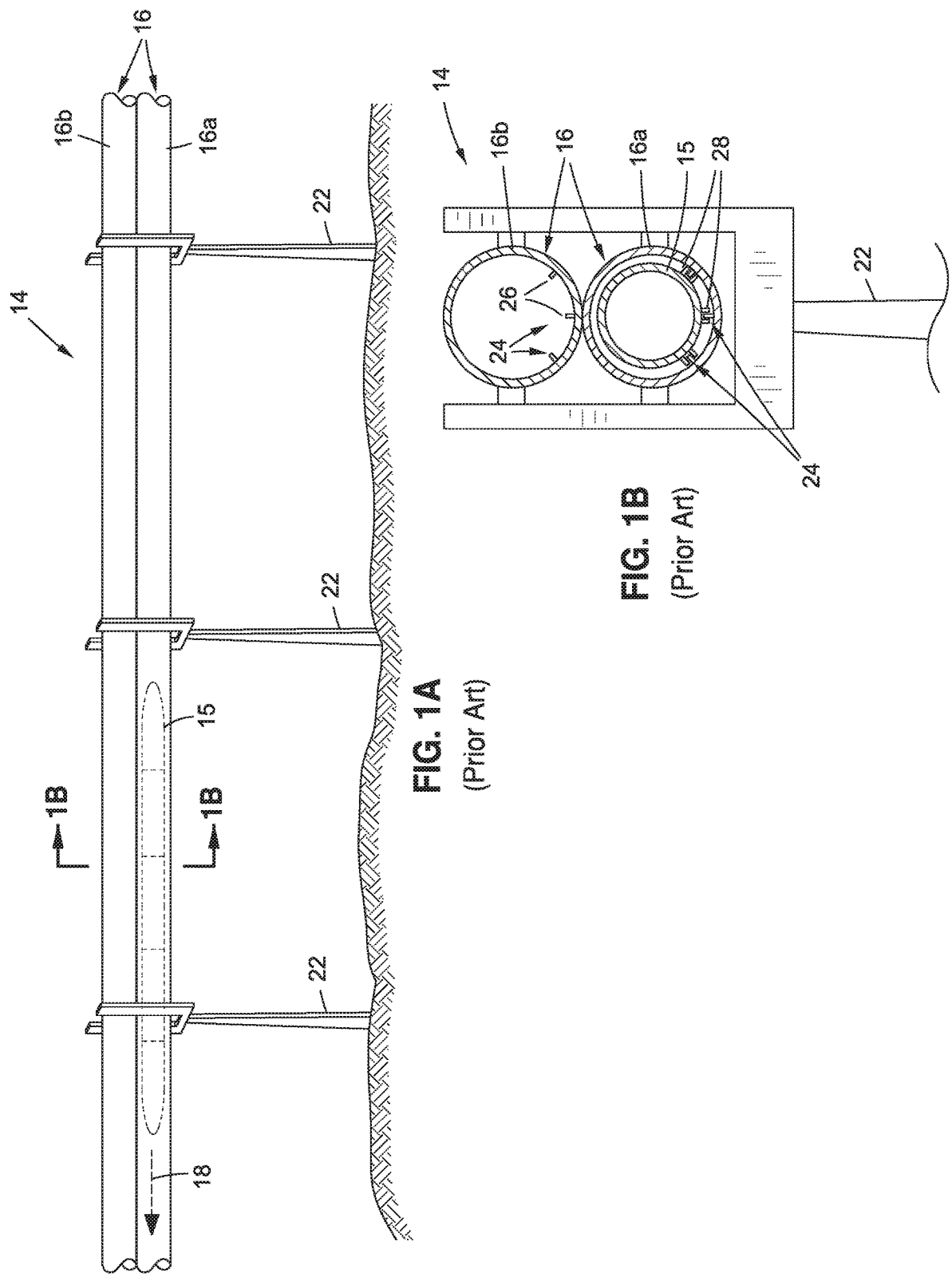

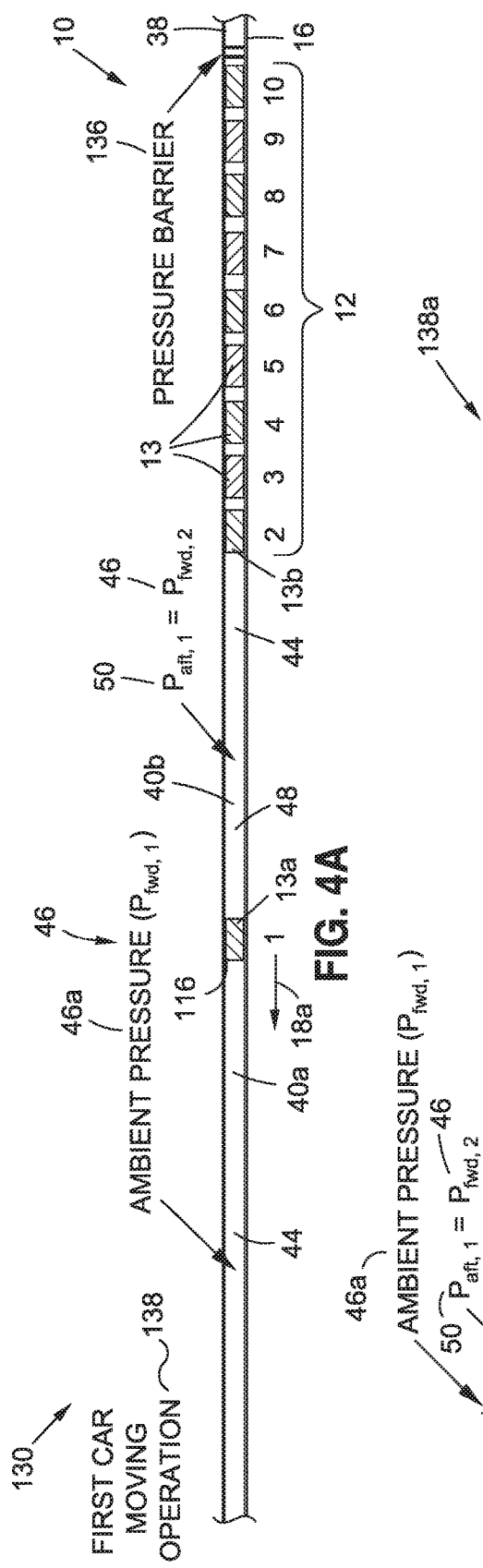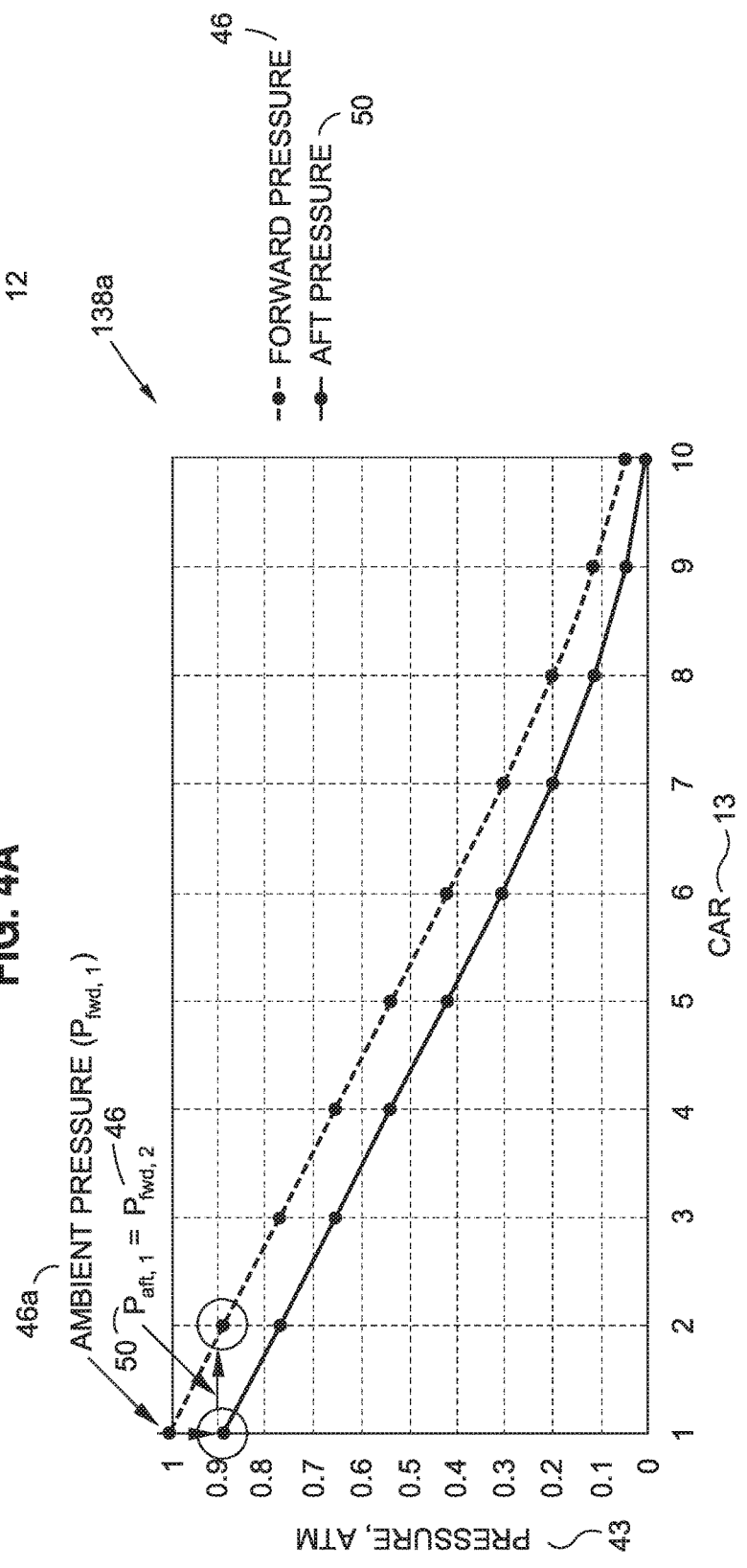
FIG. 4A
FIG. 4B

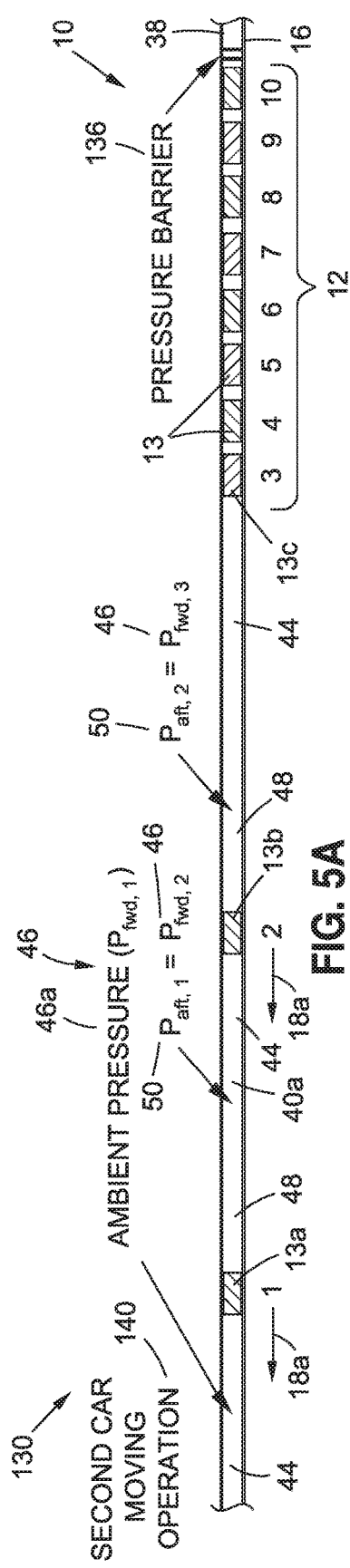
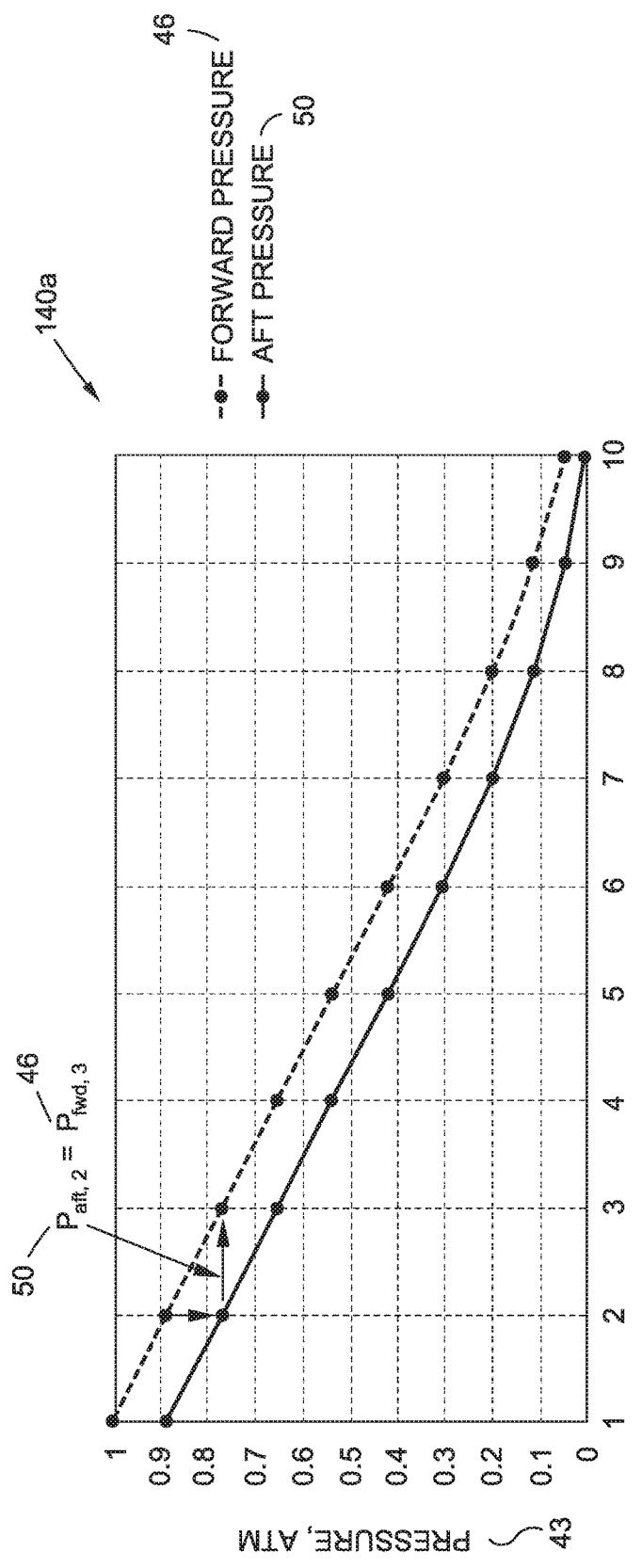
FIG. 5A
FIG. 5B

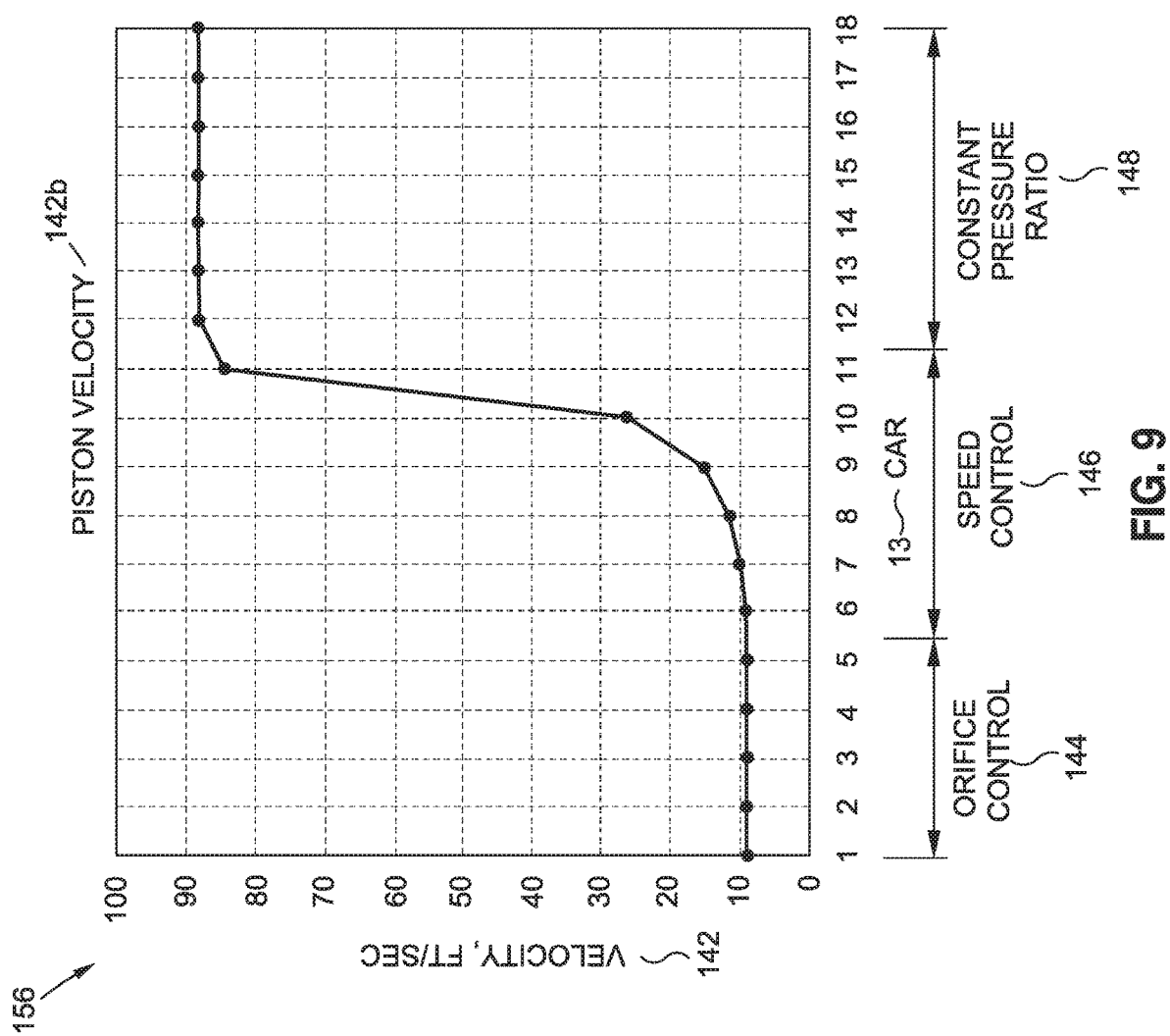

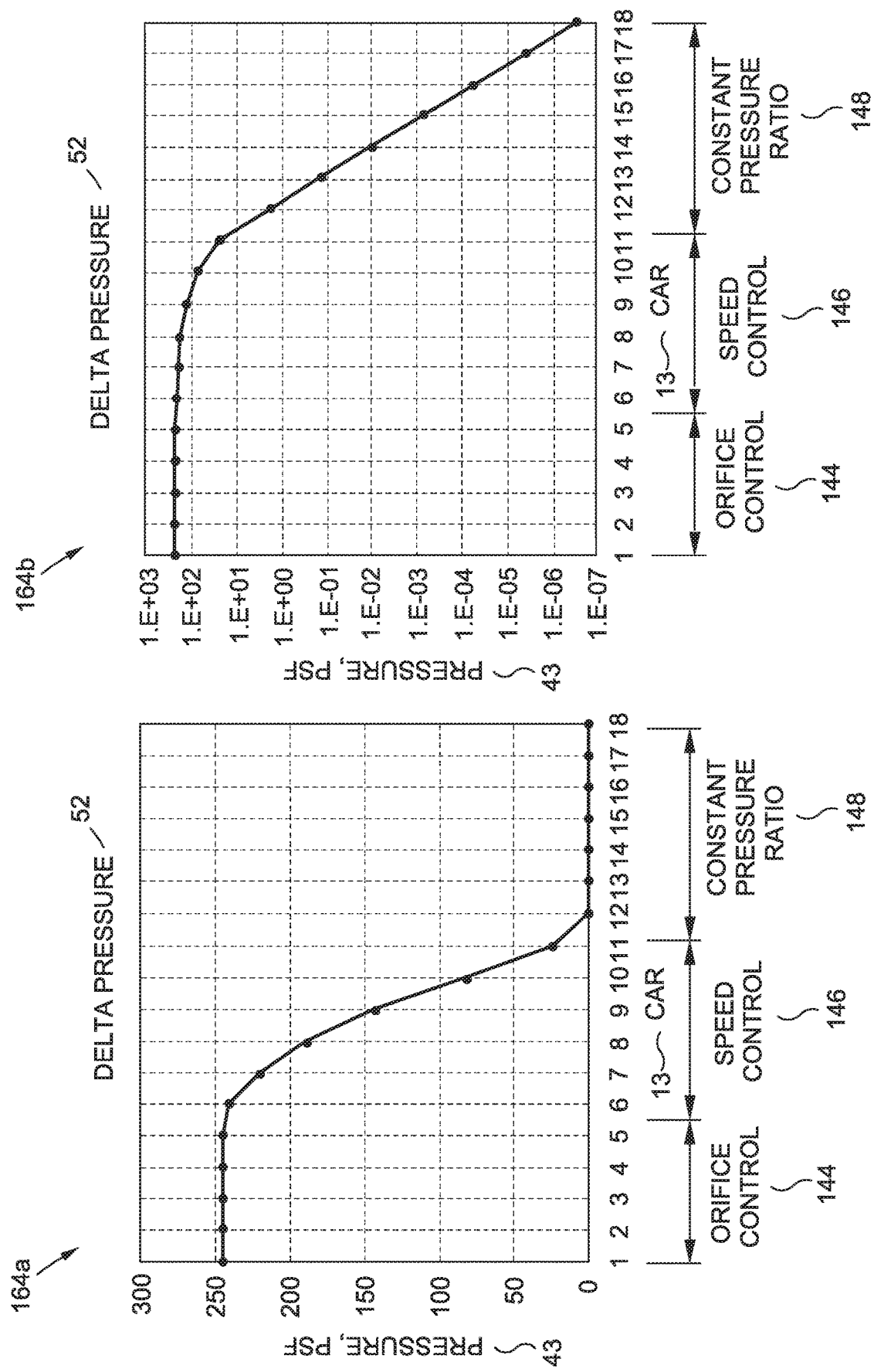

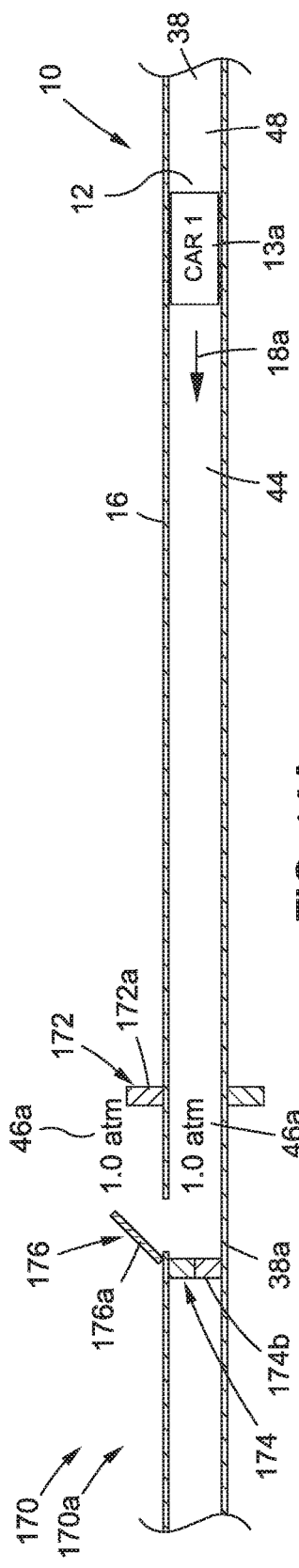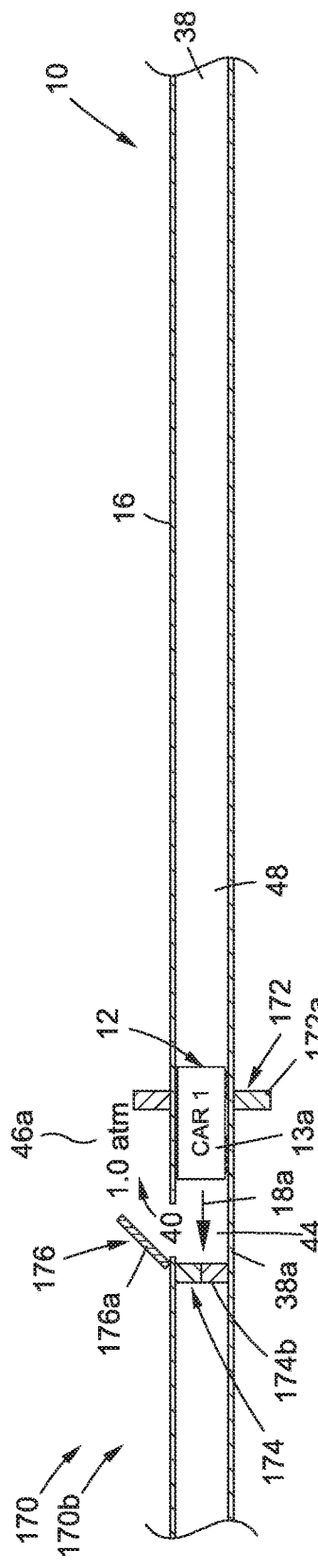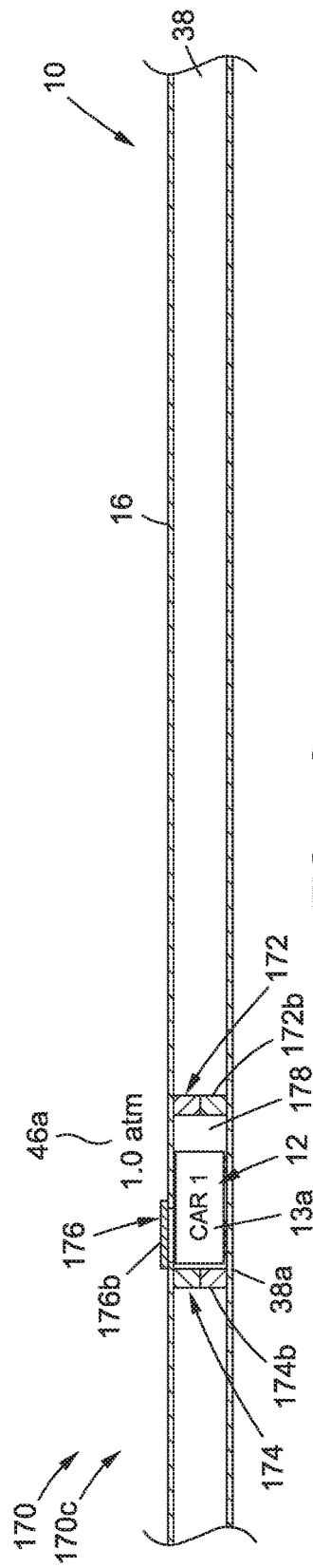

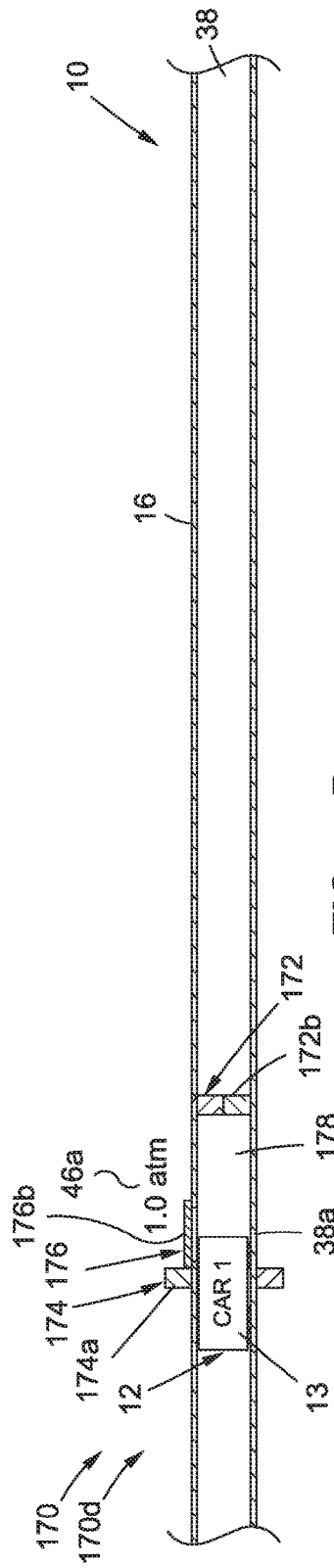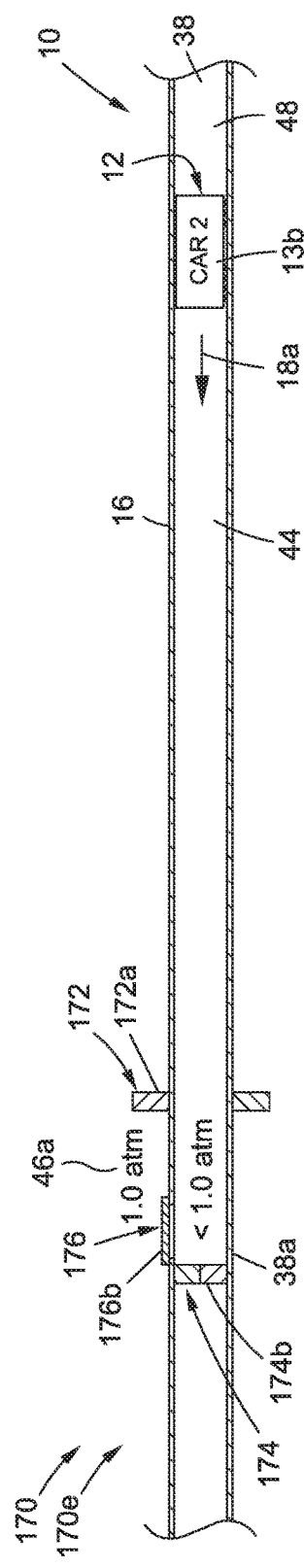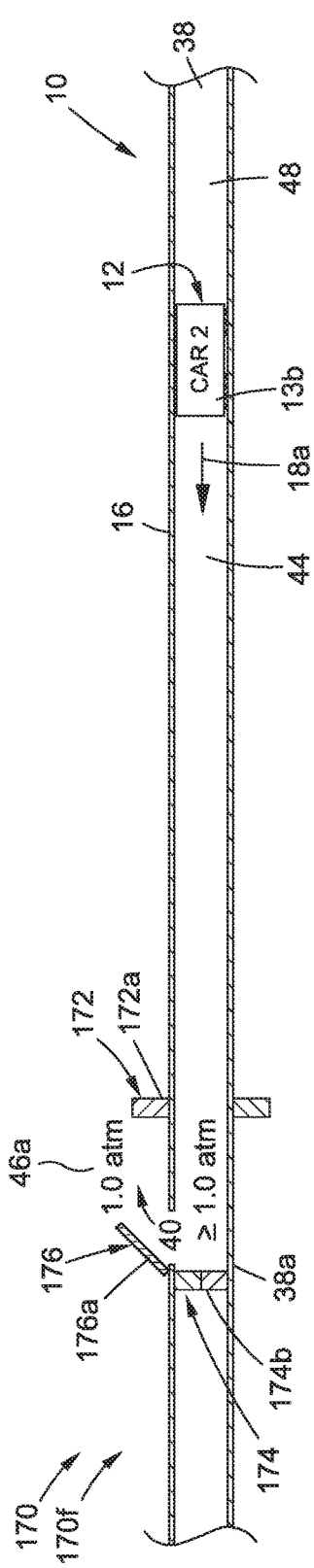

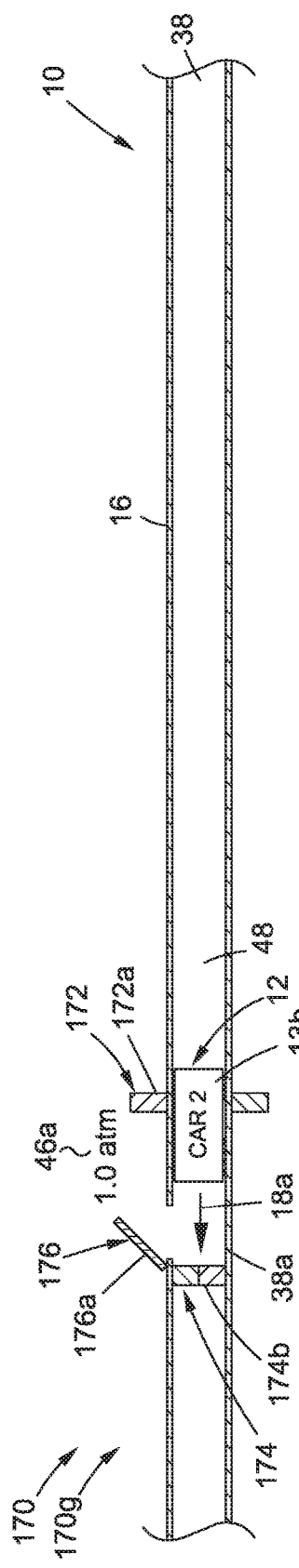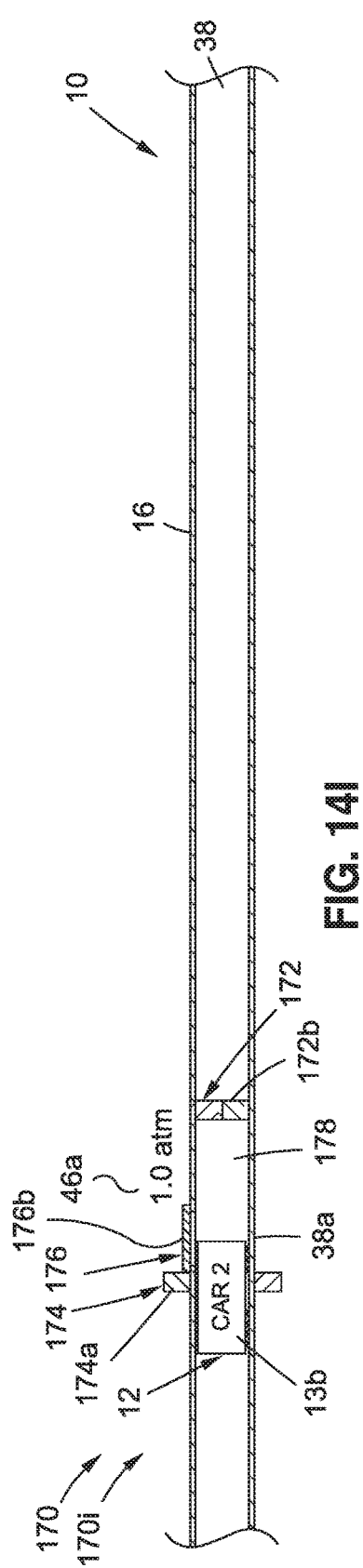

VACUUM TRANSPORT TUBE VEHICLE SYSTEM 10

VACUUM TRANSPORT TUBE(S) 16

| INTERIOR 32a | EXTERIOR 32b | INNER SURFACE 34a | OUTER SURFACE 34b |
|---|---|---|---|
| CYLINDRICAL BODY 30 | VACUUM TRANSPORT TUBE INNER DIAMETER 31 | | PERIMETER 35 |
| ROUTE LENGTH 36 | VACUUM TRANSPORT TUBE ROUTE 38 | | ROUTE END 38a |

VACUUM TRANSPORT TUBE VEHICLE(S) 12

| CAR(S) 13 | VEHICLE PASS(ES) 53 | CONTROL SYSTEM 115 | CONTROLLER(S) 115a |
|---|---|---|---|
| FIRST END 54 | PISTON HEAD 54a | FIRST END OUTER DIAMETER 56 | LENGTH 56a |
| FIRST END OUTER SURFACE 58 | FORWARD SURFACE 60 | AFT SURFACE 61 | SIDE PROFILE 62 |

| FLAT FORWARD SURFACE 60a | FLAT SIDE PROFILE 62a |
|---|---|
| CURVED FORWARD SURFACE 60b | CURVED SIDE PROFILE 62b |
| CONVEX FORWARD SURFACE 60c | CONVEX SIDE PROFILE 62c |
| CONCAVE FORWARD SURFACE 60d | CONCAVE SIDE PROFILE 62d |

| ANNULAR GAP 116 | GAP DISTANCE 118 | GAP AREA 120 | GAP FLOW SPEED 122 | INTERFACE 192 |
|---|---|---|---|---|
| BODY 70 | PISTON 70a | STRUCTURAL FRAMEWORK 72 | ORIFICE 84 | PASSAGEWAY 84a |
| SECOND END 66 | SEC. END OUTER DIAMETER 68 | LENGTH 68a | SEC. END OUTER SURFACE 69 | |
| DRIVE ASSEMBLY 100 | DRIVE WHEELS 102 | MAG-LEV PROPULSION SYS. 24 | POWER SYS. 110 | |
| AIR 40 | EVACUATION 41 | INITIAL EVACUATION 41a | VACUUM 42 | NEAR VACUUM 42a |
| PRESSURE 43 | DESIRED PRESSURE 43a | AIR PRESSURE 43b | ATM. PRESSURE 43c | |
| FORWARD PRESSURE 46 | AMBIENT PRESSURE 46a | AFT PRESSURE 50 | DELTA PRESSURE 52 | |
| VELOCITY 142 | SPEED 94 | MIN. SPEED 94a | MAX. SPEED 94b | FORWARD SPEED 94c |
| POWER 96 | MAX. POWER 96a | MIN. POWER 96b | POWER REQUIRED 96c | FORCE 126 |
| GAP VOLUME 119 | PISTON VOLUME 124 | ORIFICE VOLUME 128 | TOTAL FLOW VOLUME 129 | |
| PUMP ELIMINATION 186 | SEAL ELIMINATION 188 | CLOSE TOLERANCE MFG ELIMINATION 190 | | |

| PRESSURE BARRIER(S) 136 | ROUTE END BOUNDARY ASSEMBLY 170 |
|---|---|
| MULTI-STAGE VEHICLE ARRANGEMENT 180 | CONNECTOR ELEMENT(S) 182 |

FIG. 16

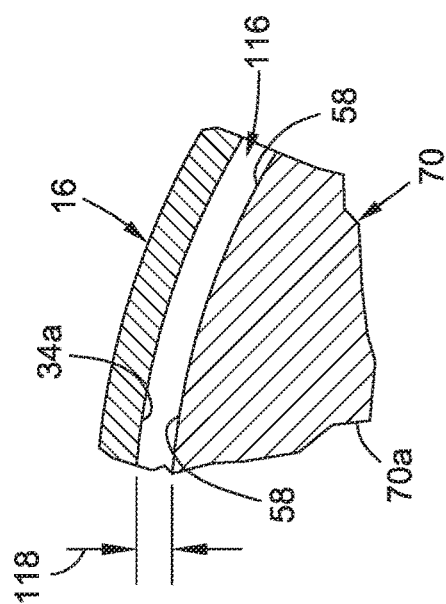
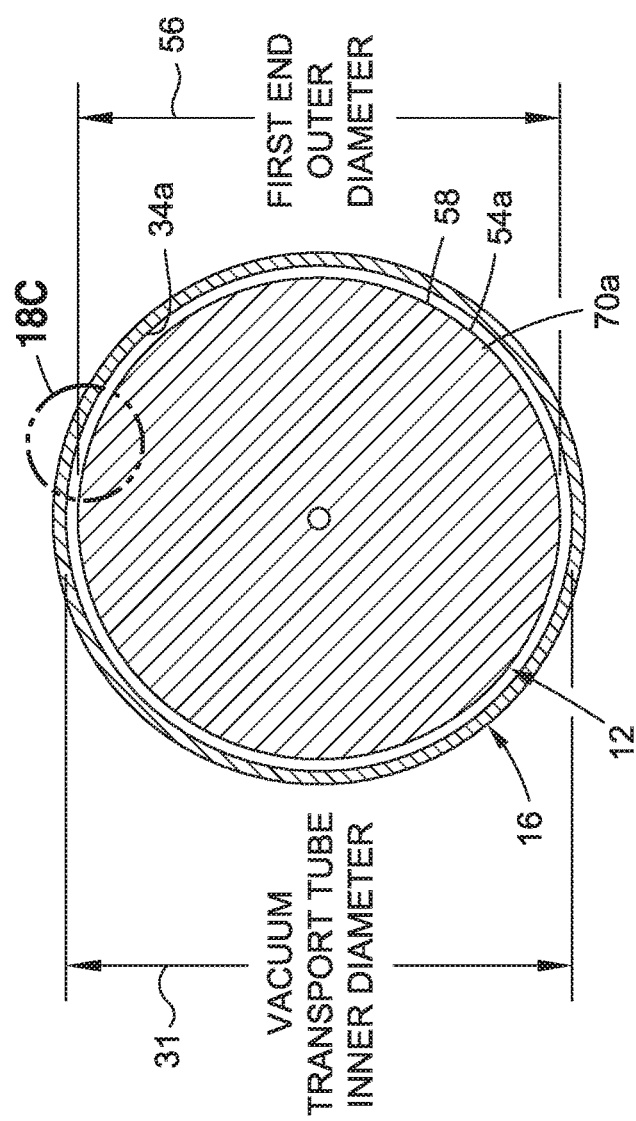
FIG. 18C
FIG. 18B

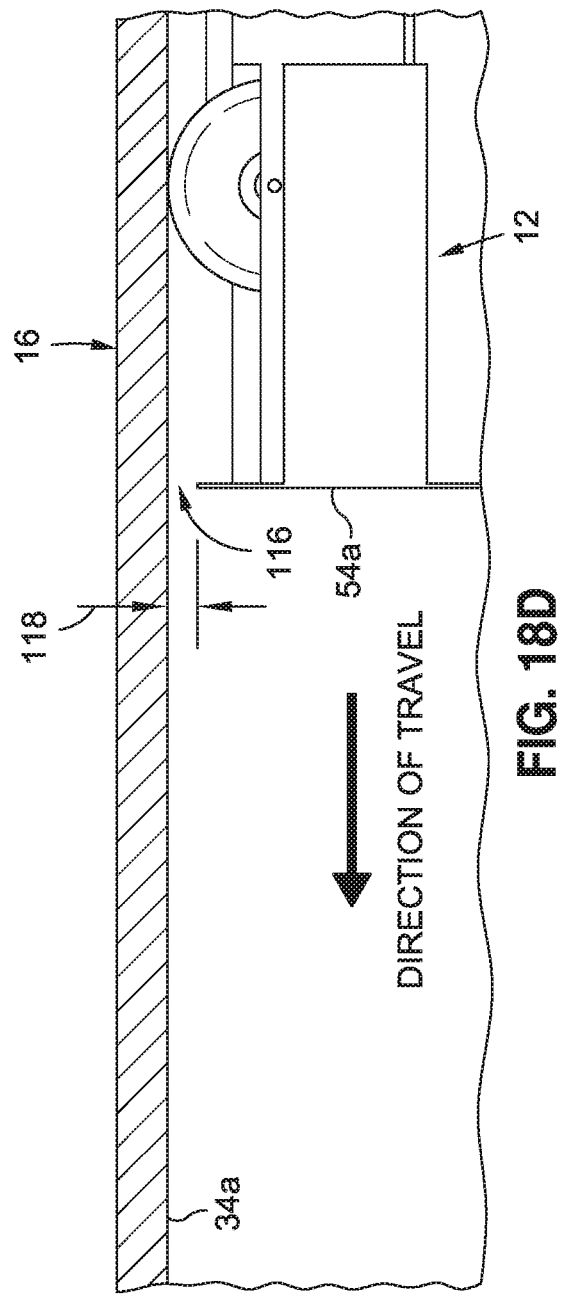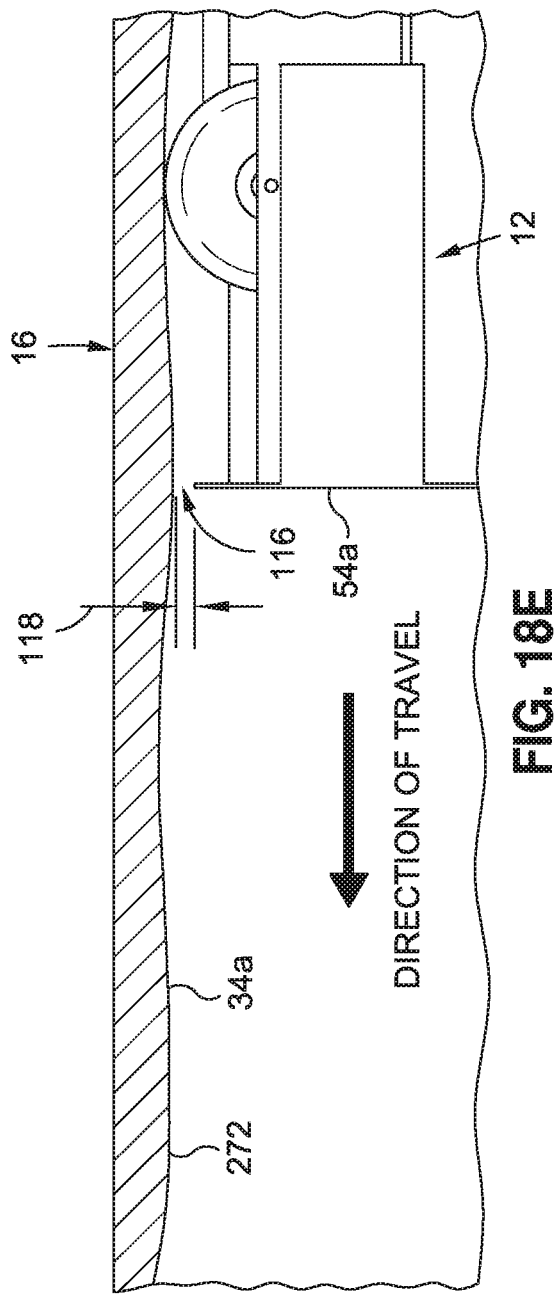

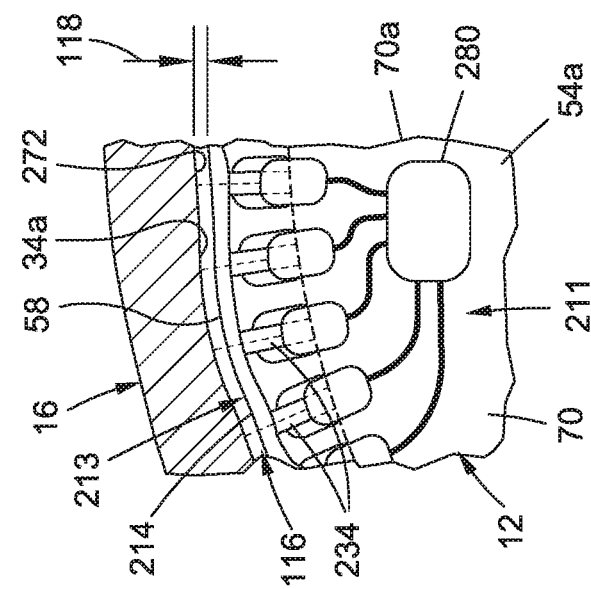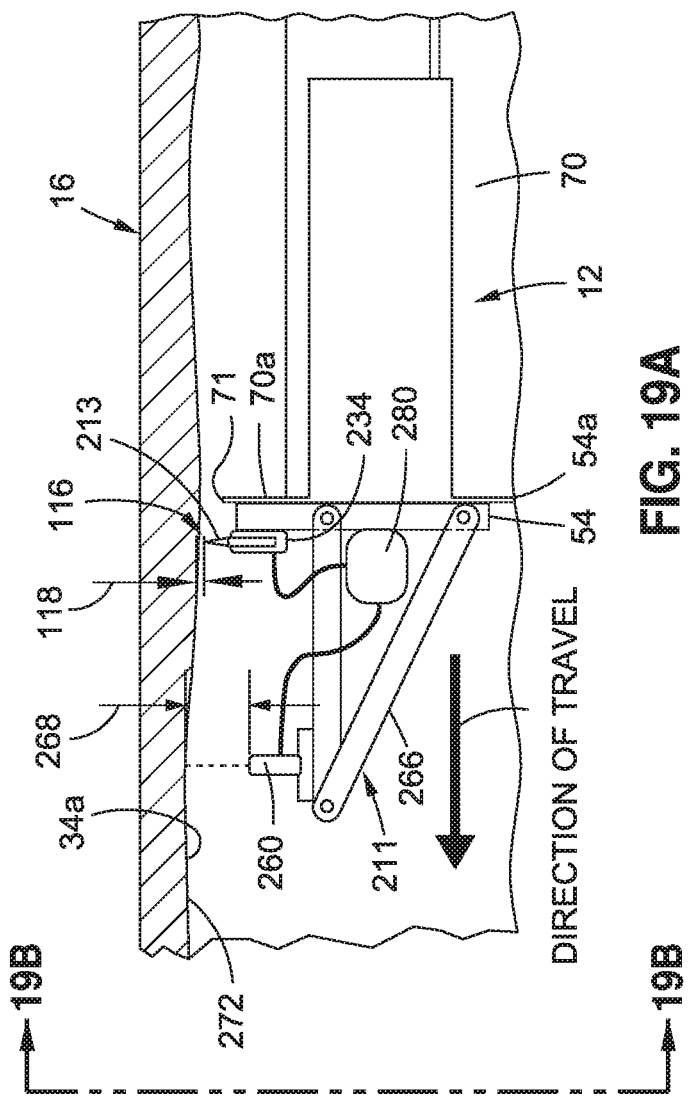
FIG. 19B
FIG. 19A

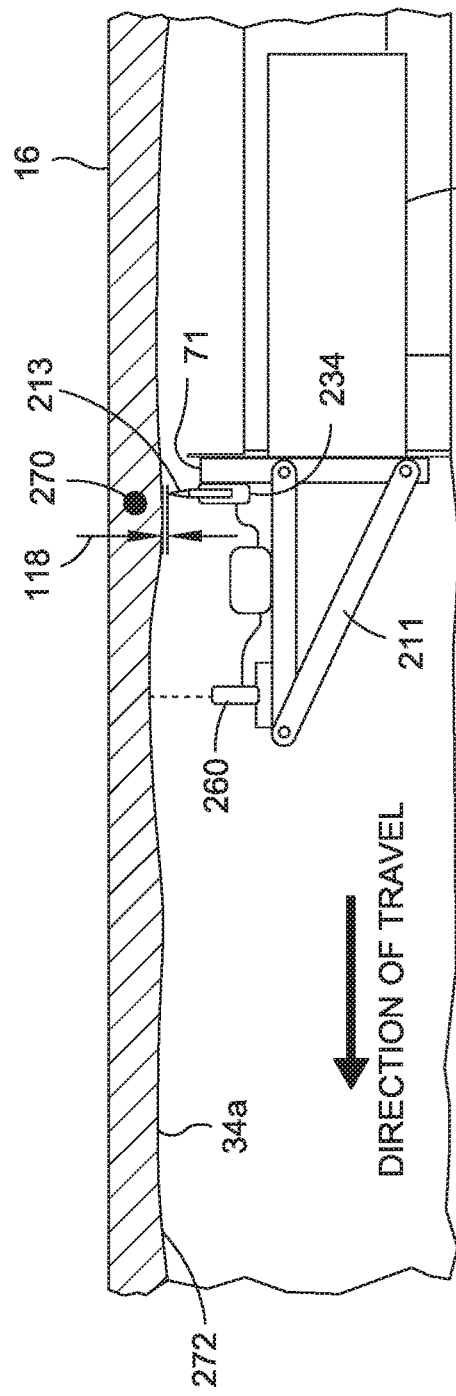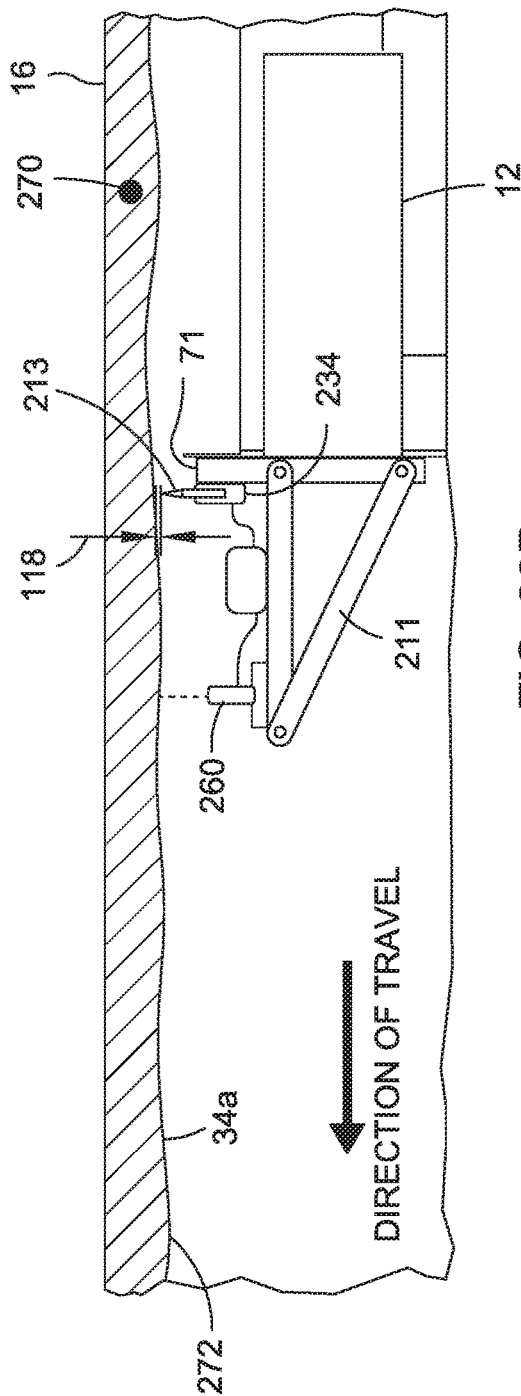

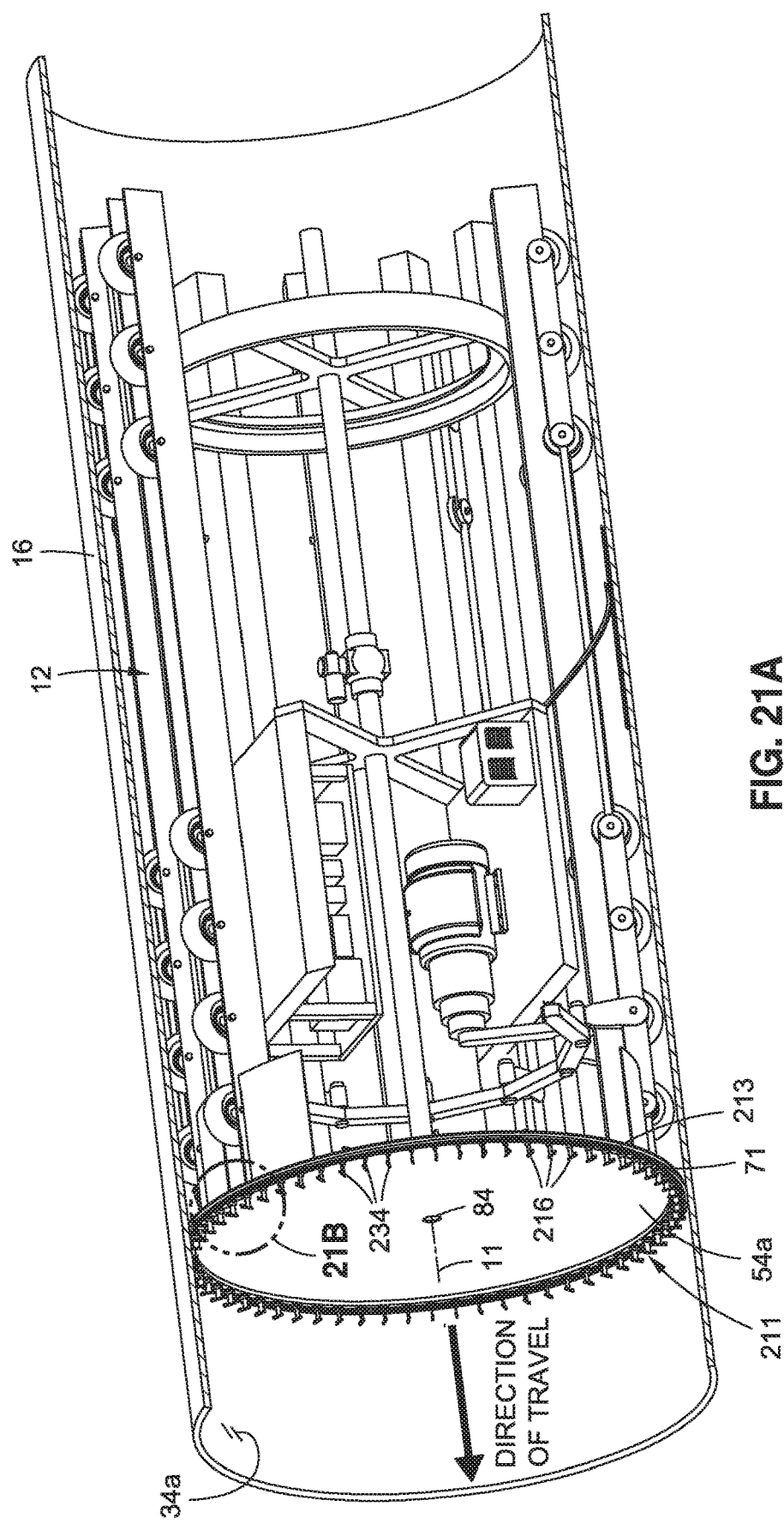

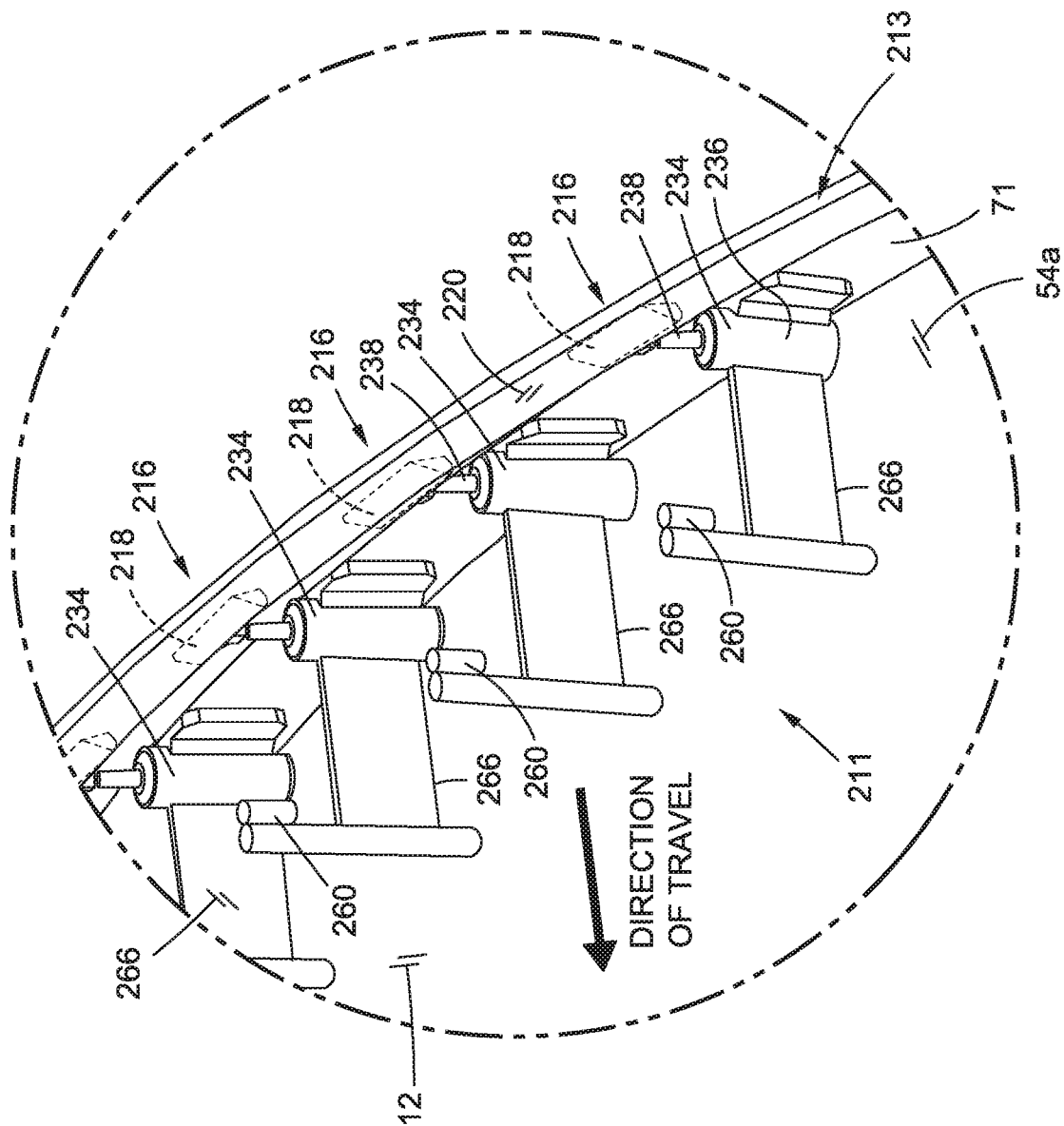

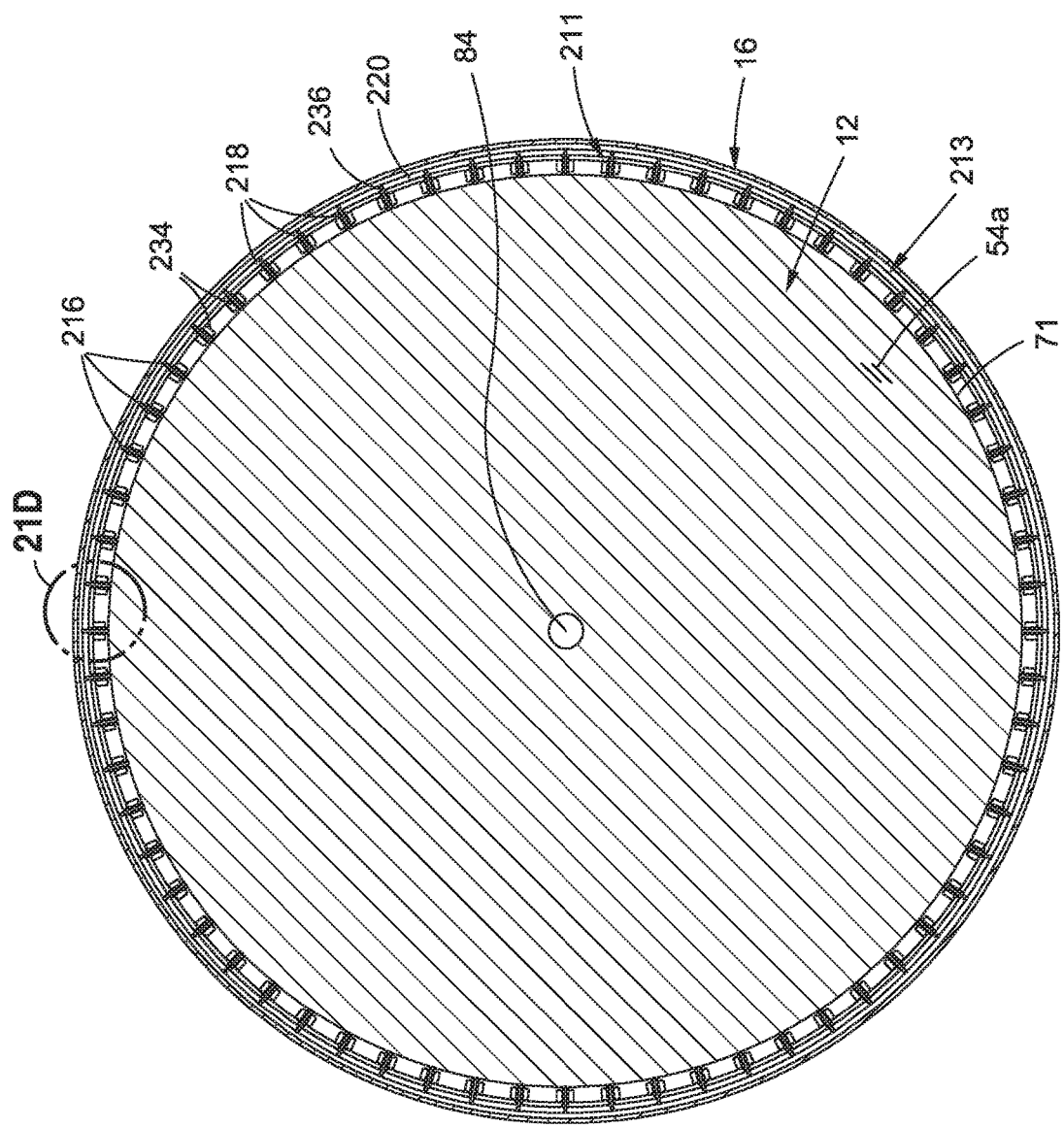

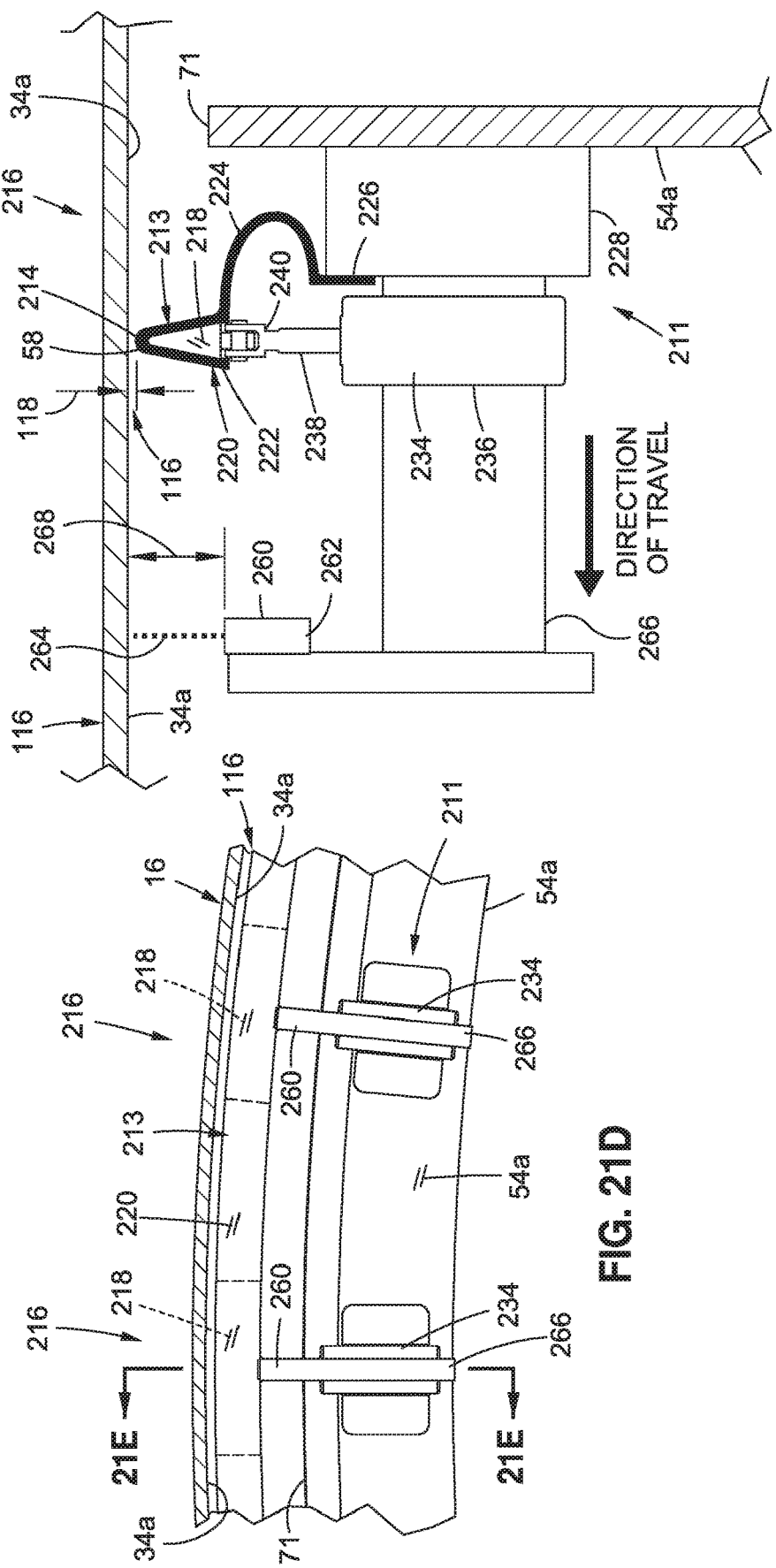

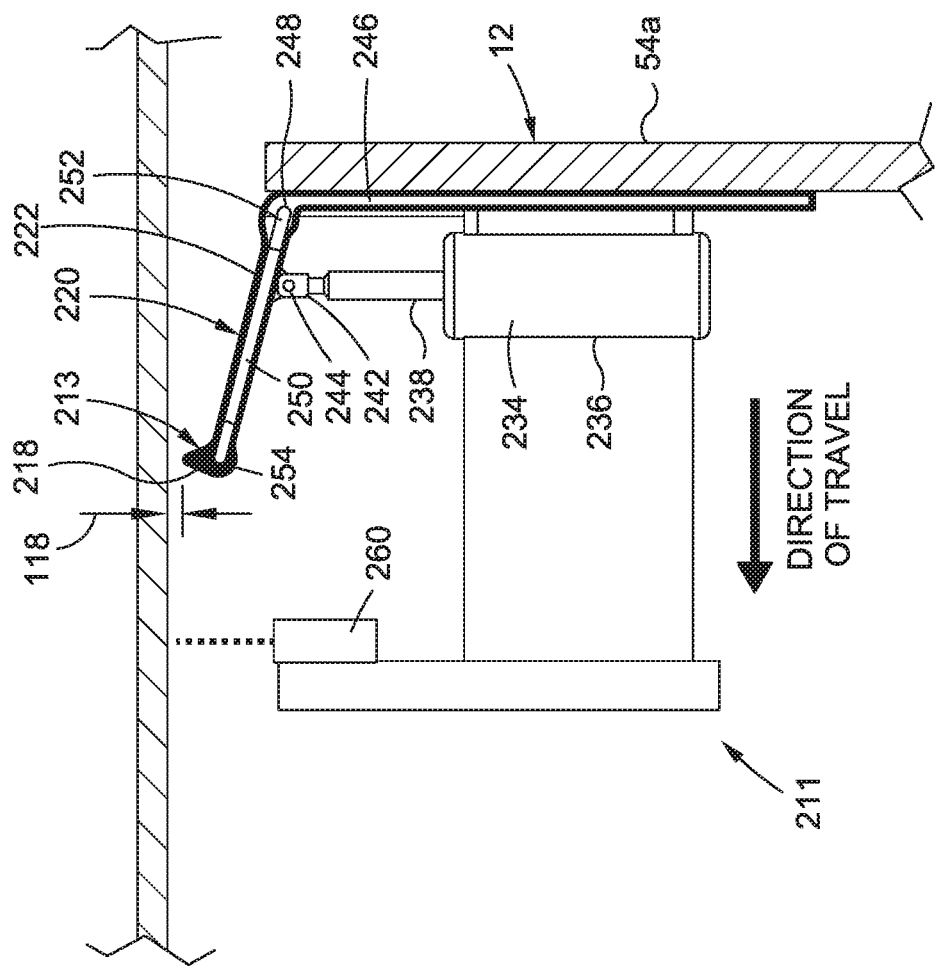

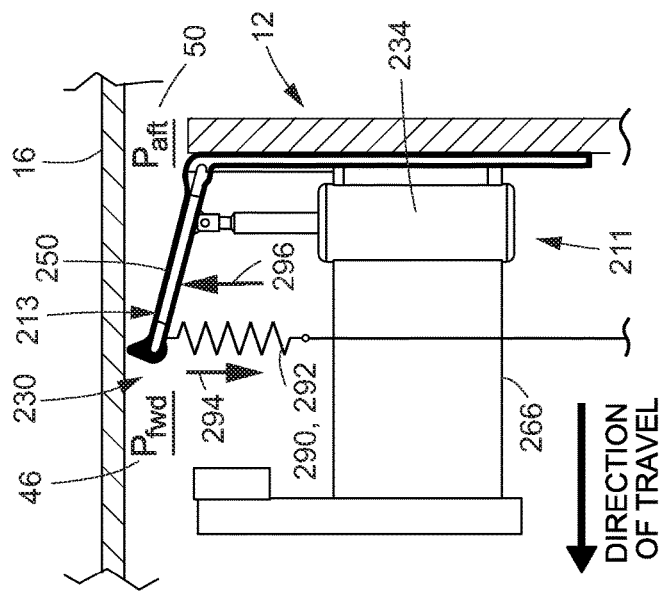
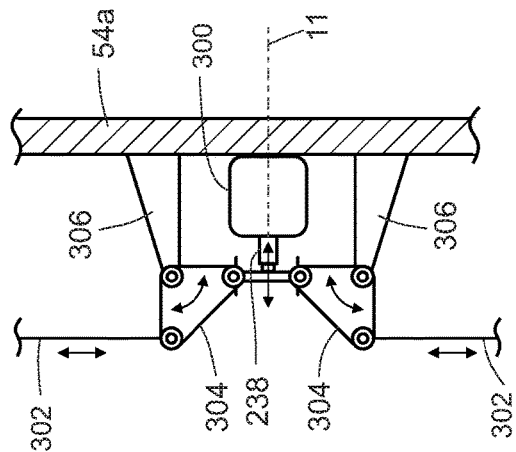
FIG. 24
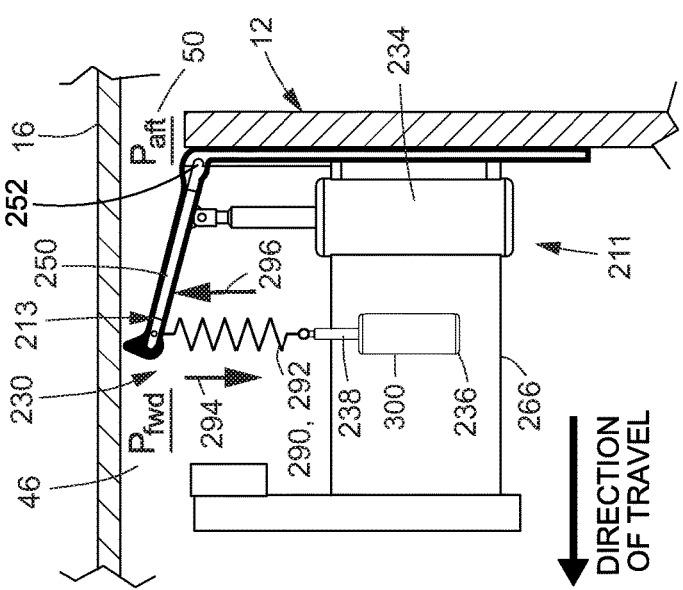
FIG. 23

```
                    ┌─ 400
┌─────────────────────────────────────────────────────────┐
│ MOVING ONE OR MORE VACUUM TRANSPORT TUBE VEHICLES      │─ 402
│ THROUGH AN INTERIOR OF THE VACUUM TRANSPORT TUBE        │
│ HAVING AN INNER SURFACE AND AN INTERIOR                 │
└─────────────────────────────────────────────────────────┘
                          │
                          ▼
┌─────────────────────────────────────────────────────────┐
│ FLOWING AIR, THROUGH AN ANNULAR GAP ASSOCIATED WITH     │─ 404
│ EACH VEHICLE DURING MOVEMENT THROUGH THE VACUUM         │
│ TRANSPORT TUBE, FROM A FORWARD SPACE IN FRONT OF EACH   │
│ OF EACH VEHICLE, TO AN AFT SPACE BEHIND EACH VEHICLE,   │
│ TO CREATE AN AFT PRESSURE IN THE AFT SPACE LOWER THAN   │
│ A FORWARD PRESSURE IN THE FORWARD SPACE                 │
└─────────────────────────────────────────────────────────┘
                          │
                          ▼
┌─────────────────────────────────────────────────────────┐
│ ACTIVELY ADJUSTING, USING A PLURALITY OF ACTUATORS OF   │─ 406
│ AT LEAST ONE VEHICLE DURING MOVEMENT THROUGH THE        │
│ VACUUM TRANSPORT TUBE, A RADIAL POSITION OF A BLADE     │
│ MEMBER AT A CORRESPONDING BLADE CIRCUMFERENTIAL         │
│ LOCATIONS IN A MANNER ACCOMMODATING NON-UNIFORMITIES    │
│ IN AN INNER SURFACE PROFILE MEASURED AT A LOCATION      │
│ FORWARD OF THE ACTUATORS, AND MAINTAINING THE ANNULAR   │
│ GAP AT A SUBSTANTIALLY CONSTANT AND RELATIVELY SHORT    │
│ GAP DISTANCE                                            │
└─────────────────────────────────────────────────────────┘
                          │
                          ▼
┌─────────────────────────────────────────────────────────┐
│ EVACUATING AIR FROM THE VACUUM TRANSPORT TUBE, AND      │─ 408
│ REDUCING PRESSURE IN THE INTERIOR OF THE VACUUM         │
│ TRANSPORT TUBE WITH ONE OR MORE VEHICLE PASSES, UNTIL   │
│ A VACUUM OF A DESIRED PRESSURE IS OBTAINED IN THE       │
│ INTERIOR OF THE VACUUM TRANSPORT TUBE                   │
└─────────────────────────────────────────────────────────┘
```

FIG. 28

VACUUM TRANSPORT TUBE VEHICLE, SYSTEM, AND METHOD FOR EVACUATING A VACUUM TRANSPORT TUBE

CROSS REFERENCE TO RELATED APPLICATION

The present application is a continuation-in-part of and claims priority to pending application Ser. No. 15/476,399, filed on Mar. 31, 2017, titled "VACUUM TRANSPORT TUBE VEHICLE, SYSTEM, AND METHOD FOR EVACUATING A VACUUM TRANSPORT TUBE", the contents of which is incorporated herein by reference in its entirety.

BACKGROUND

1) Field of the Disclosure

The disclosure relates generally to systems and methods for evacuating tubes to create a vacuum, and more particularly, to systems and methods for evacuating air from tubes used for high-speed vacuum tube transportation systems.

2) Description of Related Art

The concept of high-speed travel through tubes has been known for years. Recently, there has been a renewed and increased interest in and investigation of high-speed vacuum or pneumatic tube transportation systems, in which a vehicle travels through an evacuated tube or near evacuated tube near the surface of the earth at high speeds, e.g., 200-2000 miles per hour (mph) average speed. The high speeds may be enabled by a magnetic levitation ("mag-lev") propulsion system that eliminates or greatly reduces rolling friction, and by evacuating the tube of air so that aerodynamic drag is eliminated or greatly reduced.

However, evacuating the tube and creating and maintaining a vacuum, or near vacuum, in the tube may be difficult, in particular, if the tube route is several hundred miles long, or more. The initial evacuation of the tube may entail a significant investment of vacuum pump equipment and energy to achieve and maintain a vacuum in the tube. The amount of vacuum pump equipment needed, such as hundreds of vacuum pumps, to evacuate the tube of air depends upon the tube volume to be evacuated, the degree of vacuum to be achieved, and the time allotted to evacuate the tube volume. Although the energy cost may be somewhat less than the vacuum pump equipment cost, as the energy may not vary with the evacuation time because the total amount of energy required to evacuate the tube may remain the same, the energy cost to achieve and maintain the vacuum may still be high.

Known systems of evacuating a tube for high-speed vacuum transportation systems have been proposed. One such known system installs and uses commercially available vacuum pumps in the interior of a vacuum tube vehicle used to evacuate the tube. This allows the vacuum pump equipment, attached to the vacuum tube vehicle, to be easily transferred from one tube route to another tube route. Although the cost of the vacuum pump equipment may be spread over multiple routes, the cost of the vacuum pump equipment is still high. In addition, the vacuum pump equipment may wear out over time and may need to be maintained, repaired, and/or eventually replaced. This may increase the costs of maintenance, repair, and replacement for such known system. Further, the vacuum pump equipment may be heavy and may increase the overall weight of the vacuum tube vehicle, which may, in turn, affect the speed at which the vacuum tube vehicle moves or travels through the tube. Moreover, such known systems also require pressure seals, such as modular pressure seals, to be used with the installed vacuum pump equipment. Such pressure seals may be costly to use and install, and may, in turn, increase the overall cost of manufacturing.

Thus, it is desirable to provide a system and method for evacuating a tube for high-speed vacuum transportation systems that do not require the use of expensive vacuum pump equipment and pressure seals. Moreover, it is desirable to provide a system and method for evacuating a tube for high-speed vacuum transportation systems that do not require close or tight tolerances of an interface between an inner surface of the tube and an exterior of a vacuum tube vehicle used to evacuate the tube. Such close tolerance requirements may increase the cost and complexity of manufacturing the vacuum tube vehicle used to evacuate the tube.

Accordingly, there is a need in the art for a vacuum transport tube vehicle, system, and method that effectively, efficiently, and inexpensively evacuates a vacuum transport tube, that do not require the use of expensive vacuum pump equipment and pressure seals, that do not require close tolerance manufacturing, and that provide other advantages over known systems and methods.

SUMMARY

Example implementations of this disclosure provide one or more embodiments of a vacuum transport tube vehicle, system, and method for evacuating a vacuum transport tube. As discussed in the below detailed description, embodiments of the vacuum transport tube vehicle, system, and method may provide significant advantages over existing systems and methods.

In one exemplary embodiment, there is provided a vacuum transport tube vehicle for evacuating a vacuum transport tube. The vacuum transport tube vehicle comprises a first end comprising a piston head. The first end has a first end outer diameter and a first end outer surface, wherein an annular gap is formed between the first end outer surface and an inner surface of the vacuum transport tube, when the vacuum transport tube vehicle is installed in an interior of the vacuum transport tube.

The vacuum transport tube vehicle further comprises a second end having a second end outer diameter. The vacuum transport tube vehicle further comprises a body disposed between the first end and the second end. The body comprises a piston having a structural framework.

The vacuum transport tube vehicle further comprises at least one orifice extending from a first inlet portion in the first end through to a second outlet portion of the vacuum transport tube vehicle. The second outlet portion is positioned aft of the first inlet portion. When the vacuum transport tube vehicle moves through the interior of the vacuum transport tube, air flows through the at least one orifice and the annular gap, and a delta pressure is created between a forward pressure in front of the vacuum transport tube vehicle and an aft pressure behind the vacuum transport tube vehicle, such that the aft pressure is lower than the forward pressure.

The vacuum transport tube vehicle further comprises a drive assembly coupled to the body for driving the vacuum transport tube vehicle through the vacuum transport tube.

The vacuum transport tube vehicle further comprises a power system coupled to the drive assembly for powering the drive assembly.

The vacuum transport tube vehicle evacuates the vacuum transport tube by reducing pressure in the interior of the vacuum transport tube with each successive vehicle pass through the vacuum transport tube, until a desired pressure is obtained and a vacuum is created in the interior of the vacuum transport tube.

In another exemplary embodiment, there is provided a vacuum transport tube vehicle system for evacuating a vacuum transport tube. The vacuum transport tube vehicle system comprises a vacuum transport tube having an inner surface, an outer surface, and an interior.

The vacuum transport tube vehicle system further comprises one or more vacuum transport tube vehicles configured for moving through the interior of the vacuum transport tube and evacuating air from the interior of the vacuum transport tube over a route length of a vacuum transport tube route. Each of the one or more vacuum transport tube vehicles comprises a first end comprising a piston head. The first end has a first end outer diameter and a first end outer surface. When each vacuum transport tube vehicle is installed in the vacuum transport tube, an annular gap is formed between the inner surface of the vacuum transport tube and the first end outer surface.

The vacuum transport tube vehicle further comprises a second end having a second end outer diameter. The vacuum transport tube vehicle further comprises a body disposed between the first end and the second end. The body comprises a piston having a structural framework.

The vacuum transport tube vehicle further comprises at least one orifice extending from a first inlet portion in the first end through to a second outlet portion of the vacuum transport tube vehicle. The second outlet portion is positioned aft of the first inlet portion. The at least one orifice is configured to allow air to flow from a forward space in front of the vacuum transport tube vehicle to an aft space behind the vacuum transport tube vehicle, to create a delta pressure between a forward pressure in the forward space and an aft pressure in the aft space, such that the aft pressure is lower than the forward pressure.

The vacuum transport tube vehicle further comprises a drive assembly coupled to the body for driving the vacuum transport tube vehicle through the vacuum transport tube. The vacuum transport tube vehicle further comprises a power system coupled to the drive assembly for powering the drive assembly.

The one or more vacuum transport tube vehicles evacuate the vacuum transport tube by reducing pressure in the interior of the vacuum transport tube with each successive vehicle pass through the vacuum transport tube, until a desired pressure is obtained and a vacuum is created in the interior of the vacuum transport tube.

The vacuum transport tube vehicle system further comprises one or more pressure barriers positioned in the interior of the vacuum transport tube aft of the one or more vacuum transport tube vehicles.

In another exemplary embodiment, there is provided a method for evacuating a vacuum transport tube. The method comprises the step of installing one or more vacuum transport tube vehicles in an interior of the vacuum transport tube. The vacuum transport tube has an inner surface and an outer surface.

Each of the vacuum transport tube vehicles comprises a first end comprising a piston head. The first end has a first end outer diameter and a first end outer surface, wherein an annular gap is formed between the first end outer surface and the inner surface of the vacuum transport tube. Each of the vacuum transport tube vehicles further comprises a second end having a second end outer diameter. Each of the vacuum transport tube vehicles further comprises a body disposed between the first end and the second end. The body comprises a piston having a structural framework. Each of the vacuum transport tube vehicles further comprises at least one orifice extending from a first inlet portion in the first end through to a second outlet portion of the vacuum transport tube vehicle. The second outlet portion is positioned aft of the first inlet portion.

Each of the vacuum transport tube vehicles further comprises a drive assembly coupled to the body for driving the vacuum transport tube vehicle through the vacuum transport tube. Each of the vacuum transport tube vehicles further comprises a power system coupled to the drive assembly for powering the drive assembly.

The method further comprises the step of installing one or more pressure barriers in the interior of the vacuum transport tube aft of the one or more vacuum transport tube vehicles. The method further comprises the step of moving each vacuum transport tube vehicle through the interior of the vacuum transport tube, and making one or more vehicle passes with each vacuum transport tube vehicle over a route length of a vacuum transport tube route.

The method further comprises the step of flowing air, through the at least one orifice and through the annular gap of each vacuum transport tube vehicle, from a forward space in front of each vacuum transport tube vehicle, to an aft space behind each vacuum transport tube vehicle, to create a delta pressure between a forward pressure in the forward space and an aft pressure in the aft space, such that the aft pressure is lower than the forward pressure.

The method further comprises the step of evacuating air from the vacuum transport tube, and reducing pressure in the interior of the vacuum transport tube with each successive vehicle pass, until a desired pressure is obtained and a vacuum is created in the interior of the vacuum transport tube.

In another exemplary embodiment, there is provided a vacuum transport tube vehicle for evacuating a vacuum transport tube.

The vacuum transport tube vehicle comprises a first end, a second end, and a body comprising a piston between the first end and the second end. The first end comprises a piston head having a piston perimeter portion.

The vacuum transport tube vehicle further includes a blade-actuator assembly. The blade-actuator assembly comprises a circumferential blade member sealed to the piston head and having a blade perimeter portion defining a first end outer surface. An annular gap is formed between the first end outer surface and an inner surface of the vacuum transport tube when the vehicle is installed in an interior of the vacuum transport tube.

The vacuum transport tube vehicle further includes a plurality of blade segment actuators arranged circumferentially around the piston perimeter portion and coupled to the blade member at a corresponding plurality of blade circumferential locations. The blade segment actuators are configured to actively adjust a radial position of the blade member at the corresponding blade circumferential locations in a manner accommodating non-uniformities in an inner surface profile, and maintaining the annular gap at a substantially constant and relatively short gap distance during movement of the vehicle through the vacuum transport tube.

The vacuum transport tube vehicle creates an aft pressure behind the vehicle that is lower than a forward pressure in front of the vehicle to result in a vacuum of a desired pressure in the interior of the vacuum transport tube caused by one or more vehicle passes through the vacuum transport tube.

In another exemplary embodiment, there is provided a vacuum transport tube vehicle for evacuating a vacuum transport tube. The vacuum transport to the vehicle comprises a first end, a second end, and a body disposed between the first end and the second end. The body comprises a piston having a piston head and a first end outer surface. An annular gap is formed between the first end outer surface and an inner surface of the vacuum transport tube when the vehicle is installed in the vacuum transport tube.

The annular gap allows air to flow therethrough when the vehicle moves through the vacuum transport tube, and a delta pressure is created between a forward pressure in front of the first end of the vehicle and an aft pressure behind the second end of the vehicle, such that the aft pressure is lower than the forward pressure.

The vacuum transport tube vehicle includes a drive assembly coupled to the body for driving the vehicle through the vacuum transport tube. In addition, the vacuum transport to vehicle includes a power system coupled to the drive assembly for powering the drive assembly.

The vacuum transport tube vehicle is configured to create a vacuum with a desired pressure in an interior of the vacuum transport tube during one or more vehicle passes through the vacuum transport tube such that the pressure in the interior of the vacuum transport tube is reduced after each vehicle pass.

In another exemplary embodiment, there is provided a vacuum transport tube vehicle system for evacuating a vacuum transport tube. The vacuum transport tube vehicle system includes a vacuum transport tube having an inner surface and an interior. In addition, the vacuum transport to vehicle system includes one or more vacuum transport tube vehicles configured for moving through the interior of the vacuum transport tube and evacuating air from the interior of the vacuum transport tube over a route length of a vacuum transport tube route.

The one or more of the vacuum transport tube vehicles include a first end, a second end, and a body comprising a piston between the first end and the second end. The first end comprises a piston head having a piston perimeter portion.

The one or more of the vacuum transport tube vehicles further include a blade-actuator assembly. The blade-actuator assembly comprises a circumferential blade member sealed to the piston head and having a blade perimeter portion defining a first end outer surface. An annular gap is formed between the first end outer surface and an inner surface of the vacuum transport tube when the vehicle is installed in an interior of the vacuum transport tube.

The one or more of the vacuum transport tube vehicles further include a plurality of blade segment actuators arranged circumferentially around the piston perimeter portion and coupled to the blade member at a corresponding plurality of blade circumferential locations. The blade segment actuators are configured to actively adjust a radial position of the blade member at the corresponding blade circumferential locations in a manner accommodating non-uniformities in an inner surface profile, and maintaining the annular gap at a substantially constant and relatively short gap distance during movement of the vehicle through the vacuum transport tube.

The one or more of the vacuum transport tube vehicles create a vacuum of a desired pressure in the interior of the vacuum transport tube caused by one or more vehicle passes through the vacuum transport tube such that the pressure in the interior of the vacuum transport tube is reduced after each vehicle pass.

In another exemplary embodiment, there is provided a method for evacuating a vacuum transport tube. The method comprises the step of moving one or more vacuum transport tube vehicles through an interior of the vacuum transport tube having an inner surface and an interior. At least one of the vacuum transport tube vehicles comprises a first end, a second end, and a body comprising a piston between the first end and the second end. The first end comprises a piston head having a piston perimeter portion.

The vacuum transport tube vehicle includes a blade-actuator assembly, comprising a circumferential blade member sealed to the piston head and having a blade perimeter portion defining a first end outer surface. An annular gap is formed between the first end outer surface and an inner surface of the vacuum transport tube. The blade-actuator assembly further includes a plurality of blade segment actuators arranged circumferentially around the piston perimeter portion and coupled to the blade member at a corresponding plurality of blade circumferential locations.

The method further comprises the step of flowing air, through the annular gap of each vehicle during movement through the vacuum transport tube, from a forward space in front of each of each vehicle, to an aft space behind each vehicle, to create an aft pressure in the aft space lower than a forward pressure in the forward space.

The method further comprises the step of actively adjusting, using the plurality of blade segment actuators of at least one vehicle during movement through the vacuum transport tube, a radial position of the blade member at the corresponding blade circumferential locations in a manner accommodating non-uniformities in an inner surface profile measured at a location forward of the blade segment actuators, and maintaining the annular gap at a substantially constant and relatively short gap distance, The method further comprises the step of evacuating air from the vacuum transport tube, and reducing pressure in the interior of the vacuum transport tube with one or more vehicle passes, until a vacuum of a desired pressure is obtained in the interior of the vacuum transport tube.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 1A is an illustration of a side perspective view of a prior proposed high-speed vacuum tube transportation system having vacuum transport tubes that may be used with one or more embodiments of the vacuum transport tube vehicle system, vacuum transport tube vehicle, and method of the disclosure;

FIG. 1B is an illustration of a cross-sectional view of the prior proposed high-speed vacuum tube transportation system taken along lines 1B-1B of FIG. 1A;

FIG. 4A is a schematic illustration of a first car moving operation of the vacuum transport tube vehicle system of the disclosure;

FIG. 4B is an illustration of a first car moving operation graph showing a pressure in front of and behind each car in the first car moving operation of FIG. 4A;

FIG. 5A is a schematic illustration of a second car moving operation of the vacuum transport tube vehicle system of the disclosure;

FIG. 5B is an illustration of a second car moving operation graph showing a pressure in front of and behind each car in the second car moving operation of FIG. 5A;

FIG. 9 is an illustration of a piston velocity graph showing piston velocity for each car of an embodiment of the vacuum transport tube vehicle system of the disclosure;

FIG. 11A is an illustration of a linear scale delta pressure graph showing delta pressure for each car of an embodiment of the vacuum transport tube vehicle system of the disclosure;

FIG. 11B is an illustration of a logarithmic scale delta pressure graph showing delta pressure for each car of an embodiment of the vacuum transport tube vehicle system of the disclosure;

FIGS. 14A-14I are illustrations of various conditions of a route end boundary assembly for vacuum transport tube vehicles of the vacuum transport tube vehicle system of the disclosure;

FIG. 16 is an illustration of a functional block diagram of an exemplary embodiment of a vacuum transport tube vehicle system of the disclosure.

CIP MATERIAL

FIG. 18B is an illustration of a cross-sectional view of the vacuum transport tube vehicle taken along lines 18B-18B of FIG. 18A.

FIG. 18C is an illustration of a magnified portion of the vacuum transport tube vehicle identified by reference number 18C of FIG. 18B.

FIG. 18D is an illustration of a magnified portion of the side cross-section of the vacuum transport tube vehicle identified by reference number 18D of FIG. 18A and illustrating a uniform inner surface of the vacuum transport tube.

FIG. 18E is an illustration of a portion of a vacuum transport tube having non-uniformities in an inner surface profile of the vacuum transport tube.

FIG. 19A is an illustration of a side view of a portion of a vacuum transport tube vehicle having a blade-actuator assembly for accommodating non-uniformities in an inner surface profile of the vacuum transport tube.

FIG. 19B is an illustration of a cross-sectional view of the vacuum transport tube vehicle taken along lines 19B-19B of FIG. 19A.

FIGS. 20A, 20B, 20C and 20D are illustrations of a sectional side view of a portion of a vacuum transport tube vehicle during relative movement within a vacuum transport tube having non-uniformities in an inner surface profile of the vacuum transport tube.

FIG. 21A is an illustration of a front isometric view of an example of a vacuum transport tube vehicle having a blade-actuator assembly mounted to the piston head of the vacuum transport tube vehicle.

FIG. 21B is an illustration of a magnified portion of the vacuum transport tube vehicle identified by reference number 21B of FIG. 21A.

FIG. 21C is an illustration of a front sectional view of the vacuum transport tube vehicle taken along lines 21C-21C of FIG. 21A.

FIG. 21D is an illustration of a magnified portion of the vacuum transport tube vehicle identified by reference number 21D of FIG. 21C.

FIG. 21E is an illustration of a side view of the vacuum transport tube vehicle taken along lines 21E-21E of FIG.

21D and showing an example of a blade segment actuator and a distance sensor of one of the blade-actuator assemblies.

FIG. 22 is an illustration of a side view of a portion of a vacuum transport tube vehicle showing a further example of the blade-actuator assembly having a lever arm.

FIG. 23 is an illustration of a side view of a portion of a vacuum transport tube vehicle showing an example of the blade-actuator assembly having a force-balancing mechanism configured as a coil spring extending between the lever arm and a dedicated secondary actuator mounted to the sensor support bracket.

FIG. 24 is an illustration of a side view of a portion of the vacuum transfer tube vehicle showing further example of a force-balancing mechanism in which the coil spring is coupled by cable to a common secondary actuator mounted to the center of the piston head.

Figure 25:
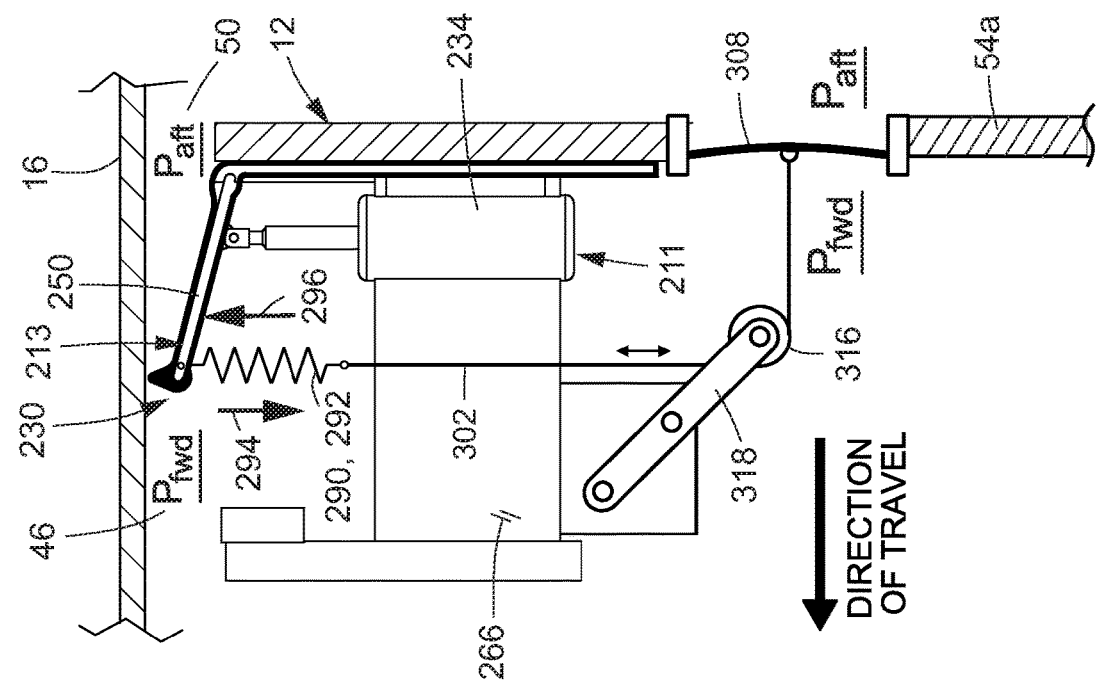

FIG. 25 is an illustration of a side view of a portion of vacuum transfer tube vehicle showing a still further example of a force balancing mechanism in which the coil spring is coupled by cable to a pressure membrane integrated into the piston head.

Figure 26:
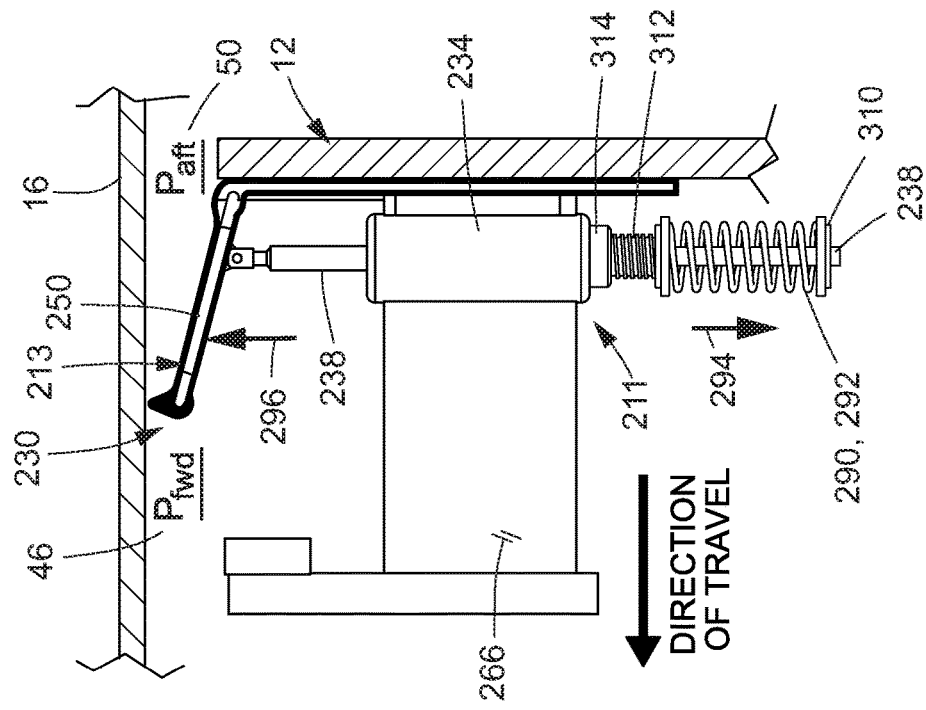

FIG. 26 is an illustration of a side view of a portion of the vacuum transfer tube vehicle showing a still further example of a force balancing mechanism in which the coil spring is integrated into the blade segment actuator.

Figure 27A:
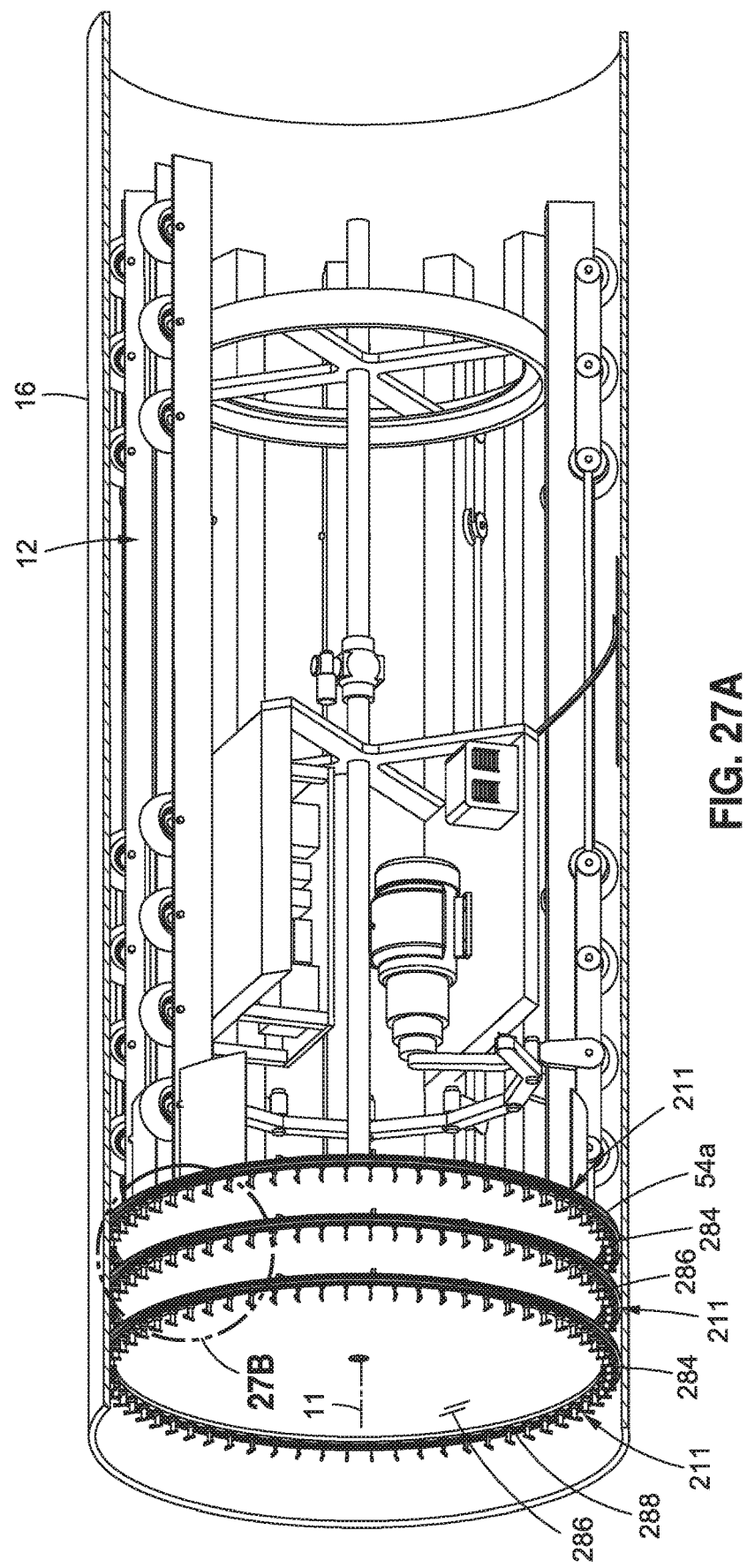

FIG. 27A is an illustration of a front isometric view of an example of a vacuum transport tube vehicle having a plurality of diaphragm assemblies positioned in front of the piston head of the vacuum transport tube vehicle.

Figure 27B:
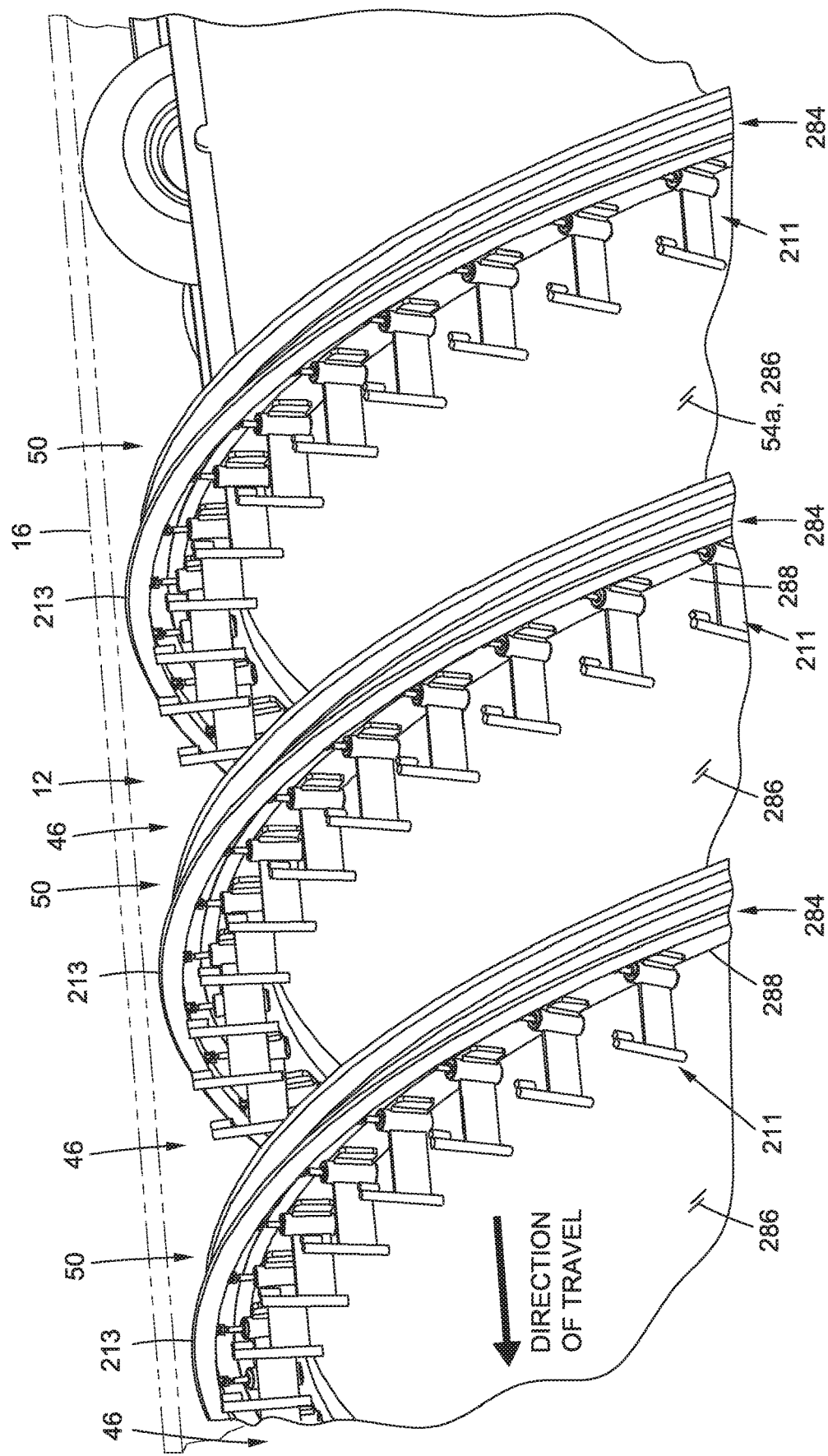

FIG. 27B is an illustration of a magnified portion of the vacuum transport tube vehicle identified by reference number 24B of FIG. 24A.

FIG. 28 is an illustration of a flow diagram showing an exemplary embodiment of a method of the disclosure.

The figures shown in this disclosure represent various aspects of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

The disclosure, as discussed in detail below, includes embodiments of a vacuum transport tube vehicle system 10 (see FIGS. 2A, 2B, 16) for evacuating a vacuum transport tube 16 (see FIGS. 2A, 2B, 16), a vacuum transport tube vehicle 12 (see FIGS. 2A, 2B) for evacuating a vacuum transport tube 16 (see FIGS. 2A, 2B, 16), and a method 200 (see FIG. 17) for evacuating a vacuum transport tube 16 (see FIGS. 2A, 2B, 16).

Now referring to the Figures, FIG. 1A is an illustration of a side perspective view of a prior proposed high-speed vacuum tube transportation system 14, e.g., 500-750 mph (miles per hour) average speed, with a high-speed vacuum tube transportation train 15 moving or traveling through a vacuum transport tube 16, such as a first vacuum transport tube 16a, in a direction of travel 18. However, other higher or lower speeds may also be used, for example, 200-2000 mph. As shown in FIG. 1A, the high-speed vacuum tube transportation system 14 may include the first vacuum transport tube 16a and a second vacuum transport tube 16b, one or both of which may be used with one or more embodiments of the vacuum transport tube vehicle 12 and the vacuum transport tube vehicle system 10 of the disclosure. As further shown in FIG. 1A, the vacuum transport tubes 16 are elevated above a ground surface 20 via a plurality of column support structures 22. However, the vacuum transport tubes 16 may also be installed underneath the ground surface 20.

FIG. 1B is an illustration of a cross-sectional view of the prior proposed high-speed vacuum tube transportation system 14 taken along lines 1B-1B of FIG. 1A. FIG. 1B shows the high-speed vacuum tube transportation train 15 within the first vacuum transport tube 16a. The first vacuum transport tube 16a (see FIG. 1B) is positioned below the second vacuum transport tube 16b (see FIG. 1B), and the column support structure 22 (see FIG. 1B) supports the vacuum transport tubes 16 (see FIG. 1B). As further shown in FIG. 1B, the high speeds of the high-speed vacuum tube transportation train 15 may be enabled by a magnetic levitation (mag-lev) propulsion system 24, which is substantially frictionless and eliminates or greatly reduces rolling friction. The mag-lev propulsion system 24 (see FIG. 1B) may include a plurality of guide magnets 26 (see FIG. 1B) and a plurality of vehicle magnets 28 (see FIG. 1B) to create both lift and substantially frictionless propulsion to move the of high-speed vacuum tube transportation train 15 (see FIG. 1B) along a guideway through the vacuum transport tube 16 (see FIG. 1B) at very high speeds.

Figure 2A:
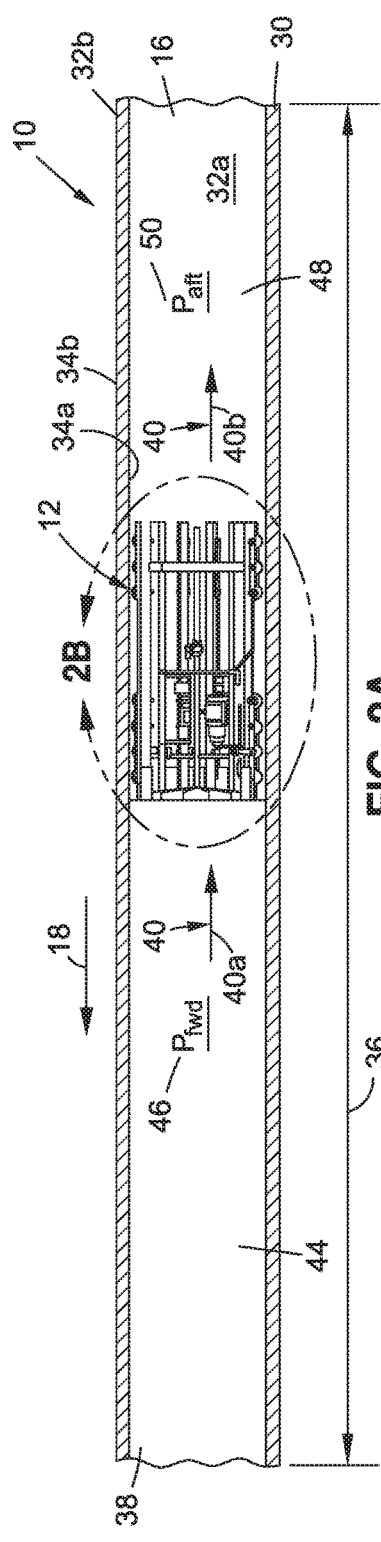
FIG. 2A is an illustration of a sectional side view of an embodiment of a vacuum transport tube vehicle system and a vacuum transport tube vehicle of the disclosure.

Now referring to FIGS. 2A-2F, a vacuum transport tube vehicle 12 is provided for use in the vacuum transport tube vehicle system 10, for evacuating a vacuum transport tube 16. FIG. 2A is an illustration of a sectional side view of an embodiment of the vacuum transport tube vehicle system 10 comprising a vacuum transport tube 16 and a vacuum transport tube vehicle 12 of the disclosure. In one embodiment, as shown in FIG. 2A, the vacuum transport tube vehicle system 10 comprises one vacuum transport tube vehicle 12 for evacuating the vacuum transport tube 16. However, as discussed below, the vacuum transport tube vehicle system 10 (see FIGS. 2A, 3A, 16) may include more than one vacuum transport tube vehicle 12 and preferably includes multiple vacuum transport tube vehicles 12.

As shown in FIG. 2A, vacuum transport tube 16 comprises a cylindrical body 30 having an interior 32a that is configured to be evacuated of air 40, or other fluids, and having an exterior 32b. As further shown in FIG. 2A, the cylindrical body 30 of the vacuum transport tube 16 has an inner surface 34a and an outer surface 34b. The vacuum transport tube 16 (see FIG. 2A) is preferably continuous and made of steel, concrete, or another strong and durable material. The vacuum transport tube vehicle 12 is shown in FIG. 2A moving or traveling in a forward direction of travel 18a through the interior 32a of the vacuum transport tube 16, along a route length 36 of a vacuum transport tube route 38 of the vacuum transport tube 16.

As the vacuum transport tube vehicle 12 (see FIG. 2A) moves or travels through the vacuum transport tube 16 (see FIG. 2A), the vacuum transport tube vehicle 12 evacuates the vacuum transport tube 16 (see FIG. 2A), for example, evacuates air 40 (see FIG. 2A), from the vacuum transport tube 16 (see FIG. 2A), to create and maintain a vacuum 42 (see FIG. 16) within the vacuum transport tube 16 over the route length 36 (see FIG. 2A) of the vacuum transport tube route 38 (see FIG. 2A). Preferably, the vacuum transport tube vehicle 12 (see FIGS. 2A, 2B, 16) and the vacuum transport tube vehicle system 10 (see FIGS. 2A, 2B, 16)

achieve an evacuation 41 (see FIG. 16), such as an initial evacuation 41*a* (see FIG. 16), of the vacuum transport tube 16 (see FIGS. 2A, 16), such as before use by high-speed vehicles, such as high-speed vacuum tube transportation trains 15 (see FIG. 1A), or other prior proposed or known high-speed vehicles.

FIG. 2A shows a forward space 44 having a forward pressure ($P_{fwd}$) 46 in front of the vacuum transport tube vehicle 12, and shows an aft space 48 having an aft pressure ($P_{aft}$) 50 in back of, or behind, the vacuum transport tube vehicle 12. The vacuum transport tube vehicle 12 (see FIGS. 2A, 2B) functions like a piston inside the vacuum transport tube 16 (see FIG. 2A) and enables the economic and quick evacuation 41 (see FIG. 16), such as an initial evacuation 41*a*(see FIG. 16), of air 40 (see FIGS. 2A, 16), or other fluids, from inside the vacuum transport tube 16 (see FIG. 2A), over the route length 36 (see FIG. 2A) of the vacuum transport tube route 38 (see FIG. 2A).

As the vacuum transport tube vehicle 12 (see FIG. 2A) is propelled in the forward direction of travel 18*a* (see FIG. 2A), it pushes the air 40 (see FIG. 2A), such as upstream air 40*a* (see FIG. 2A), that is in the forward space 44 (see FIG. 2A) in front of the vacuum transport tube vehicle 12 (see FIG. 2A) out of the way, and allows a small amount of the air 40, such as the upstream air 40*a*, to flow from the forward space 44 in front of the vacuum transport tube vehicle 12, past and/or through the vacuum transport tube vehicle 12, and into the aft space 48 (see FIG. 2A) behind the vacuum transport tube vehicle 12, becoming downstream air 40*b* (see FIG. 2A), behind or in back of the vacuum transport tube vehicle 12.

A lower aft pressure ($P_{aft}$) 50 (see FIG. 2A) aft of the vacuum transport tube vehicle 12 (see FIG. 2A) results because the air 40 (see FIG. 2A), such as the downstream air 40*b* (see FIG. 2A), behind the vacuum transport tube vehicle 12 is not allowed to flow into the forward space 44 (see FIG. 2A) that has been enlarged by the movement of the vacuum transport tube vehicle 12 in the forward direction of travel 18*a* (see FIG. 2A). Thus, the aft pressure ($P_{aft}$) 50 (see FIG. 2A) in the aft space 48 (see FIG. 2A) behind the vacuum transport tube vehicle 12 (see FIG. 2A) is reduced and lower than the forward pressure ($P_{fwd}$) 46 (see FIG. 2A) in the forward space 44 (see FIG. 2A) in front of the vacuum transport tube vehicle 12, as the vacuum transport tube vehicle 12 moves. A delta pressure 52 (FIGS. 11A-11B, 16), or pressure differential, is thus created between the forward pressure ($P_{fwd}$) 46 (see FIG. 2A) in the forward space 44 (see FIG. 2A) and the aft pressure ($P_{aft}$) 50 (see FIG. 2A) in the aft space 48 (see FIG. 2A), such that the aft pressure ($P_{aft}$) 50 is lower than the forward pressure ($P_{fwd}$) 46, and the forward pressure ($P_{fwd}$) 46 is higher than the aft pressure ($P_{aft}$) 50, as the vacuum transport tube vehicle 12 moves. As further discussed in detail below, the pressure 43 (see FIG. 16) in the interior 32*a* (see FIG. 2A) of the vacuum transport tube 16 (see FIG. 2A) becomes further reduced with each successive vehicle pass 53 (see FIG. 16) of the one or more vacuum transport tube vehicles 12 (see FIG. 2A) through the vacuum transport tube 16.

Figure 2B:
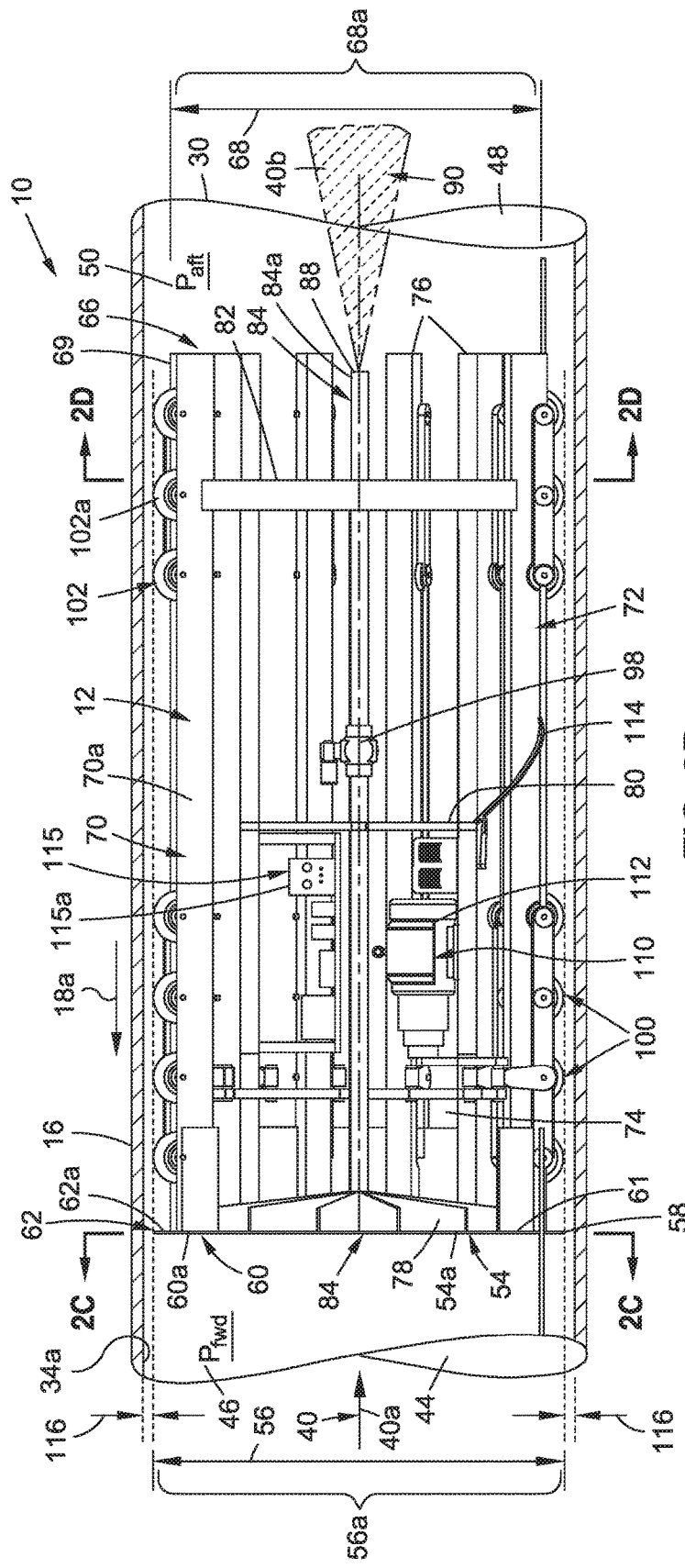
FIG. 2B is an illustration of an enlarged sectional side view of the circle 2B portion of the vacuum transport tube vehicle of FIG. 2A.
Figure 2C:
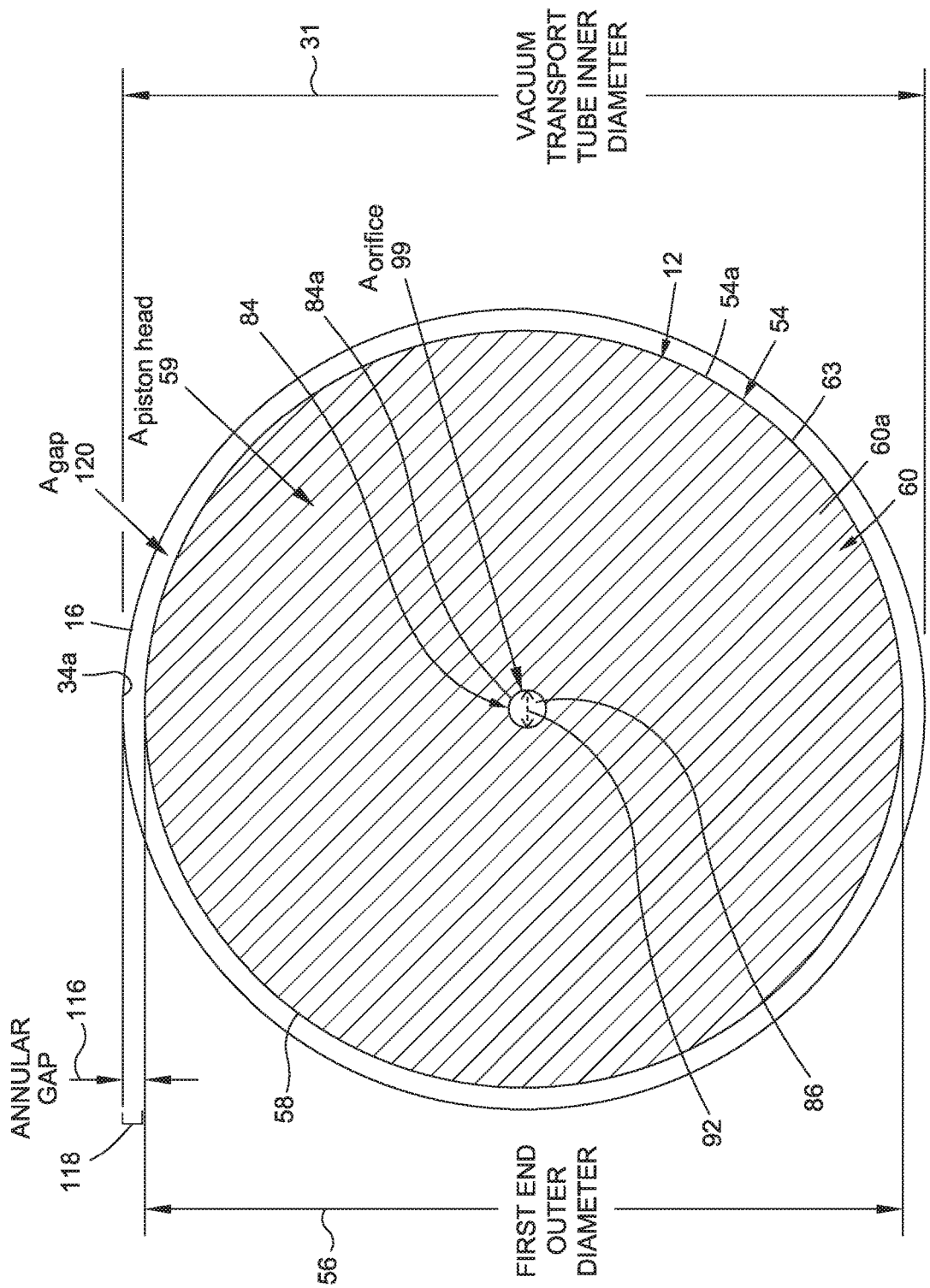
FIG. 2C is an illustration of a cross-sectional view of the vacuum transport tube vehicle taken along lines 2C-2C of FIG. 2B.
Figure 2D:
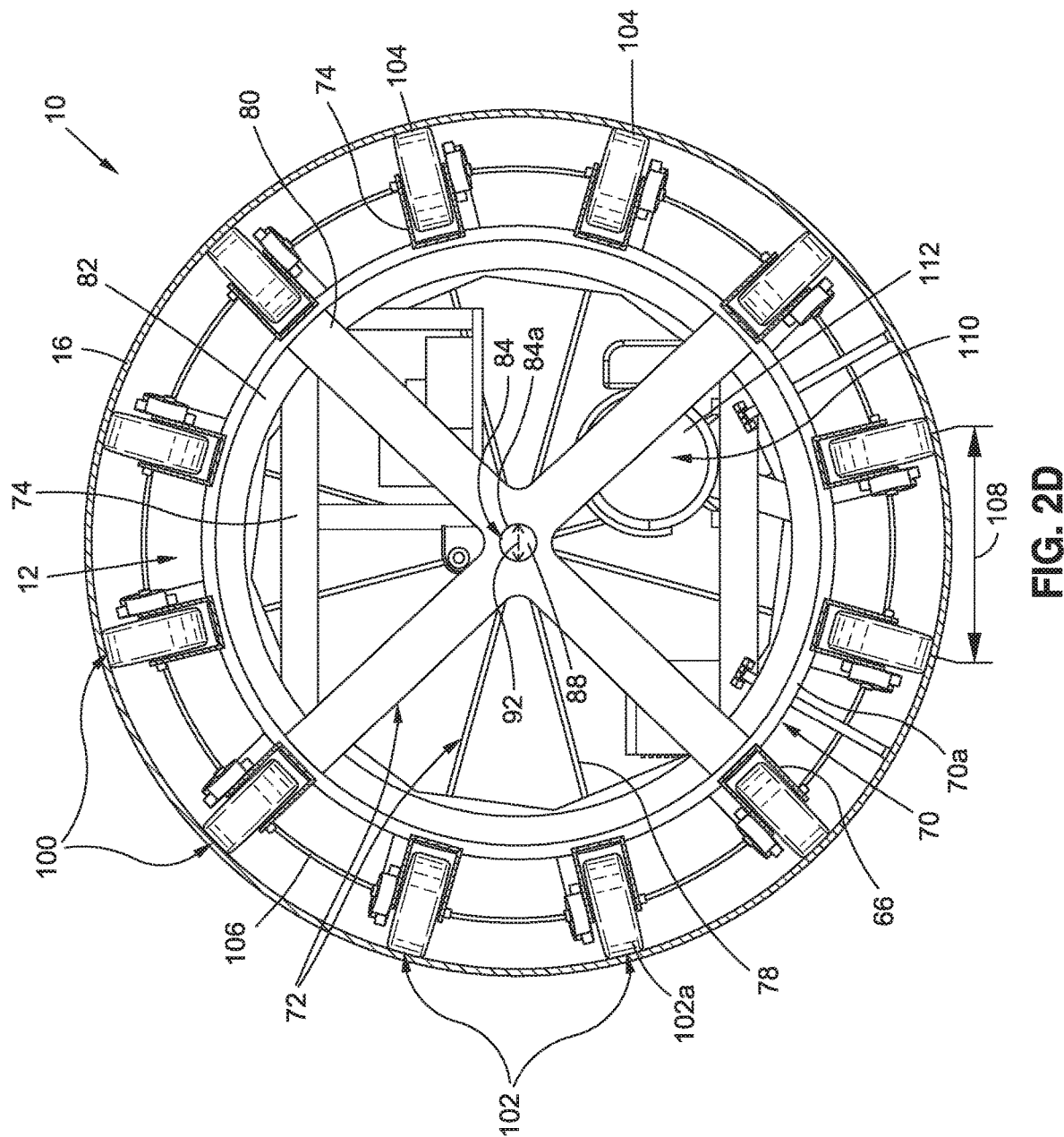
FIG. 2D is an illustration of a cross-sectional view of the vacuum transport tube vehicle taken along lines 2D-2D of FIG. 2B.
Figure 2E:
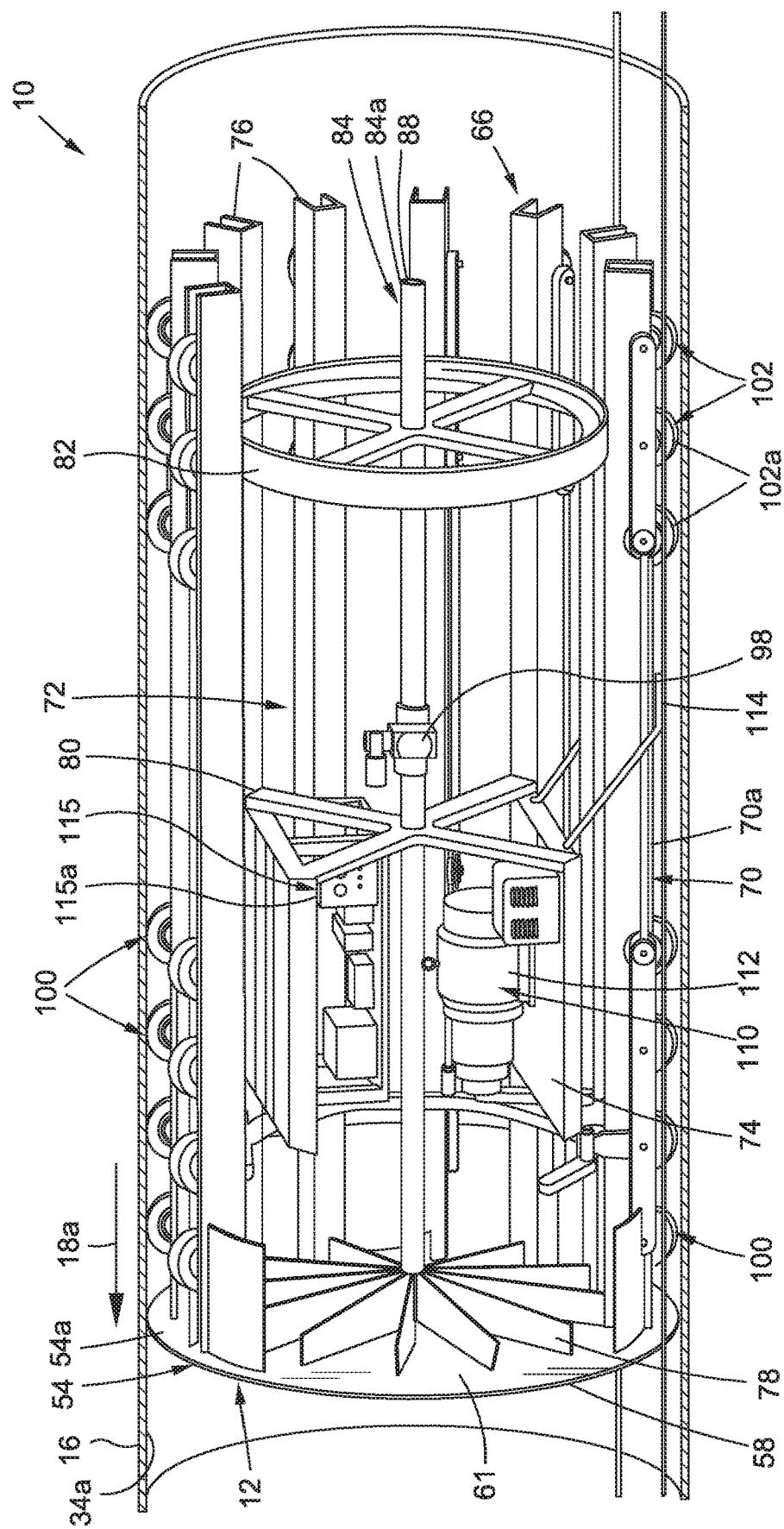
FIG. 2E is an illustration of a back side isometric view of the vacuum transport tube vehicle of FIG. 2B.
Figure 2F:
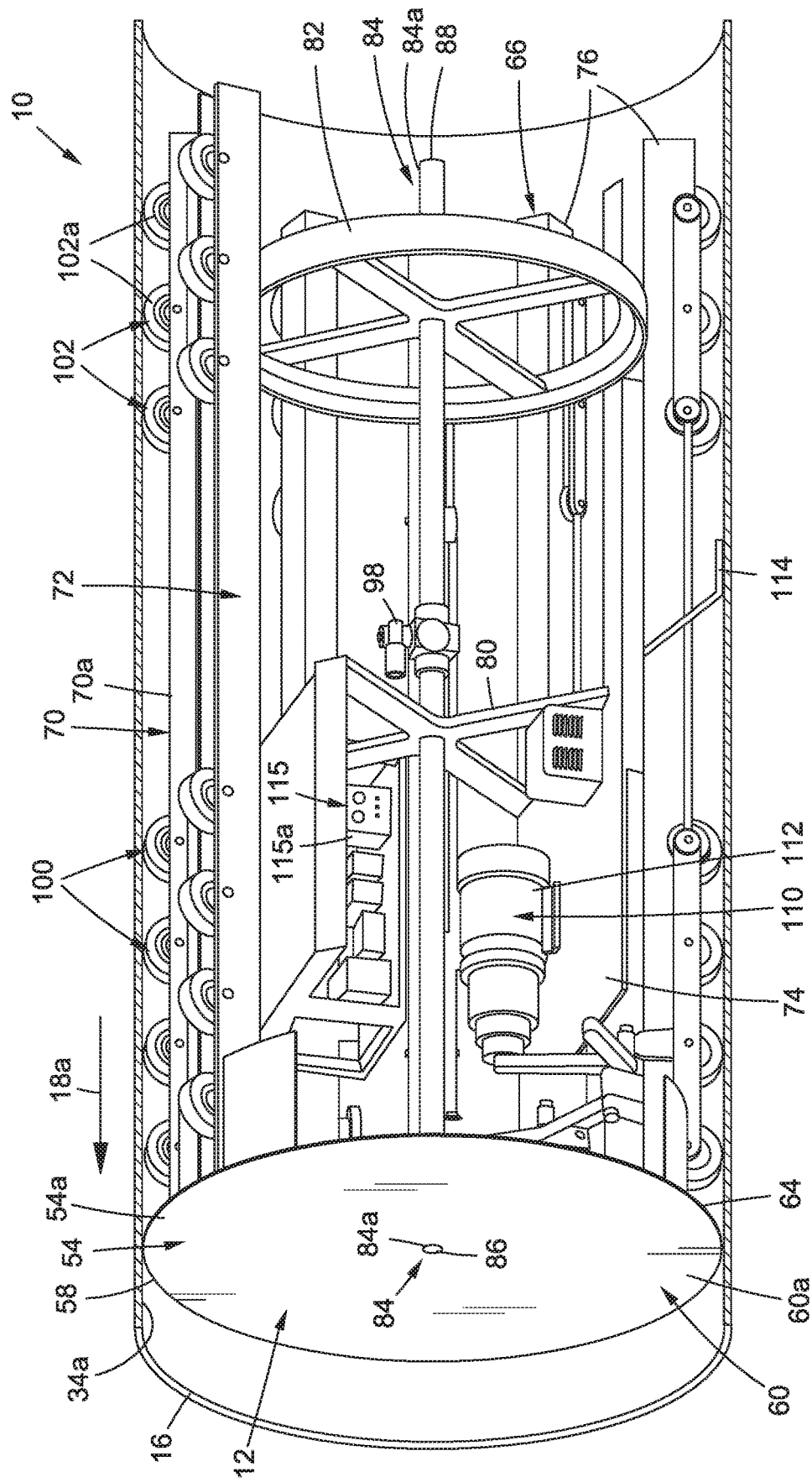
FIG. 2F is an illustration of a front side isometric view of the vacuum transport tube vehicle of FIG. 2B.

FIG. 2B is an illustration of an enlarged sectional side view of the circle 2B portion of the vacuum transport tube vehicle 12 of FIG. 2A in the interior 32*a* of the vacuum transport tube 16. FIG. 2C is an illustration of a cross-sectional view of the vacuum transport tube vehicle 12, taken along lines 2C-2C of FIG. 2B. FIG. 2D is an illustration of a cross-sectional view of the vacuum transport tube vehicle 12, taken along lines 2D-2D of FIG. 2B. FIG. 2E is an illustration of a back side isometric view of the vacuum transport tube vehicle 12 of FIG. 2B. FIG. 2F is an illustration of a front side isometric view of the vacuum transport tube vehicle 12 of FIG. 2B.

As shown in FIGS. 2B, 2C, 2E, 2F, the vacuum transport tube vehicle 12 has a first end 54. FIG. 2B shows the first end 54 facing the forward space 44 having the forward pressure ($P_{fwd}$) 46. The first end 54 (see FIGS. 2B, 2C, 2E, 2F) preferably comprises, and is preferably in the form of, a piston head 54*a* (see FIGS. 2B, 2C, 2E, 2F). The first end 54 (see FIG. 2B, 2C), such as in the form of piston head 54*a* (see FIGS. 2B, 2C), has a first end outer diameter 56 (see FIGS. 2B, 2C) and a first end outer surface 58 (see FIGS. 2B, 2E, 2F), such as an exterior side outer surface. As shown in FIG. 2C, the piston head 54*a* has a piston head area ($A_{piston\ head}$) 59 representing the area of the piston head 54*a*.

The first end 54 (see FIG. 2B), such as in the form of piston head 54*a* (see FIG. 2B), has a forward surface 60 (see FIGS. 2B, 2F) and an aft surface 61 (see FIGS. 2B, 2E). The forward surface 60 (see FIG. 2B) has a side profile 62 (see FIG. 2B). The forward surface 60 (see FIG. 2B) may comprise a flat forward surface 60*a* (see FIGS. 2B, 2F, 16) with a flat side profile 62*a* (see FIGS. 2B, 16); a curved forward surface 60*b* (see FIG. 16) with a curved side profile 62*b* (see FIG. 16), such as including, a convex forward surface 60*c* (see FIG. 16) with a convex side profile 62*c* (see FIG. 16), or a concave forward surface 60*d* (see FIG. 16) with a concave side profile 62*d* (see FIG. 16); or the forward surface 60 may comprise another suitable forward surface with a suitable side profile. Preferably, the flat forward surface 60*a* (see FIG. 2F) is a circular shape 64 (see FIG. 2F). However, the forward surface 60 may comprise another suitable shape.

The first end outer diameter 56 (see FIGS. 2B, 2C) of the first end 54 may vary in length and preferably comprises a length 56*a* (see FIGS. 2B, 16) that extends in a range of about 0.25 inch to about 1.0 inch from the inner surface 34*a* (see FIGS. 2B, 2E, 2F) of the vacuum transport tube 16 (see FIGS. 2B, 2E, 2F), when the vacuum transport tube vehicle 12 moves or travels through the vacuum transport tube 16.

As shown in FIGS. 2B, 2D-2F, the vacuum transport tube vehicle 12 further comprises a second end 66. The second end 66 has a second end outer diameter 68 (see FIG. 2B) and a second end outer surface 69 (see FIG. 2B). A length 68*a* (see FIGS. 2B, 16) of the second end outer diameter 68 (see FIG. 2B) is preferably less than, or smaller than, the length 56*a* (see FIG. 2B) of the first end outer diameter 56 (see FIG. 2B).

As shown in FIGS. 2B, 2D-2F, the vacuum transport tube vehicle 12 further comprises a body 70 disposed between the first end 54 and the second end 66. The body 70 preferably comprises, and is preferably in the form of, a piston 70*a* (see FIGS. 2B, 2D-2F). The vacuum transport tube vehicle 12 (see FIG. 2A) functions like a piston inside the vacuum transport tube 16 (see FIG. 2A) and enables the economic and quick evacuation 41 (see FIG. 16) of the vacuum transport tube 16 over the route length 36 (see FIG. 2A) of the vacuum transport tube route 38 (see FIG. 2A). In turn, the vacuum transport tube 16 functions like a cylinder of a very large pump that is miles long, e.g., 400 miles long, or more.

As shown in FIGS. 2B, 2D-2F, preferably, the body 70, such as in the form of piston 70*a*, has a structural framework 72. In one embodiment, as shown in FIGS. 2B, 2D-2F, the structural framework 72 preferably comprises a plurality of stiffened panels 74, a plurality of longitudinal stiffener members 76, one or more brace members 78, one or more cross support members 80, and one or more circumferential frame members 82. However, the structural framework 72 may comprise other suitable structural parts. The structural framework 72 (see FIGS. 2B, 2D-2F) may be made of steel or another strong and sturdy material and provides stiffness and strength to withstand the delta pressure 52 (see FIGS. 11A-11B, 16), or pressure differential, formed between the upstream air 40a (see FIG. 2A) in front of the vacuum transport tube vehicle 12 (see FIG. 2A) and the downstream air 40b (see FIG. 2A) behind the vacuum transport tube vehicle 12.

As shown in FIGS. 2B-2F, the vacuum transport tube vehicle 12 further comprises at least one orifice 84. The at least one orifice 84 (see FIGS. 2B-2F) preferably comprises, and is preferably in the form of, a passageway 84a (see FIGS. 2B-2F), extending from a first inlet portion 86 (FIGS. 2B-2D, 2F) in the first end 54 through to a second outlet portion 88 (see FIGS. 2B, 2D-2F) of the vacuum transport tube vehicle 12. The second outlet portion 88 is positioned aft of the first inlet portion 86. In one embodiment as shown in FIGS. 2B, 2DE, 2F, the at least one orifice 84, such as in the form of passageway 84, extends from the first inlet portion 86 in the first end 54, through the body 70, and to the second outlet portion 88 formed at the second end 66 of the vacuum transport tube vehicle 12. As shown in FIG. 2B, the at least one orifice 84 is configured to allow air 40, such as upstream air 40a, to flow from the forward space 44 in front of the vacuum transport tube vehicle 12, through the body 70, to the aft space 48 behind the vacuum transport tube vehicle 12, as orifice exhaust 90, such as downstream air 40b. In other embodiments, the second outlet portion 88 may comprise outlets, slots, or other passageways formed along the body 70, or located at the side of the body 70, or located at another suitable location at the second end 66.

As shown in FIGS. 2C, 2D, the orifice 84 preferably has an orifice diameter 92. The orifice diameter 92 is preferably variable and may vary in size and may be configurable based on, a desired speed 94 (see FIG. 16) and a desired power 96 (see FIGS. 12A-12B) of the vacuum transport tube vehicle 12. As shown in FIG. 2C, the orifice 84 has an orifice area ($A_{orifice}$) 99 representing the area of the orifice 84.

The flow of air 40 (see FIG. 2B) through the orifice 84 (see FIGS. 2B, 2C), such as in the form of passageway 84a (see FIGS. 2B, 2C), may be regulated or controlled by one or more flow regulating valves 98 (see FIGS. 2B, 2E, 2F) coupled to the orifice 84, such as in the form of passageway 84a, to regulate or control the flow of air 40 (see FIG. 2B) through the orifice 84, such as in the form of passageway 84a, from the forward space 44 (see FIG. 2B) to the aft space 48 (see FIG. 2B). The flow of air 40 may also be regulated or controlled with other suitable flow altering or flow regulating devices known in the art. For example, a valve, a slot, or a variable area inlet may be used to control the mass flow of air 40 (see FIG. 2B) through the orifice 84 (see FIG. 2C). Other methods of controlling the amount of air flow through the orifice 84 (see FIG. 2B) may also be employed. The amount of air flow through the orifice 84 (see FIG. 2B) may be governed by the power required 96c (see FIGS. 12A-12B, 16) and/or the speed 94 (see FIG. 16) of the vacuum transport tube vehicle 12. Sensors that monitor the power 96 (see FIG. 16) used by an electric motor 112 (see FIG. 2B), or the speed 94 (see FIG. 16) of the vacuum transport tube vehicle 12, may be employed to provide this information to a drive assembly 100 (see FIGS. 2B, 16) and/or to a control system 115 (see FIGS. 2B, 2E, 2F, 16), with one or more controllers 115a (see FIGS. 2B, 2E, 16) used to control the vacuum transport tube vehicle 12, such as a remotely controlled control system with sensors, wireless controls, and other suitable components.

As shown in FIGS. 2B, 2D-2F, the vacuum transport tube vehicle 12 further comprises a drive assembly 100. The drive assembly 100 (see FIGS. 2B, 2D-2F) is coupled to the body 70 for driving the vacuum transport tube vehicle 12 through the vacuum transport tube 16. In one embodiment, the drive assembly 100 (see FIGS. 2B, 2D-2F) comprises a plurality of drive wheels 102 (see FIGS. 2B, 2D-2F) arranged in a circumferential arrangement 104 (see FIG. 2D) around the body 70, such as in the form of piston 70a. As shown in FIG. 2D, the drive wheels 102 are secured within and partially surrounded by the plurality of longitudinal stiffener members 76 and may be connected or joined together via connector elements 106, such as metal cables, or another suitable connector element.

The plurality of drive wheels 102 (see FIGS. 2B, 2D-2F) preferably comprise, and are preferably in the form of, a plurality of tires 102a (see FIGS. 2B, 2D-2F), such as durable rubber tires, or another suitable type of tire. The drive wheels 102 (see FIGS. 2B, 2D-2F), such as in the form of tires 102a (see FIGS. 2B, 2D-2F), may be spring loaded to provide some flexibility to account for variations in the radius of the interior 32a (see FIG. 2A) of the vacuum transport tube 16 (see FIG. 2A). This flexibility may also be beneficial to allow the vacuum transport tube vehicle 12 to negotiate curves along the vacuum transport tube route 38 (see FIG. 2A).

FIG. 2D shows twelve (12) rows of drive wheels 102, such as in the form of tires 102a, in the circumferential arrangement 104, and FIGS. 2B, 2E, 2F show seven (7) drive wheels 102 in a row of drive wheels 102, such as in the form of tires 102a, for a total number of eighty-four (84) drive wheels 102 in the drive assembly 100 of the vacuum transport tube vehicle 12 of FIGS. 2A-2F. However, the number of drive wheels 102 used may be more or less. The large number of drive wheels 102, such as in the form of tires 102a, minimizes or reduces the individual loading on each tire. Reduced loading on each drive wheel 102, such as in the form of tire 102a, may also result in reduced radial loading of each drive wheel 102, such as in the form of tire 102a, upon the vacuum transport tube 16, which, in turn, may reduce circumferential bending stresses in the vacuum transport tube 16.

The structural framework 72 (see FIGS. 2B, 2D-2F) connects the body 70 (see FIGS. 2B, 2D-2F), such as in the form of piston 70a (see FIGS. 2B, 2D-2F), to the drive assembly 100 (see FIGS. 2B, 2D-2F), such as in the form of drive wheels 102 (see FIGS. 2B, 2D-2F), which contact the inner surface 34a (see FIG. 2B) of the vacuum transport tube 16 (see FIG. 2B). One or more of the plurality of drive wheels 102 (see FIG. 2E) may contact the inner surface 34a (see FIG. 2E) of the vacuum transport tube 16 (see FIG. 2E), when the vacuum transport tube vehicle 12 travels through the vacuum transport tube 16.

Alternatively, in another embodiment, the drive assembly 100 (see FIG. 16) comprises a magnetic levitation (mag-lev) propulsion system 24 (see FIGS. 1B, 16). As discussed above, and as shown in FIG. 1B, the magnetic levitation (mag-lev) propulsion system 24 (see also FIG. 16) may comprise a plurality of guide magnets 26 and a plurality of vehicle magnets 28 to create both lift and substantially frictionless propulsion to move the vacuum transport tube vehicle 12 through the vacuum transport tube 16. As shown in FIG. 2D, the magnetic levitation (mag-lev) propulsion system 24 may be installed in an area 108 along the bottom of the vacuum transport tube vehicle 12, and the magnetic levitation (mag-lev) propulsion system 24 (see FIG. 16) may be used to drive or propel the vacuum transport tube vehicle 12, instead of the drive wheels 102.

As shown in FIGS. 2B, 2D-2F, the vacuum transport tube vehicle 12 further comprises a power system 110 coupled to the drive assembly 100 for powering the drive assembly 100. In one embodiment, as shown in FIGS. 2B, 2D-2D, the power system 110 preferably comprises one or more electric motors 112 coupled to one or more of the plurality of drive wheels 102. However, the power system 110 may also comprise another suitable motor or power source. As shown in FIGS. 2B, 2D-2F, one electric motor 112 supplies power to all of the plurality of drive wheels 102. Alternatively, in another embodiment, a single electric motor 112 may be located and used adjacent to each drive wheel 102.

As shown in FIGS. 2B, 2E, 2F, the vacuum transport tube vehicle 12 may further comprise electrical power pick-up elements 114 attached to the electric motor 112 of the power system 110. The electrical power pick-up elements 114 (see FIG. 2B) are separate from the magnetic levitation (mag-lev) propulsion system 24 (see FIG. 1B).

The vacuum transport tube vehicle 12 (see FIG. 2B) may further comprise a control system 115 (see FIGS. 2A, 2E, 2F, 16) with one or more controllers 115a (see FIGS. 2A, 2E, 2F, 16) for controlling the vacuum transport tube vehicle 12, such as a remotely controlled control system with sensors, wireless controls, and other suitable components. However, the vacuum transport tube vehicle 12 (see FIG. 2B) may be autonomous or self-driving as well, or may be autonomous with a manual override option from a central control facility or hardware.

The vacuum transport tube vehicle 12 (see FIGS. 2A, 2B) moves or travels through the vacuum transport tube 16 (see FIGS. 2A, 2B) and evacuates the vacuum transport tube 16, such as evacuates air 40 (see FIGS. 2A, 2B) from the vacuum transport tube 16, to create and maintain a vacuum 42 (see FIG. 16) within the interior 32a (see FIG. 2A) of the vacuum transport tube 16. The vacuum transport tube vehicle 12 does not use any pressure seals to prevent the air 40 (see FIG. 2B) from escaping past the vacuum transport tube vehicle 12, but instead, is constructed such that the annular gap 116 (see FIG. 2B), or interface 192 (see FIG. 16), formed between the first end outer surface 58 (see FIGS. 2B, 2F) at the first end 54 (see FIGS. 2B, 2F) of the vacuum transport tube vehicle 12 (see FIG. 2B) and the inner surface 34a (see FIG. 2b) of the vacuum transport tube 16 (see FIG. 2B), allows only a small amount of air 40 (see FIG. 2B) past the vacuum transport tube vehicle 12 from the forward space 44 (see FIG. 2b) to the aft space 48 (see FIG. 2B). The vacuum transport tube vehicle 12 (see FIG. 2B) also has the orifice 84 (see FIGS. 2B, 2C) that allows even more air 40 (see FIG. 2B) to escape from the forward space 44 (see FIG. 2B) at the front of the vacuum transport tube vehicle 12 to the aft space 48 (see FIG. 2B) behind or aft of the vacuum transport tube vehicle 12.

The annular gap 116 (see FIGS. 2B, 2C) has a gap distance 118 (see FIG. 2C) that is variable and is directly proportional to the length of the orifice diameter 92 (see FIG. 2C). Preferably, the annular gap 116 has a gap distance 118 (see FIG. 2C) in a range of about 0.25 inch to 1.0 (one) inch between the inner surface 34a (see FIG. 2C) of the vacuum transport tube 16 (see FIG. 2C) and the first end outer surface 58 (see FIG. 2C) at the first end 54 (see FIG. 2C) of the vacuum transport tube vehicle 12 (see FIG. 2B), when the vacuum transport tube vehicle 12 is within the vacuum transport tube 16 (see FIGS. 2B, 2C). As shown in FIG. 2C, the annular gap 116 also has a gap area ($A_{gap}$) 120, which is the cross-sectional area of the annular gap 116 between the inner surface 34a of the vacuum transport tube 16 and the first end outer surface 58 of the first end 54 of the vacuum transport tube vehicle 12.

The vacuum transport tube vehicle 12 (see FIGS. 2A, 2B) preferably evacuates the vacuum transport tube 16 (see FIGS. 2A, 2B) by reducing pressure 43 (see FIG. 16) in the interior 32a (see FIG. 2A) of the vacuum transport tube 16 with each successive vehicle pass 53 (see FIG. 16) through the vacuum transport tube 16, until a desired pressure 43a (see FIG. 16) is obtained and a vacuum 42 (see FIG. 16) is created in the interior 32a of the vacuum transport tube 16.

As discussed in further detail below in connection with FIG. 16, the vacuum transport tube vehicle system 10 may comprise one or more vacuum transport tube vehicles 12. Preferably, the vacuum transport tube vehicle system 10 (see FIG. 16) comprises an amount of ten (10) vacuum transport tube vehicles 12 to twenty (20) vacuum transport tube vehicles 12, installed or arranged in series, or in succession, within the vacuum transport tube 16. More preferably, the vacuum transport tube vehicle system 10 (see FIG. 16) comprises an amount of three (3) vacuum transport tube vehicles 12 to twenty (20) vacuum transport tube vehicles 12, installed or arranged in series, or in succession, within the vacuum transport tube 16. However, the vacuum transport tube vehicle system 10 may comprise a single vacuum transport tube vehicle 12 that makes multiple vehicle passes 53 (see FIG. 16) through the vacuum transport tube 16, or may comprise any combination of 2 to 20, or more, vacuum transport tube vehicles 12, or cars 13, each making one or more vehicle passes 53 (see FIG. 16) through the vacuum transport tube 16. In the present disclosure, the phrase "arranged in series" means that there are multiple vacuum transport tube vehicles 12 (connected or unconnected to each other) moving through at overlapping times through the vacuum transport tube 16. The phrase "in succession" means that there is just one vacuum transport tube vehicle 12 at a time moving through the vacuum transport tube 16

FIGS. 3A-5B show various operations 130 of the vacuum transport tube vehicle system 10 having a plurality of vacuum transport tube vehicles 12, such as in the form of ten (10) cars 13, numbered 1-10, within the vacuum transport tube 16.

Figure 3A:
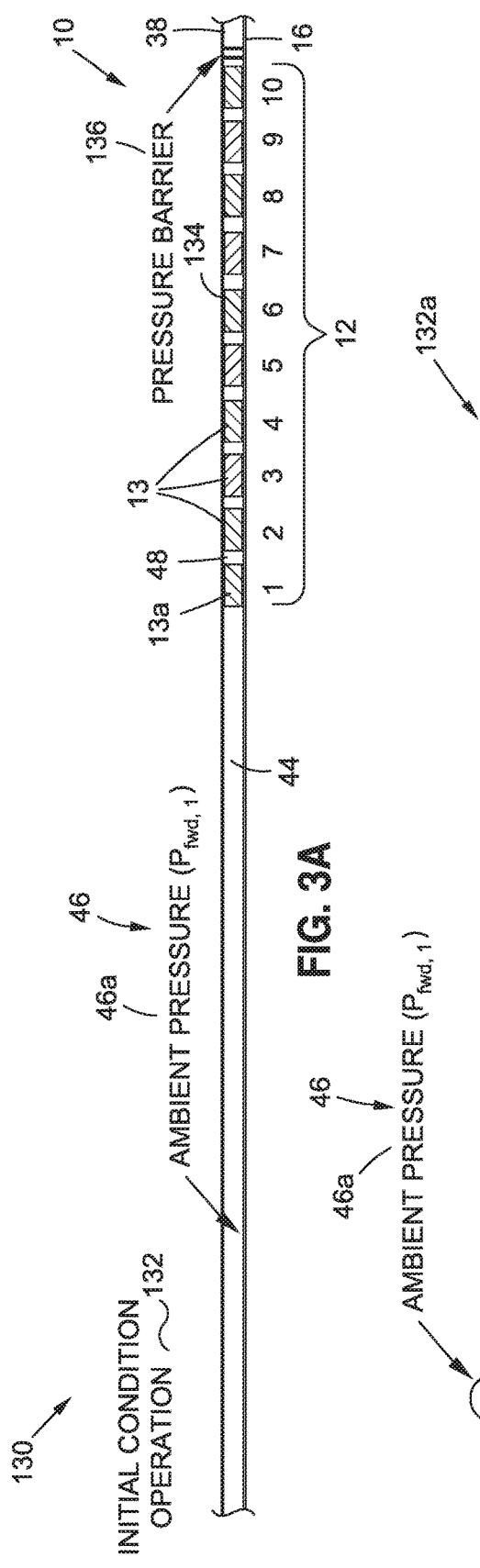
FIG. 3A is a schematic illustration of an initial condition operation of the vacuum transport tube vehicle system of the disclosure.

FIG. 3A is a schematic illustration of an operation 130 of an initial condition operation 132 of an embodiment of the vacuum transport tube vehicle system 10 of the disclosure. As shown in FIG. 3A, the vacuum transport tube vehicle system 10 comprises ten (10) vacuum transport tube vehicles 12, such as in the form of ten (10) cars 13, numbered 1-10, which are positioned in a right end-most portion 134 of the vacuum transport tube 16 of the vacuum transport tube route 38. A pressure barrier 136 is positioned behind the last of the ten (10) cars 13. As shown in FIG. 3A, the vacuum transport tube 16 has a forward pressure ($P_{fwd, 1}$) 46, in the form of an ambient air pressure 46a, in the forward space 44 inside the vacuum transport tube 16, in front of the first car 13a. An aft space 48 (see FIG. 3A) is behind the first car 13a, and behind each successive car 13.

Figure 3B:
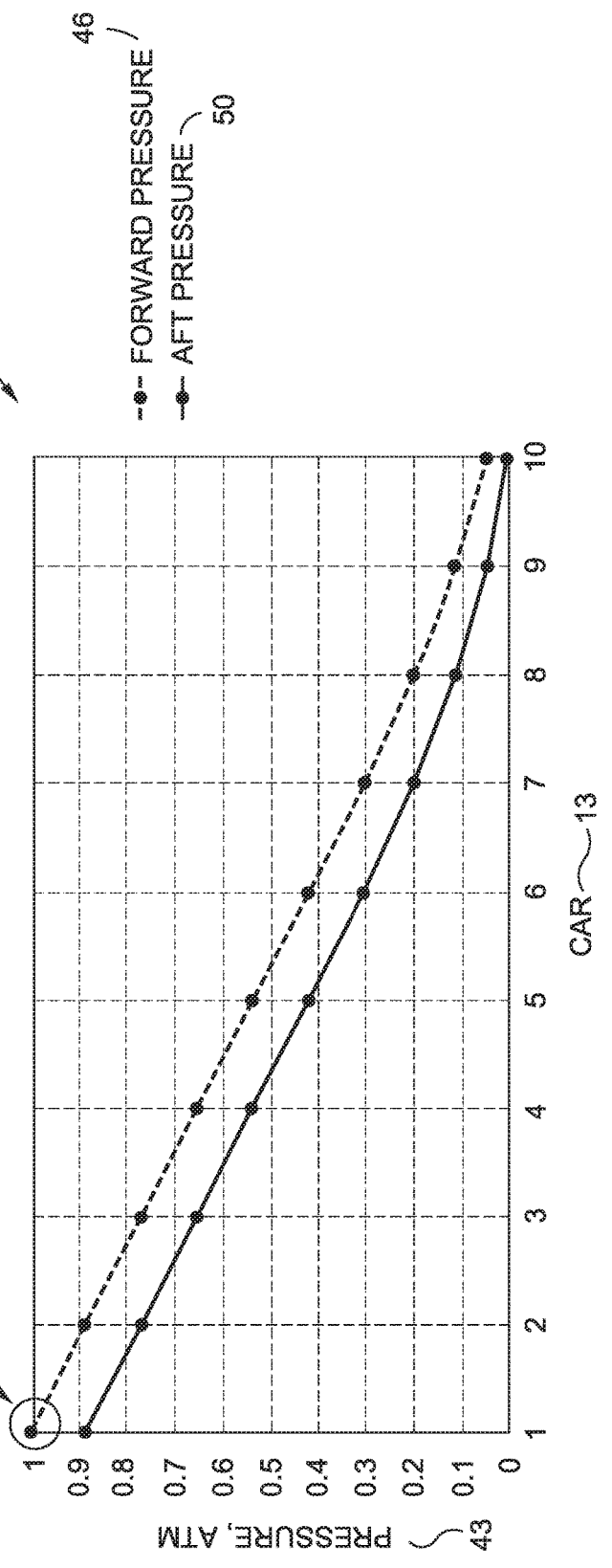
FIG. 3B is an illustration of an initial condition operation graph showing a pressure in front of and behind each car in the initial condition operation of FIG. 3A.

FIG. 3B is an illustration of an initial condition operation graph 132a showing the pressure 43 in front of and behind each of the 1-10 cars 13 in the initial condition operation 132 of FIG. 3A. The initial condition operation graph 132a shows plots of the forward pressure ($P_{fwd}$) 46, such as in the form of ambient air pressure 46a, in front of each car 13, and shows plots of the aft pressure 50 behind each car 13.

FIG. 4A is a schematic illustration of an operation 130 of a first car moving operation 138 of an embodiment of the vacuum transport tube vehicle system 10 of the disclosure. FIG. 4A shows the vacuum transport tube vehicle system 10 comprising ten (10) vacuum transport tube vehicles 12, such as in the form of ten (10) cars 13, numbered 1-10, positioned in the vacuum transport tube 16 of the vacuum transport tube route 38 with the pressure barrier 136 positioned behind the last of the ten (10) cars 13.

As shown in FIG. 4A, a first car 13a has started moving in a forward direction of travel 18a. FIG. 4A shows the forward pressure ($P_{fwd, 1}$) 46, in the form of ambient air pressure 46a, in the forward space 44 inside the vacuum transport tube 16, in front of the first car 13a, and shows the forward pressure ($P_{fwd, 2}$) 46, in front of the second car 13b. FIG. 4A further shows the aft pressure ($P_{aft, 1}$) 50 in the aft space 48 behind the first car 13a. FIG. 4A shows the aft pressure ($P_{aft, 1}$) 50, behind the first car 13a being equal to a forward pressure ($P_{fwd, 2}$) 46, in front of the second car 13b.

Because the upstream air 40a (see FIG. 4A) in the forward space 44 (see FIG. 4A) flowing past the annular gap 116 (see FIG. 4A) of the first car 13a (see FIG. 4A) is not sufficient to completely replace the downstream air 40b (see FIG. 4A) in the aft space 48 (see FIG. 4A) behind the first car 13a, the aft pressure ($P_{aft, 1}$) 50 (see FIG. 4A) behind the first car 13a is lower than the forward pressure ($P_{fwd, 1}$) 46, in front of the first car 13a. The aft pressure ($P_{aft}$) 50 (see FIG. 4B) of each vacuum transport tube vehicle 12, such as the first car 13a and each successive car 13, depends upon the size of the gap distance 118 (see FIG. 2C) and the gap area 120 (see FIG. 2C) of the annular gap 116 (see FIGS. 2C, 4A), and the forward speed 94c (see FIG. 16) of the vacuum transport tube vehicle 12, such as the first car 13a and each successive car 13. The forward speed 94c of one or more of the cars 13 may be the same or different. Equations describing the relationship of the aft pressure ($P_{aft}$) 50 of the vacuum transport tube vehicle 12 and those quantities are discussed in connection with EXAMPLE 1 below.

FIG. 4B is an illustration of a first car moving operation graph 138a showing the pressure 43 in front of and behind each of the 1-10 cars 13 in the first car moving operation 138 of FIG. 4A. The first car moving operation graph 138a shows a plot for the forward pressure ($P_{fwd, 1}$) 46, such as in the form of ambient air pressure 46a, in front of the first car 13a, shows plots for the forward pressure ($P_{fwd}$) 46 in front of each successive car 13, shows a plot for the aft pressure ($P_{aft, 1}$) 50, behind the first car 13a, and shows plots for the aft pressure ($P_{aft}$) 50 behind each successive car 13. FIGS. 4A-4B show the aft pressure ($P_{aft, 1}$) 50, behind the first car 13a, being equal to the forward pressure ($P_{fwd, 2}$) 46, in front of the second car 13b.

FIG. 5A is a schematic illustration of an operation 130 of a second car moving operation 140 of an embodiment of the vacuum transport tube vehicle system 10 of the disclosure. FIG. 5A shows the vacuum transport tube vehicle system 10 comprising ten (10) vacuum transport tube vehicles 12, such as in the form of ten (10) cars 13, numbered 1-10, positioned in the vacuum transport tube 16 of the vacuum transport tube route 38 with the pressure barrier 136 positioned behind all of the ten (10) cars 13.

FIG. 5A shows the first car 13a and the second car 13b both moving in a forward direction of travel 18a. FIG. 5A shows the forward pressure ($P_{fwd, 1}$) 46, in the form of ambient air pressure 46a, in the forward space 44 inside the vacuum transport tube 16, in front of the first car 13a, and shows the forward pressure ($P_{fwd, 2}$) 46, in the forward space 44 in front of the second car 13b, and shows the forward pressure ($P_{fwd, 3}$) 46, in the forward space 44 in front of a third car 13c. FIG. 5A further shows the aft pressure ($P_{aft, 1}$) 50 in the aft space 48 behind the first car 13a, and shows the aft pressure ($P_{aft, 2}$) 50 in the aft space 48 behind the second car 13b.

FIG. 5A shows the second car 13b moving some distance behind the first car 13a. The second car 13b further reduces the aft pressure ($P_{aft, 2}$) 50 behind the second car 13b, relative to the forward pressure ($P_{fwd, 2}$) 46 in front of the second car 13b, with the result that the aft pressure ($P_{aft, 2}$) 50 behind the second car 13b is further reduced from the aft pressure ($P_{aft, 1}$) 50 behind the first car 13a. With each successive car 13 (and successive vehicle pass 53 (see FIG. 16) of each car 13), the pressure 43 (see FIG. 5B) is further reduced aft of the series of cars 13. The number of cars 13 used depends on the desired quality of vacuum 42 (see FIG. 16) to be achieved.

FIG. 5B is an illustration of a second car moving operation graph 140a showing the pressure 43 in front of and behind each of the 1-10 cars 13 in the second car moving operation 140 of FIG. 5A. The second car moving operation graph 140a shows plots of forward pressure 46 in front of each of the 1-10 cars 13, and shows plots of aft pressure 50 behind each of the 1-10 cars 13. FIG. 5A shows the aft pressure ($P_{aft, 1}$) 50, behind the first car 13a being equal to the forward pressure ($P_{fwd, 2}$) 46, in front of the second car 13b. FIGS. 5A and 5B show the aft pressure ($P_{aft, 2}$) 50 behind the second car 13b being equal to the forward pressure ($P_{fwd, 3}$) 46 in front of the third car 13c.

EXAMPLES

Various examples are discussed below with respect to operation of embodiments of the vacuum transport tube vehicle 12 and the vacuum transport tube vehicle system 10 disclosed herein.

Example 1

Figure 6:
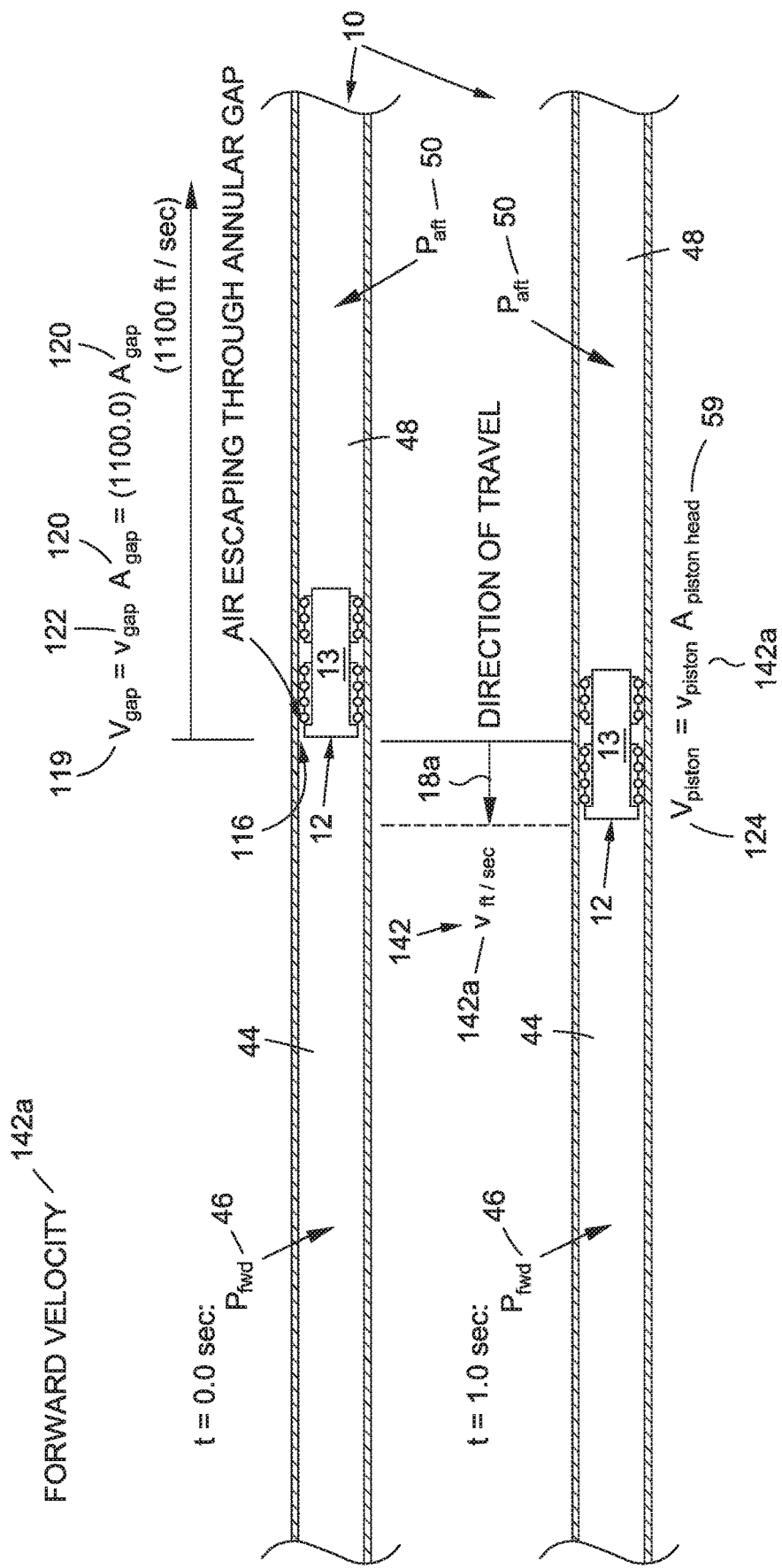
FIG. 6 is a schematic illustration of a forward velocity through a vacuum transport tube of a vacuum transport tube vehicle of the disclosure.
Figure 7:
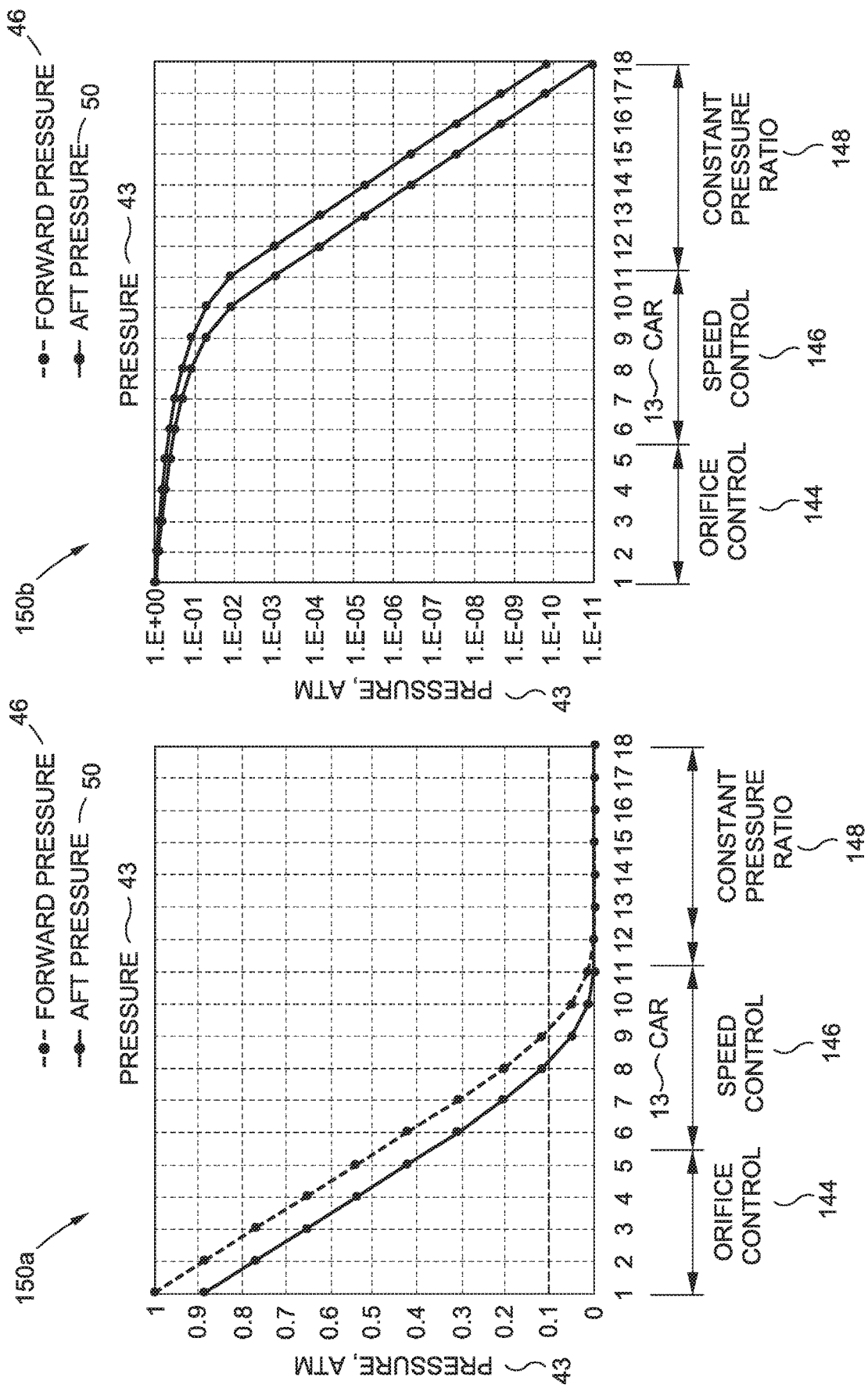
FIG. 7A is an illustration of a linear scale pressure graph showing forward pressure and aft pressure for each car of an embodiment of the vacuum transport tube vehicle system of the disclosure.
FIG. 7B is an illustration of a logarithmic scale pressure graph showing forward pressure and aft pressure for each car of an embodiment of the vacuum transport tube vehicle system of the disclosure.

FIG. 6 is a schematic illustration of a velocity 142, such as a forward velocity 142a, from 0 (zero) second to 1 (one) second, through the vacuum transport tube 16, for an embodiment of a vacuum transport tube vehicle 12, such as a car 13, of an embodiment of the vacuum transport tube vehicle system 10 of the disclosure. FIG. 6, as well as FIG. 2C, shows the quantities that may be used to calculate the pressures 43 (see FIGS. 7A-7B), such as the forward pressure ($P_{fwd}$) 46 and the aft pressure ($P_{aft}$) 50.

The following example was prepared to illustrate the concept.

The gap area ($A_{gap}$) 120 (see FIGS. 2C, 6) was the gap distance (d) 118 (see FIG. 2C) multiplied by a perimeter 35 (see FIG. 16) of the vacuum transport tube vehicle 12. For a vacuum transport tube inner diameter 31 (see FIGS. 2C, 16) equal to 14.0 feet and a gap distance 118 (see FIG. 2C) of 0.25 inches (0.020833 ft), the gap area 120 (see FIG. 2C) was 0.916 square feet.

$$A_{gap} = (\pi)(D)(d) = (3.14159)(14.0)(0.020833) = 0.916 \text{ ft}^2$$

The piston head area ($A_{piston\ head}$) 59 (see FIG. 2C) was given by the following equation:

$$A_{piston\ head} = (\pi)(D^2/4) = (\pi)((14.0)^2/4) = 153.94 \text{ ft}^2$$

The gap volume ($V_{gap}$) 119 (see FIG. 6) of air 40 (see FIG. 2A) that escaped through the annular gap 116 (see FIG. 2C) to the aft space 44 (see FIG. 2A) behind the vacuum transport tube vehicle 12 (see FIG. 2A) was given by the following equation.

$$V_{gap} = v_{gap} A_{gap} = (1100.0)(0.916) = 1007.6 \text{ ft}^3/\text{sec}$$

Two conservative assumptions were made in the formulation of $V_{gap} = v_{gap} A_{gap}$. The first assumption was that there was sonic flow occurring in the annular gap 116 (see FIGS. 2B, 2C). Although this may be accurate if the forward pressure ($P_{fwd}$) 46 was in the form of ambient air pressure 46a, and the aft pressure ($P_{aft}$) 50 of the vacuum transport tube vehicle 12 was a near vacuum, it would likely overestimate the velocity of the flow, if the difference in pressure between the forward volume (or space) and the aft volume (or space) was quite small.

The second assumption was that temperature of the air flow was not considered. Since the air 40 (see FIG. 2A) escaping into the aft space 48 (see FIG. 2A) behind the vacuum transport tube vehicle 12 (see FIG. 2A) would be cooled by the decompression, and the Mach number would consequently reduce, the velocity would also reduce. If a more accurate calculation was performed, it may result in one or two less vacuum transport tube vehicles 12 being required to achieve a given vacuum.

If the forward velocity ($v_{piston}$) 142a (see FIG. 6) of the vacuum transport tube vehicle 12 was equal to 8.93 ft/sec, the piston volume ($V_{piston}$) 124 (see FIG. 6) swept by the vacuum transport tube vehicle 12 was given by the following equation:

$$V_{piston} = (v_{piston})(A_{piston\ head}) = (8.93)(153.94) = 1375.1\ \text{ft}^3/\text{sec}$$

These quantities are illustrated in FIG. 6. Although the operating conditions (the car velocity, the delta pressure, etc.) may be changing over time, for a steady state condition, the ratio of pressures (r) between the forward space 44 (see FIG. 6) in front of the vacuum transport tube vehicle 12 (see FIG. 6) and the aft space 48 (see FIG. 6) behind the vacuum transport tube vehicle 12 was given by the following equation:

$$r = V_{gap}/V_{piston} = 1007.6/1375.1 = 0.733$$

If, for example, the forward pressure ($P_{fwd}$) 46 (see FIG. 6) of the vacuum transport tube vehicle 12 (see FIG. 6) was equal to 6.24 psi, the aft pressure ($P_{aft}$) 50 (see FIG. 6) of the vacuum transport tube vehicle 12 was equal to 4.57 psi (pounds per square inch):

$$P_{aft} = (r)(P_{fwd}) = (0.733)(6.24) = 4.57\ \text{psi}$$

The delta pressure 52 (see FIGS. 11A, 16) was given by the following equation:

$$\Delta P = P_{fwd} - P_{aft} = P_{fwd}(1-r) = 1.67\ \text{psi} = 240.0\ \text{psf}$$
(pounds per square foot)

The amount of force 126 (see FIG. 16) required of the drive assembly 100 (see FIG. 2B) to move the vacuum transport tube vehicle 12 forward was given by the delta pressure 52 (see FIG. 11A) multiplied by the piston head area ($A_{piston\ head}$) 59 (see FIGS. 2C, 6).

$$F = (\Delta P)(A_{piston\ head}) = (240.0)(153.94) = 36{,}943\ \text{lb}$$
(pounds)

The amount of power required 96c (see FIGS. 12A, 16) was given by the force (F) multiplied by the velocity ($v_{piston}$):

$$P = (F)(v_{piston}) = (36{,}943)(8.93) = 333{,}000\ \text{ft-lb/sec} = 600\ \text{hp (horsepower)}$$

That the power required 96c (see FIG. 12A) came out to exactly 600 hp (horsepower) showed that the velocity of 8.83 ft/sec was not arbitrary. This was indeed the case. The speed was chosen so as to make the example use a 600 hp motor.

Example 2

The operation of the vacuum transport tube vehicle 12 falls into three regimes, including orifice control 144 (see FIGS. 7A-13), speed control 146 (see FIGS. 7A-13), and constant pressure ratio 148 (see FIGS. 7A-13).

With respect to orifice control 144 (see FIGS. 7A-13), when starting out at ambient air pressure 46a (see FIG. 3A), it is the case that using an annular gap 116 (see FIG. 2C) of only 0.25 inches results in a large delta pressure 52 (see FIGS. 11A-11B), or pressure differential, between the forward space 44, i.e., forward volume, and the aft space 48, i.e., aft volume. A large delta pressure 52, or pressure differential, may result in a large force being applied to the forward surface 60 (see FIG. 2B) of the vacuum transport tube vehicle 12 (see FIG. 2B). If a horsepower is limited to a certain value, this forces the speed of the vacuum transport tube vehicle 12, such as the first car 13a (see FIG. 4A) to be quite slow, perhaps 2 ft/sec (two feet per second) or 3 ft/sec (three feet per second). For a long vacuum transport tube route 38 (see FIG. 2A), for example, a 400 mile route, this would result in a travel time 169 (see FIG. 13) for the first car 13a, of at least one (1) week, which may not be desired. A way to resolve this situation is to provide an orifice 84 (see FIGS. 2C, 2F) in the forward surface 60 (see FIGS. 2C, 2F) of the first end 54 (see FIG. 2B) of the vacuum transport tube vehicle 12 (see FIGS. 2B, 2F) that increases the area available for the air 40 (see FIG. 2A) to escape into the aft space 48 (see FIG. 2A), i.e., aft volume, aft of or behind the vacuum transport tube vehicle 12. This way, the speed 94 (see FIG. 16) of the first car 13a or set of first cars may be set to an arbitrary acceptable value. By rewriting equations:

$$V_{piston} = (v_{piston})(A_{piston\ head})\ \text{and}\ r = V_{gap}/V_{piston}$$

to include the orifice area ($A_{orifice}$) 99 (see FIG. 2C), the orifice diameter 92 (see FIG. 2C) may be set so that the power and speed requirements are met. With the power and speed provided, the equations from Example 1 may be rewritten as follows in this Example 2. In this Example 2, the conditions for the first car 13a (see FIG. 4A) were ambient air pressure 46a (see FIG. 4A) in front of the first car 13a (see FIG. 4A), a forward speed 94c (see FIG. 16) of 6 mph (8.8 ft/sec), and a 600 hp (horsepower) propulsion system. For a route length 36 (see FIG. 2A) of the vacuum transport tube route 38 (see FIG. 2A) of 263 miles (i.e., distance in miles one way from Los Angeles, Calif., USA to Las Vegas, Nev., USA), this resulted in a travel time 169 (see FIG. 13) of 43.8 hours, or 1.83 days.

The force (F) was given by the following equation:

$$F = P/V_{piston} = 330{,}000/8.8 = 37{,}500\ \text{lb}$$

The delta pressure was given by the following equation:

$$\Delta P = F/A_{piston\ head} = 37{,}500/153.94 = 243.6\ \text{psf} = 1.69\ \text{psi}$$

The aft pressure ($P_{aft}$) 50 (see FIG. 6) behind the vacuum transport tube vehicle 12 (see FIG. 6) was given by the following equation:

$$P_{aft} = P_{fwd} - \Delta P = 2116.7 - 243.6 = 1873.2\ \text{psf} = 1.69\ \text{psi}$$

The pressure ratio (r) 154 (see FIG. 8) was given by the following equation:

$$r = P_{aft}/P_{fwd} = 1873.2/2116.7 = 0.885$$

The equation for the piston volume ($V_{piston}$) 124 (see FIG. 6) swept by the piston was unchanged:

$$V_{piston} = (v_{piston})(A_{piston\ head}) = (8.8)(153.94) = 1354.6\ \text{ft}^3/\text{sec}$$

The volume ($V_{flow}$) for the combined flow through the annular gap 116 (see FIGS. 2C, 6) and the orifice 84 (see FIG. 2C) was given by the following equation:

$$V_{flow}=V_{gap}+V_{orifice}=(r)(V_{piston})=(0.885)(1354.6)$$
$$=1198.8 \text{ ft}^3/\text{sec}$$

The equation for the gap volume ($V_{gap}$) 119 (see FIG. 6) of air that escaped through the annular gap 116 (see FIG. 6) to the aft space 48 (see FIGS. 2A, 6) aft of the vacuum transport tube vehicle 12 (see FIGS. 2A, 6) was unchanged:

$$V_{gap}=(v_{gap})(A_{gap})=(1100.0)(0.916)=1007.6 \text{ ft}^3/\text{sec}$$

The orifice volume ($V_{orifice}$) 128 (see FIG. 16) of air 40 (see FIG. 2A) escaping from the orifice 84 (see FIG. 2C) was the difference of the total flow volume ($V_{flow}$) 129 (see FIG. 16) of air 40 (see FIG. 2A) escaping and the gap volume ($V_{gap}$) 119 (see FIG. 6) escaping through the annular gap 116 (see FIG. 2C):

$$V_{orifice}=V_{flow}-V_{gap}=(1198.8)(1007.6)=191.2 \text{ ft}^3/\text{sec}$$

Assuming sonic flow through the orifice 84 (see FIGS. 2B, 2C) also, the orifice area ($A_{orifice}$) 99 (see FIG. 2C) was given by the following equation:

$$A_{orifice}=V_{orifice}/v_{gap}=191.2/1100.0=0.174 \text{ ft}^2$$

The orifice diameter 92 (see FIG. 2C) of the circular orifice 84 (see FIG. 2C) was given by the following equation:

$$D_{orifice}=\sqrt{(4)(A_{orifice})/\pi}=\sqrt{(4)(0.174)/3.14159}=0.47$$
$$\text{ft}^2=5.64 \text{ in (inch)}$$

Example 3

With regard to speed control 146 (see FIGS. 7A-13), at some point, the required (or calculated) orifice diameter 92 (see FIG. 2C) becomes zero, or less than zero, and the orifice 84 (see FIG. 2C) may be closed. If the annular gap 116 (see FIG. 2C) was maintained at the same value, the power required 96c (see FIG. 12A) will decrease if the speed 94 (see FIG. 16) is held constant. If one desires to maintain the same horsepower required, the speed may be increased. The speed at which this occurs was given by the following equation:

$$v_{piston}=P+(V_{gap})(P_{fwd})/(P_{fwd})(A_{piston\ head})=330,000+$$
$$(1007.6)(2116.7)/(2116.7)(153.94)=8.932 \text{ ft/sec}$$
(feet per second)

The rest of the quantities could be calculated using the equations from Example 1.

With regard to the constant pressure ratio 148 (see FIGS. 7A-13), it may be desirable to limit the top speed of the vacuum transport tube vehicle 12. In this case, the equations from Example 1 could be used.

Now referring to FIGS. 7A-12B, FIGS. 7A-12B show the values of various quantities and illustrate the three pressure regimes, including orifice control 144, speed control 146, and constant pressure ratio 149, for example, with the following given quantities: vacuum transport tube inner diameter (D) 31 (see FIGS. 2C, 16)=14.0 ft (feet); gap distance 118 (see FIG. 2C)=0.25 in (inch); gap flow speed ($v_{gap}$) 122 (see FIG. 6)=1100.0 ft/sec (feet per second); ambient air pressure 46a (see FIG. 3A)=14.7 psi (pounds per square inch), 216.8 psf (pounds per square foot); maximum power 96a (see FIG. 16)=600 hp (horsepower), 330,000 ft-lb/sec (foot-pound per second); minimum speed 94a (see FIG. 16)=6.0 mph (miles per hour), 8.8 ft/sec (feet per second); maximum speed 94b (see FIG. 16)=60.0 mph (miles per hour), 88.0 ft/sec (feet per second); and route length 36 (see FIGS. 2A, 16)=263 mi (miles).

Now referring to FIGS. 7A and 7B, FIG. 7A is an illustration of a linear scale pressure graph 150a showing plots of forward pressure 46 and plots of aft pressure 50 for each of 1-18 cars 13, in series, of an embodiment of the vacuum transport tube vehicle system 10 (see FIG. 16) of the disclosure. FIG. 7B is an illustration of a logarithmic scale graph 150b showing plots of forward pressure 46 and plots of aft pressure 50 for each of 1-18 cars 13, in series, of an embodiment of the vacuum transport tube vehicle system 10 (see FIG. 16) of the disclosure. FIGS. 7A-7B show the pressure 43 in atmospheres (atm) both forward and aft of each car 13, in both a linear scale (FIG. 7A) and a logarithmic scale (FIG. 7B). For cars 1 through 5, orifice control 144 is used, with the speed set at 8.8 ft/sec (6.0 miles per hour) and the maximum power setting at 600 hp (horsepower). For a one way Los Angeles, Calif., USA, to a Las Vegas, Nev., USA, route length 36 (see FIG. 16), this results in a trip time of 48.83 hours, or 1.83 days. Cars 6-11 use speed control 146. The maximum horsepower of 600 hp is used, but the speed is allowed to increase. At car 12, the behavior is in the constant pressure ratio 148 regime, with the maximum speed set to 60 mph (88.0 ft/sec). It takes about ten (10) cars 13 to achieve even a near vacuum 42a (see FIG. 16). However, after that near vacuum, or partial vacuum, is reached, obtaining a high quality vacuum requires only a few more cars 13 as the constant pressure ratio 148 of the device of 0.0744 allows for a pressure reduction at each car 13 of approximately an order of magnitude.

Figure 8:
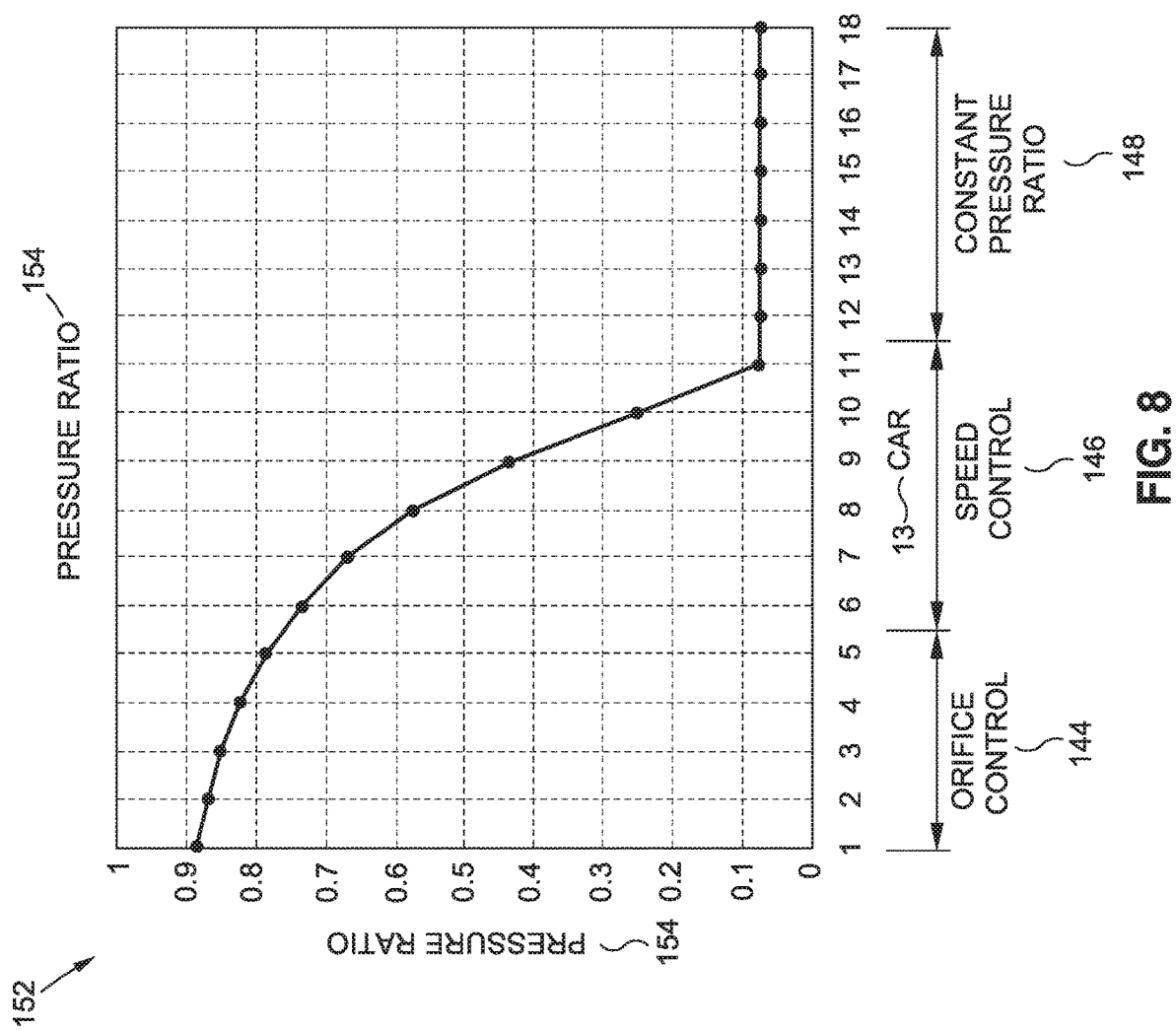
FIG. 8 is an illustration of a pressure ratio graph showing pressure ratio for each car of an embodiment of the vacuum transport tube vehicle system of the disclosure.

Now referring to FIG. 8, FIG. 8 is an illustration of a pressure ratio graph showing plots of pressure ratio 154 for each of 1-18 cars 13, in series, of an embodiment of the vacuum transport tube vehicle system 10 (see FIG. 16) of the disclosure. FIG. 8 shows the variation of pressure ratio 154 for the cars 13 for the orifice control 144, the speed control 146, and the constant pressure ratio 148 regimes. The pressure ratio 154 is kept relatively close to 1.0 since the power is limited to 600 horsepower. After the pressures drop, the pressure ratio 154 also drops as the speed 94 (see FIG. 16) increases. As the speed is held constant in the constant pressure ratio 148 regime, the pressure ratio 154 remains constant at 7.44% (percent). This pressure ratio 154 is governed by the speed 94 (see FIG. 16) of the vacuum transport tube vehicle 12, the gap flow speed ($v_{gap}$) 122 (see FIGS. 6, 16) past the annular gap 116, and the ratio of areas between the piston head area ($A_{piston\ head}$) 59 (see FIG. 2C) and the gap area ($A_{gap}$) 120 (see FIG. 2C). Smaller annular gaps 116 (see FIGS. 2B, 16) and higher speeds 94 (see FIG. 16) of the vacuum transport tube vehicle 12 result in lower pressure ratios 154 (see FIG. 8).

Now referring to FIG. 9, FIG. 9 is an illustration of a piston velocity graph 156 showing plots of piston velocity 142b for each of the 1-18 cars 13, in series, of an embodiment of the vacuum transport tube vehicle system 10 (see FIG. 16) of the disclosure. FIG. 9 shows plots of the velocity 142 in feet per second (ft/sec) of the 1-18 cars 13 for the orifice control 144, the speed control 146, and the constant pressure ratio 148 regimes.

Figure 10A:
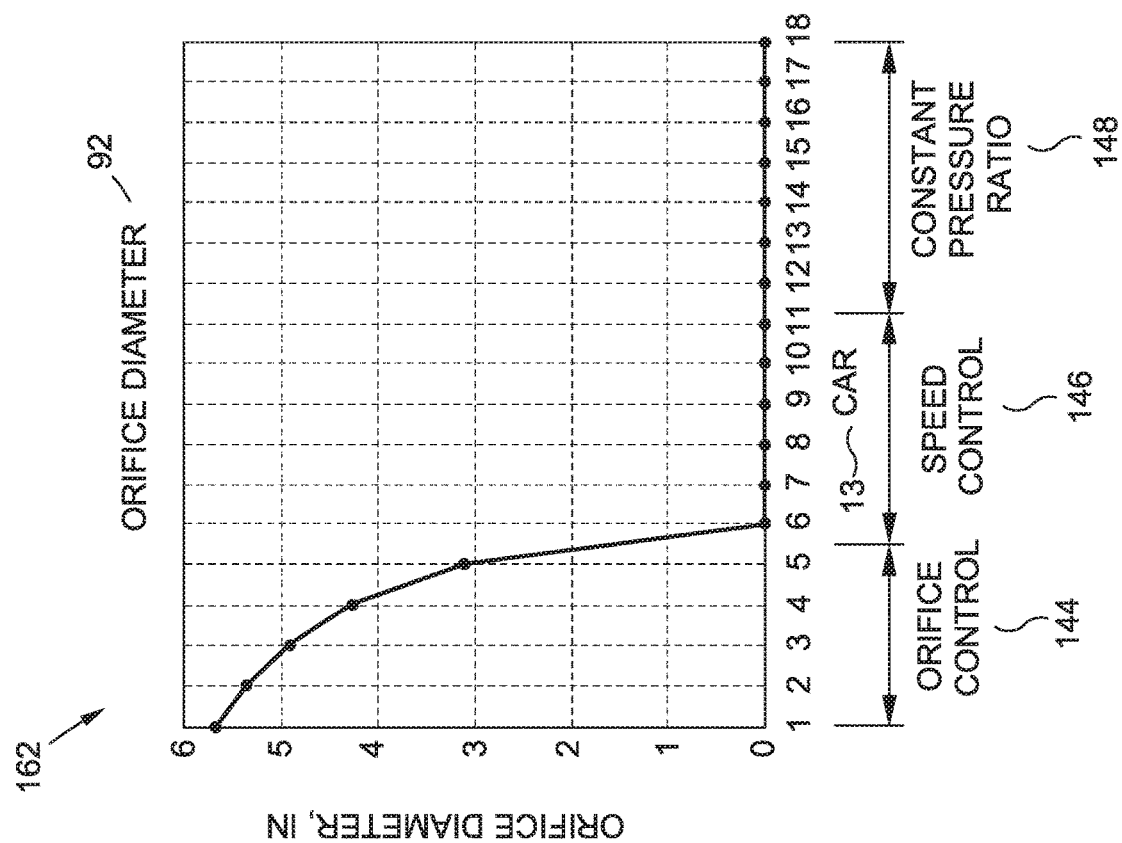
FIG. 10A is an illustration of an orifice flow-through area graph showing an orifice effect of a flow-through area of the orifice for each car of an embodiment of the vacuum transport tube vehicle system of the disclosure.
Figure 10B:
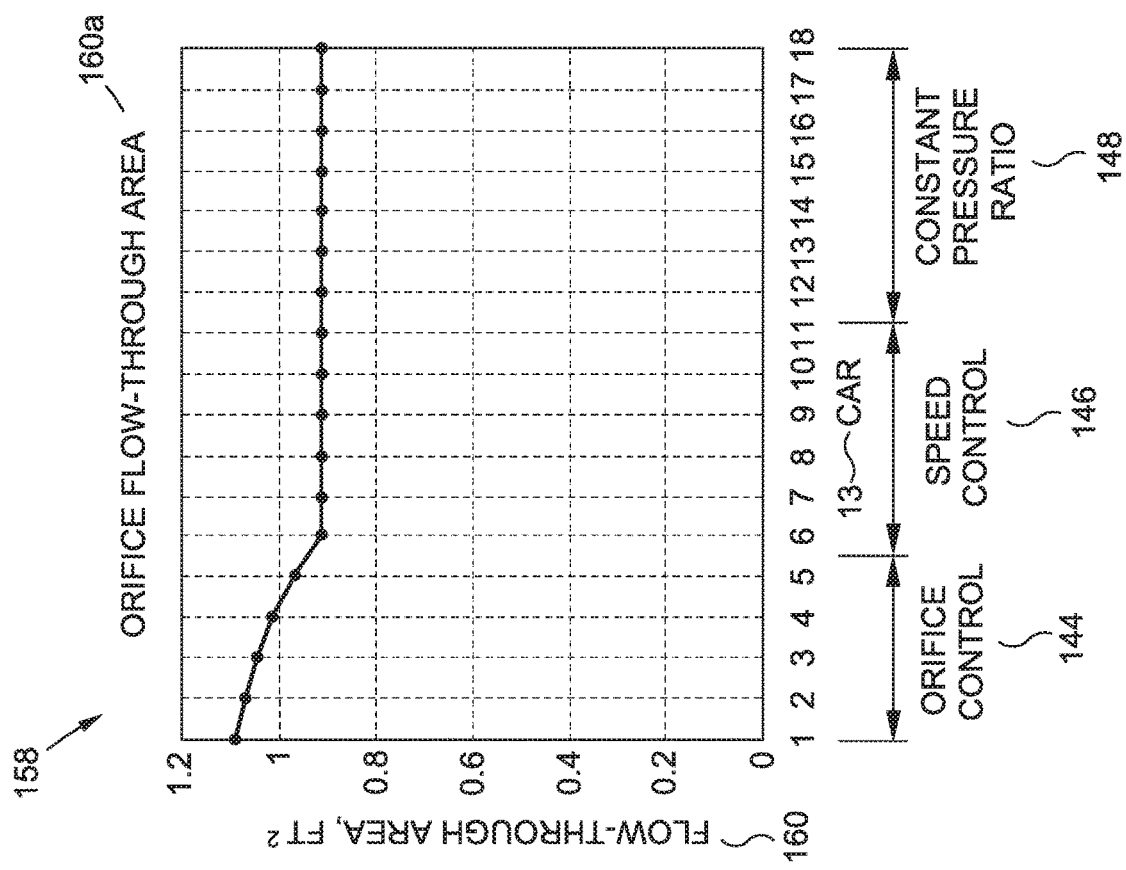
FIG. 10B is an illustration of an orifice diameter graph showing another orifice effect of an orifice diameter for each car of an embodiment of the vacuum transport tube vehicle system of the disclosure.

Now referring to FIGS. 10A and 10B, FIG. 10A is an illustration of an orifice flow-through area graph 158 showing the effect of flow-through area 160, such as orifice flow-through area 160a, for each of 1-18 cars 13, in series, of an embodiment of the vacuum transport tube vehicle system 10 (see FIG. 16) of the disclosure. FIG. 10B is an illustration of an orifice diameter graph 162 showing the effect of orifice diameter 92 for each of 1-18 cars 13, in series, of an embodiment of the vacuum transport tube vehicle system 10 (see FIG. 16) of the disclosure. FIG. 10A shows plots of the flow-through area 160 in square feet (ft$^2$) of the 1-18 cars 13 for the orifice control 144, the speed control 146, and the constant pressure ratio 148 regimes. FIG. 10B shows plots of the orifice diameter 92 in inches (in) of the 1-18 cars 13 for the orifice control 144, the speed control 146, and the constant pressure ratio 148 regimes. FIGS. 10A-10B show the effect of the orifice 84 (see FIGS. 2C-2F). The addition of area in the minimum speed orifice control 144 regime allows for higher minimum speed 94a (see FIG. 16) than would be otherwise.

Now referring to FIGS. 11A and 11B, FIG. 11A is an illustration of a linear scale delta pressure graph 164a showing the change in pressure 43 measured in pounds per square foot (psf), i.e., delta pressure 52, in a linear scale for each of 1-18 cars 13, in series, of an embodiment of the vacuum transport tube vehicle system 10 (see FIG. 16) of the disclosure. FIG. 11B is an illustration of a logarithmic scale delta pressure graph 164b showing the change in pressure 43 measured in pounds per square foot (psf), i.e., delta pressure 52, delta pressure 52 in a logarithmic scale for each of 1-18 cars 13, in series, of an embodiment of the vacuum transport tube vehicle system 10 (see FIG. 16) of the disclosure. FIG. 11A shows plots of the delta pressure 52 in pounds per square foot (psf) of the 1-18 cars 13 for the orifice control 144, the speed control 146, and the constant pressure ratio 148 regimes. FIG. 11B shows plots of the delta pressure 52 in pounds per square foot (psf) of the 1-18 cars 13 for the orifice control 144, the speed control 146, and the constant pressure ratio 148 regimes. As shown in FIGS. 11A-11B, the delta pressure 52 is held constant in the orifice control 144 regime, decreases in the speed control 146 regime, and becomes very small in the constant pressure ratio 148 regime.

Figure 12B:
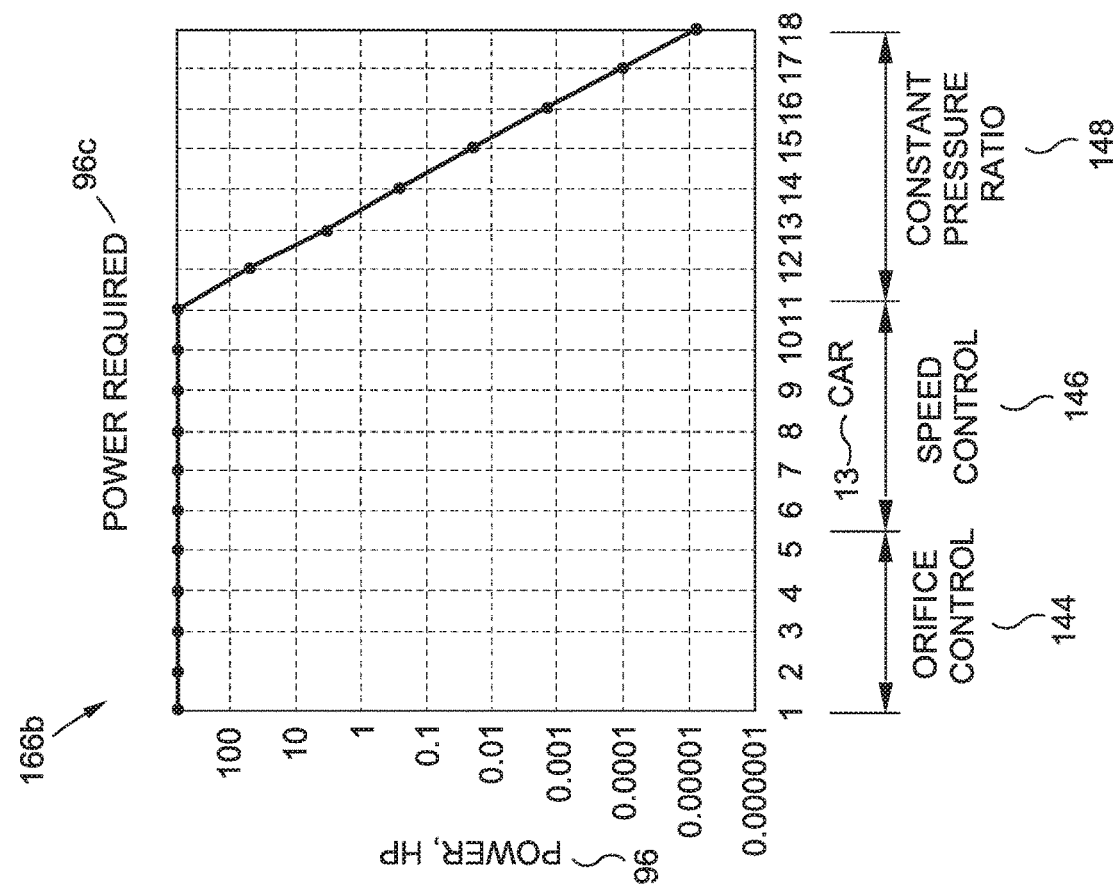
FIG. 12B is an illustration of a logarithmic scale power required graph showing power required for each car of an embodiment of the vacuum transport tube vehicle system of the disclosure.
Figure 12A:
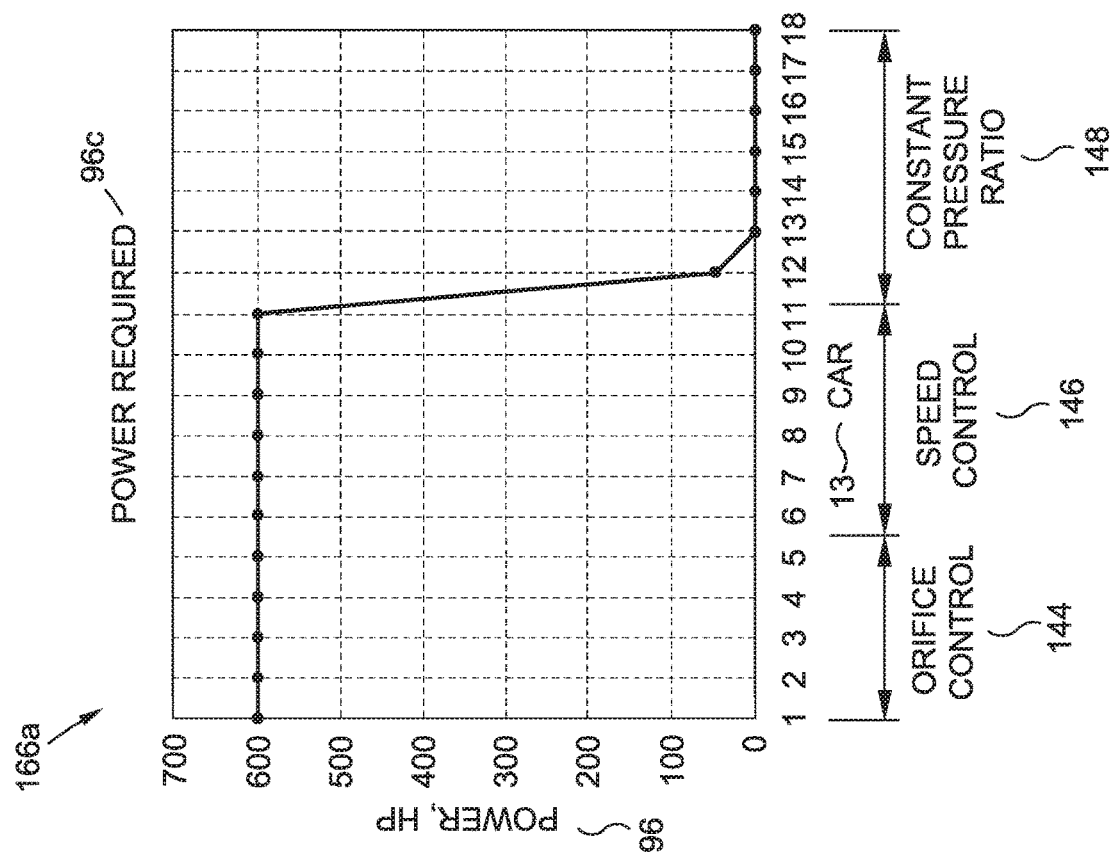
FIG. 12A is an illustration of a linear scale power required graph showing power required for each car of an embodiment of the vacuum transport tube vehicle system of the disclosure.

Now referring to FIGS. 12A and 12B, FIG. 12A is an illustration of a linear scale power required graph 166a showing power required 96c in a linear scale for each of 1-18 cars 13, in series, of an embodiment of the vacuum transport tube vehicle system 10 (see FIG. 16) of the disclosure. FIG. 12B is an illustration of a logarithmic scale power required graph 166b showing power required 96c in a logarithmic scale for each of 1-18 cars 13, in series, of an embodiment of the vacuum transport tube vehicle system 10 (see FIG. 16) of the disclosure. FIG. 12A shows power 96 in horsepower (hp) of the 1-18 cars 13 for the orifice control 144, the speed control 146, and the constant pressure ratio 148 regimes. FIG. 12A shows power 96 in horsepower (hp) of the 1-18 cars 13 for the orifice control 144, the speed control 146, and the constant pressure ratio 148 regimes. FIGS. 12A-12B show the power 96 in horsepower (hp) for the power required 96c, and the power 96 remains constant at 600 hp (horsepower) through the orifice control 144 and speed control 146 regimes, and decreases exponentially in the constant pressure ratio 148 regime.

Figure 13:
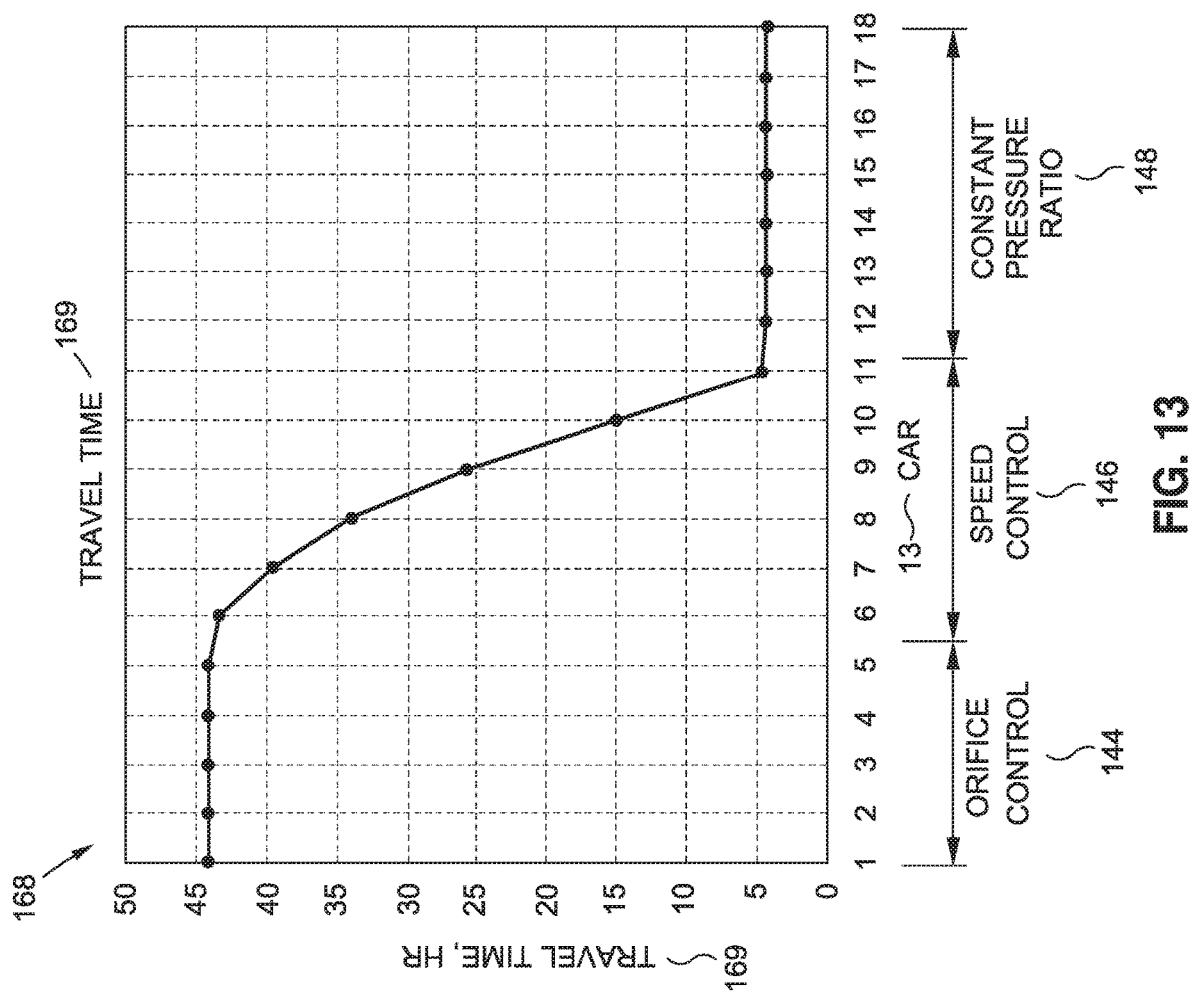
FIG. 13 is an illustration of a travel time graph showing travel time for each car of an embodiment of the vacuum transport tube vehicle system of the disclosure.

Now referring to FIG. 13, FIG. 13 is an illustration of a travel time graph 168 showing travel time 169 in hours (hr) for each of the 1-18 cars 13, in series, of an embodiment of the vacuum transport tube vehicle system 10 (see FIG. 16) of the disclosure. FIG. 13 shows plots of the travel time 169 in hours (hr) of the 1-18 cars 13 for the orifice control 144, the speed control 146, and the constant pressure ratio 148 regimes.

Now referring to FIGS. 14A-14I, FIGS. 14A-14I are illustrations of various conditions of a route end boundary assembly 170 for the vacuum transport tube vehicles 12 of an embodiment of the vacuum transport tube vehicle system 10 of the disclosure. As the various vacuum transport tube vehicles 12 (see FIGS. 14A-14I) reach a route end 38a (see FIGS. 14A-14I), of the vacuum transport tube route 38 (see FIGS. 14A-14I), through the vacuum transport tube 16 (see FIGS. 14A-14I), FIGS. 14A-14I show the various conditions of the route end boundary assembly 170 which are designed to accommodate the vacuum transport tube vehicles 12. As shown in FIGS. 14A-14I, the route end boundary assembly 170 comprises a first route end pressure barrier 172, a second route end pressure barrier 174 forward from the first route end pressure barrier 172, and a flapper valve 176 located between the first route end pressure barrier 172 and the second route end pressure barrier 174. The flapper valve 176 (see FIGS. 14A-14I) may be attached to the vacuum transport tube 16 to open and close a portion of the vacuum transport tube 16 to the outside air. Alternatively, the flapper valve 176 may exit to a plenum (not shown) which is evacuated with an evacuation apparatus or process, or the flapper valve 176 may be installed as a pressure barrier in the interior 34a (see FIG. 2A) of the vacuum transport tube 16, where the flapper valve pressure barrier extends a distance past the route end 38a (see FIGS. 14A-14I), or the flapper valve 176 may be attached or installed in another suitable manner.

As shown in FIG. 14A, the route end boundary assembly 170 is in a first car approaching from a distance condition 170a, where the vacuum transport tube vehicle 12, such as in the form of a first car 13a, approaches from a distance in a forward direction of travel 18a with a forward space 44 in front of the first car 13a and an aft space 48 behind the first car 13a. Since the pressure in the forward space 44 in front of the first car 13a is at an ambient air pressure 46a of 1.0 atm. (one atmosphere), the vacuum transport tube 16 may be open to the outside ambient air 46a of 1.0 atm. (one atmosphere) with the flapper valve 176 in an open flapper valve position 176a. As shown in FIG. 14A, the first route end pressure barrier 172 is in an open first route end pressure barrier position 172a, and the second route end pressure barrier 174 is in a closed second route end pressure barrier position 174b.

As shown in FIG. 14B, the route end boundary assembly 170 is in a first car approaching a flapper valve condition 170b, where the vacuum transport tube vehicle 12, such as in the form of first car 13a, approaches the flapper valve 176, which is in the open flapper valve position 176a, and where the first car 13a approaches the flapper valve 176 in the forward direction of travel 18a and pushes the air 40 in the forward space 44 in front of it and the flapper valve 176 in the open flapper valve position 176a allows the air 40 to escape from the vacuum transport tube 16 to the outside ambient air 46a, which is at a pressure of 1.0 atm. (one atmosphere). As shown in FIG. 14B, the first route end pressure barrier 172 is in the open first route end pressure barrier position 172a, and the second route end pressure barrier 174 is in the closed second route end pressure barrier position 174b.

As shown in FIG. 14C, the route end boundary assembly 170 is in a first airlock condition 170c, where the vacuum transport tube vehicle 12, such as in the form of first car 13a, has evacuated some of the air 40 (see FIG. 14B) out of the vacuum transport tube 16 and the flapper valve 176 is in the closed flapper valve position 176b, so that the first car 13a is in an airlock 178. Outside the vacuum transport tube 16 is ambient air 46a at a pressure of 1.0 atm. (one atmosphere). As shown in FIG. 14C, the first route end pressure barrier 172 is in the closed first route end pressure barrier position 172b, and the second route end pressure barrier 174 is in the closed second route end pressure barrier position 174b, thus temporarily shutting off the route end 38a of the vacuum transport tube route 38 from the rest of the vacuum transport tube 16.

As shown in FIG. 14D, the route end boundary assembly 170 is in a first car exit condition 170d, where the vacuum transport tube vehicle 12, such as in the form of first car 13a, exits the airlock 178 at the route end 38a through the second route end pressure barrier 174 which is in the open second route end pressure barrier position 174a. FIG. 14D further shows the flapper valve 176 in the closed flapper valve position 176b, the first route end pressure barrier 172 in the closed first route end pressure barrier position 172b, and ambient air 46a at a pressure of 1.0 atm. (one atmosphere) outside the vacuum transport tube 16.

As shown in FIG. 14E, the route end boundary assembly 170 is in a second car approaching from a distance condition 170e, where the vacuum transport tube vehicle 12, such as in the form of a second car 13b, approaches from a distance in a forward direction of travel 18a with a forward space 44 in front of the second car 13b and an aft space 48 behind the second car 13b. Since the pressure in the forward space 44 in front of the second car 13b (and behind the first car 13a (see FIG. 14D)) is less than 1.0 atm. (one atmosphere), it is necessary that the flapper valve 176 remain in the closed flapper valve position 176b. Otherwise air 40 (see FIGS. 14B, 14F) would flow from the outside, which is at ambient air pressure 46a of 1.0 atm. (one atmosphere), to the interior 34a (see FIG. 2A) or inside of the vacuum transport tube 16, which is at a less than ambient air pressure 46a. As further shown in FIG. 14E, the first route end pressure barrier 172 is in the open first route end pressure barrier position 172a, and the second route end pressure barrier 174 is in the closed second route end pressure barrier position 174b.

As shown in FIG. 14F, the route end boundary assembly 170 is in an air compressed condition 170f. Since the air 40 (see FIG. 14F) in the forward space 44 (see FIG. 14F) in front of the vacuum transport tube vehicle 12 (see FIG. 14F), such as in the form of second car 13b (see FIG. 14F), is enclosed by a volume or space that is decreasing, at some point in time, the pressure in the forward space 44 (see FIG. 14F) in front of the second car 13b (see FIG. 14F) increases, so that it is greater than or equal to 1.0 atm. (one atmosphere), which is greater than or equal to the ambient air pressure 46a of 1.0 atm. (one atmosphere) outside the vacuum transport tube 16 (see FIG. 14F). As further shown in FIG. 14F, at the time the air 40 is compressed and the pressure increases inside the vacuum transport tube 16, the flapper valve 176 opens to the open flapper valve position 176a, so that the air 40 is allowed to flow outside the vacuum transport tube 16 and escape. At the time that this happens, the behavior and operation of the second car 13b (see FIG. 14F) is substantially similar to that of the first car 13a (see FIG. 14D) when it was in the first car approaching a flapper valve condition 170b (see FIG. 14B). As further shown in FIG. 14F, the first route end pressure barrier 172 is in the open first route end pressure barrier position 172a, and the second route end pressure barrier 174 is in the closed second route end pressure barrier position 174b.

As shown in FIG. 14G, the route end boundary assembly 170 is in a second car approaching a flapper valve condition 170g, where the vacuum transport tube vehicle 12, such as in the form of second car 13b, approaches the flapper valve 176, which is in the open flapper valve position 176a, and where the second car 13a approaches the flapper valve 176 in the forward direction of travel 18a and pushes the air 40 (see FIG. 14F) in the forward space 44 (see FIG. 14F) in front of it, and the flapper valve 176 in the open flapper valve position 176a allows the air 40 (see FIG. 14F) to escape from the vacuum transport tube 16 to the outside ambient air 46a, which is at a pressure of 1.0 atm. (one atmosphere). As shown in FIG. 14G, the first route end pressure barrier 172 is in the open first route end pressure barrier position 172a, and the second route end pressure barrier 174 is in the closed second route end pressure barrier position 174b.

As shown in FIG. 14H, the route end boundary assembly 170 is in a second airlock condition 170h, where the vacuum transport tube vehicle 12, such as in the form of second car 13b, has evacuated all of the air 40 (see FIG. 14F) out of the vacuum transport tube 16 and the flapper valve 176 is in the closed flapper valve position 176b, so that the second car 13b is in an airlock 178. Outside the vacuum transport tube 16 is ambient air 46a at a pressure of 1.0 atm. (one atmosphere). As shown in FIG. 14H, the first route end pressure barrier 172 is in the closed first route end pressure barrier position 172b, and the second route end pressure barrier 174 is in the closed second route end pressure barrier position 174b, thus temporarily shutting off the route end 38a of the vacuum transport tube route 38 from the rest of the vacuum transport tube 16.

As shown in FIG. 14I, the route end boundary assembly 170 is in a second car exit condition 170i, where the vacuum transport tube vehicle 12, such as in the form of second car 13b, exits the airlock 178 at the route end 38a through second route end pressure barrier 174 which in the open second route end pressure barrier position 174a. FIG. 14I further shows the flapper valve 176 in the closed flapper valve position 176b, the first route end pressure barrier 172 in the closed first route end pressure barrier position 172b, and ambient air 46a at a pressure of 1.0 atm. (one atmosphere) outside the vacuum transport tube 16.

At the route end 38a (see FIGS. 14A-14I) for the cars 13 (see FIGS. 3A, 16) after the first car 13a (see FIG. 14A), the outside atmosphere of 1.0 atm. will result in a delta pressure 52 (see FIG. 16), or pressure differential, that may exceed the power 96 (see FIG. 16) of the electric motor 112 (see FIG. 2B), if the same speed 94 (see FIG. 16) is maintained. Several ways of resolving these route end 38a (see FIGS. 14A-14I) conditions may be used. One way includes having the previous cars 13 (see FIGS. 3A, 16) "back up" along the vacuum transport tube route 38 (see FIGS. 14A-14I) to re-evacuate the last section of the vacuum transport tube route 38 as the successive cars 13 cause the pressure 43 (see FIG. 16) to build up before them. Another way includes slowing the cars 13 (see FIGS. 3A, 16) down as the pressure 43 (see FIG. 16) builds up. Another way includes having the flapper valve 176 exit to a plenum which is evacuated by a suitable evacuation apparatus or process. This may be achieved by having the flapper valve 176 installed as a barrier internal to the vacuum transport tube 16 that extends for some distance past the route end 38a (see FIGS. 14A-14I). This section of the vacuum transport tube 16 may be evacuated by the first sequence or series of cars 13.

Figure 15:
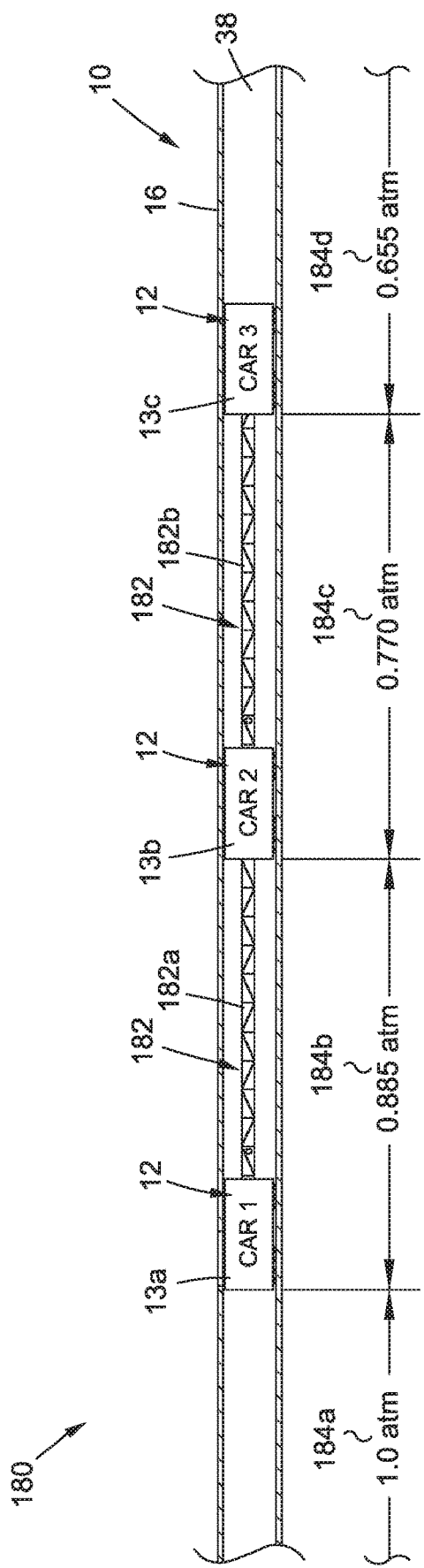
FIG. 15 is an illustration of another embodiment of the vacuum transport tube vehicle system of the disclosure, in the form of a multi-stage vehicle arrangement.

Now referring to FIG. 15, FIG. 15 is an illustration of another embodiment of the vacuum transport tube vehicle system 10 of the disclosure, in the form of a multi-stage vehicle arrangement 180. In a manner similar to how pumps may be staged, the vacuum transport tube vehicle 12 (see FIG. 15) may also be staged, so that several pressure reductions may be accomplished by a single multi-stage vehicle arrangement 180, as shown in FIG. 15. For example, as shown in FIG. 15, at a certain point in time for a pseudo-steady state condition, a first zone 184a in front of the first car 13a has a pressure of 1.0 atm. (atmosphere), a second zone 184b behind the first car 13a and in front of the second car 13b has a reduced pressure of 0.885 atm, a third zone 184c behind the second car 13b and in front of the third car 13c has a further reduced pressure of 0.770 atm., and a fourth zone 184d behind the third car 13c has an even further reduced pressure of 0.655 atm. The distances between the various cars 13 of the series may be set to minimize concerns of turbulence in the air flow between one car 13 and a subsequent car 13.

FIG. 15 shows an exemplary multi-stage vehicle arrangement 180 with three (3) vacuum transport tube vehicles 12, including the first car 13a, a second car 13b, and a third car 13c, connected to each other in a series. Additional cars 13 may also be subsequently connected in the series. As shown in FIG. 15, the first car 13a is connected to the second car 13b via a connector element 182, such as a structural connector element. The connector element 182, such as a structural connector element, may comprise a first connector 182a, for example, a structural connector element, apparatus, or device that structurally connects the cars together. As shown in FIG. 15, the second car 13a is connected to the third car 13c via a connector element 182, such as a structural connector element. The connector element 182, such as the structural connector element, may comprise a second connector 182b, for example, a structural connector element, apparatus, or device that structurally connects the cars together. A magnetic levitation (mag-lev) propulsion system 24 (see FIG. 1B) may be used with the multi-stage vehicle arrangement 180, or another suitable type of propulsion may be attached to the connector elements 182 (see FIG. 15), or they may even be separate cars 13 (not shown). The multi-stage vehicle arrangement 180 (see FIG. 15) allows the vacuum transport tube vehicle system 10 to be modular. The propulsion may be evenly distributed among the vacuum transport tube vehicles 12, such as the cars 13, or it may be concentrated in one vacuum transport tube vehicle 12, or car 13, such as the first car 13a (see FIG. 15). The horsepower requirements for the multi-stage vehicle arrangement 180 are preferably the sum of the requirements for each vacuum transport tube vehicle 12, or car 13, for example, 1800 horsepower, or another suitable power amount.

Now referring to FIG. 16, FIG. 16 is an illustration of a functional block diagram of an exemplary embodiment of a vacuum transport tube vehicle system 10 of the disclosure. As shown in FIG. 16, and as discussed above, the vacuum transport tube vehicle system 10 comprises a vacuum transport tube 16, or a plurality of vacuum transport tubes 16, such as a first vacuum transport tube 16a (see FIG. 1A) and a second vacuum transport tube 16b (see FIG. 1A). As shown in FIG. 16, the vacuum transport tube 16 (see FIG. 16) has an interior 32a, an exterior 32b, an inner surface 34a, an outer surface 34b, a cylindrical body 30, a vacuum transport tube inner diameter 31 (see also FIG. 2C), and a perimeter 35. The vacuum transport tube 16 (see FIG. 16) has a vacuum transport tube route 38 (see FIG. 16) having a route length 36 (see FIG. 16) and a route end 38a (see FIG. 16).

As further shown in FIG. 16, vacuum transport tube vehicle system 10 comprises one or more vacuum transport tube vehicles 12, as discussed in detail above, configured for moving or traveling through the interior 32a of the vacuum transport tube 16 and evacuating air 40 from the interior 32a of the vacuum transport tube 16 over a route length 36 of a vacuum transport tube route 38, to create and maintain a vacuum 42 within the vacuum transport tube 16. The vacuum transport tube vehicle system 10 preferably comprises an amount of ten (10) vacuum transport tube vehicles 12 to twenty (20) vacuum transport tube vehicles 12, and more preferably, three (3) vacuum transport tube vehicles 12 to twenty (20) vacuum transport tube vehicles 12, installed or arranged in series, or in succession, separately or attached together, within the vacuum transport tube 16. The vacuum transport tube vehicle system 10 may comprise a single vacuum transport tube vehicle 12 that makes multiple vehicle passes 53 (see FIG. 16), or may comprise any combination of 2 to 20, or more, vacuum transport tube vehicles 12 or cars 13 each making one or more vehicle passes 53 through the vacuum transport tube 16, where the pressure 43 inside the vacuum transport tube 16 is successively reduced, or further reduced, with each vehicle pass 53.

As further shown in FIG. 16, each of the one or more vacuum transport tube vehicles 12 may be in form of a car 13, and comprises a first end 54 comprising a piston head 54a. The first end 54 (see FIG. 16) has a first end outer diameter 56 (see FIG. 16) having a length 56a (see FIG. 16), and a first end outer surface 58 (see FIG. 2E), wherein when each vacuum transport tube vehicle 12 is installed in the vacuum transport tube 16, an annular gap 116 (see also FIG. 2B) is formed between the inner surface 34a of the vacuum transport tube 16 and the first end outer surface 58.

As shown in FIG. 16, the annular gap 116 has a gap distance 118, a gap area 120, a gap flow speed 122, and a gap volume 119. The annular gap 116 (see FIG. 16) preferably has a gap distance 118 (see FIG. 16) in a range of from about 0.25 inch to about 1.0 inch between the inner surface 34a of the vacuum transport tube 16 and the first end outer surface 58 at the first end 54 of the vacuum transport tube vehicle 12, when the vacuum transport tube vehicle 12 is installed in the interior 32a of the vacuum transport tube 16.

As further shown in FIG. 16, the first end 54, such as in the form of piston head 54a, has a forward surface 60, an aft surface 61, and a side profile 62. As further shown in FIG. 16, the forward surface 60 may comprise a flat forward surface 60a with a flat side profile 62a, or a curved forward surface 60b with a curved side profile 62b, such as including, a convex forward surface 60c with a convex side profile 62c or a concave forward surface 60d with a concave side profile 62d, or the forward surface 60 may comprise another suitable forward surface with a suitable side profile. Preferably, the flat forward surface 60a (see FIG. 16) is a circular shape 64 (see FIG. 2F). However, the forward surface 60 may comprise another suitable shape.

As further shown in FIG. 16, each vacuum transport tube vehicle 12 comprises a second end 66 having a second end outer diameter 68 with a length 68a, and having a second end outer surface 69. As further shown in FIG. 16, each vacuum transport tube vehicle 12 comprises a body 70 disposed between the first end 54 and the second end 66, where the body 70 comprises a piston 70a having a structural framework 72.

As further shown in FIG. 16, each vacuum transport tube vehicle 12 comprises at least one orifice 84, such as in the form of a passageway 84a, extending from a first inlet portion 86 (see FIG. 2F) in the first end 54 through to a second outlet portion 88 (see FIG. 2F) of the vacuum transport tube vehicle 12, such as formed through the body 70 and through to the second end 66. The at least one orifice 84 (see FIG. 16) is configured to allow air 40 (see FIG. 16) to flow from a forward space 44 (see FIG. 2A) in front of the vacuum transport tube vehicle 12 (see FIG. 16) to an aft space 48 (see FIG. 2A) behind the vacuum transport tube vehicle 12, to create a delta pressure 52 (see FIG. 16)

between a forward pressure ($P_{fwd}$) 46 (see FIGS. 2A, 16) in the forward space 44 and an aft pressure ($P_{aft}$) 50 (see FIGS. 2A, 16) in the aft space 48, such that the aft pressure ($P_{aft}$) 50 is lower than the forward pressure ($P_{fwd}$) 46, and the forward pressure ($P_{fwd}$) 46 is higher than the aft pressure ($P_{aft}$) 50, with each successive vehicle pass 53 (see FIG. 16), the pressure, such as the aft pressure ($P_{aft}$) 50, is further reduced.

As further shown in FIG. 16, each vacuum transport tube vehicle 12 comprises a drive assembly 100 coupled to the body 70 for driving each vacuum transport tube vehicle 12 through the vacuum transport tube 16. In one embodiment, the drive assembly 100 comprises a plurality of drive wheels 102 (see FIG. 2D) arranged in a circumferential arrangement 104 (see FIG. 2D) around the body 70 (see FIGS. 2A, 2D), the plurality of drive wheels 102 being in contact with the inner surface 34a of the vacuum transport tube 16, when the vacuum transport tube vehicle 12 travels through the vacuum transport tube 16.

In another embodiment, the drive assembly 100 (see FIG. 16) comprises a magnetic levitation (mag-lev) propulsion system 24 (see FIGS. 1B, 16) comprising a plurality of guide magnets 26 (see FIG. 1B) and a plurality of vehicle magnets 28 (see FIG. 1B) to create both lift and substantially frictionless propulsion to move the one or more vacuum transport tube vehicles 12 through the vacuum transport tube 16.

As further shown in FIG. 16, each vacuum transport tube vehicle 12 comprises a power system 110 coupled to the drive assembly 100 for powering the drive assembly 100. In one embodiment, the power system 110 (see FIG. 16) comprises one or more electric motors 112 (see FIG. 2B) coupled to one or more of the plurality of drive wheels 102. The power system 110 (see FIG. 16) may comprise other suitable power elements.

When each of the one or more vacuum transport tube vehicles 12 (see FIG. 16) makes one or more vehicle passes 53 (see FIG. 16) through the interior 32a (see FIG. 16) of the vacuum transport tube 16 (see FIG. 16), pressure 43 (see FIG. 16) in the interior 32a of the vacuum transport tube 16 is successively reduced with each successive vehicle pass 53, until a desired pressure 43a (see FIG. 16) is obtained.

The operational regimes of the one or more vacuum transport tube vehicles 12 (see FIG. 16), including orifice control 144 (see FIGS. 7A-13), speed control 146 (see FIGS. 7A-13), and constant pressure ratio 148 (see FIGS. 7A-13), as well as other measurement, for the vacuum transport tube vehicle system 10 (see FIG. 16), may be measured, calculated, and/or quantified using various parameters, including, as shown in FIG. 16, pressure 43, such as air pressure 43b and atmospheric pressure 43c, forward pressure 46, ambient air pressure 46a, aft pressure 50, delta pressure 52, velocity 142, speed 94, minimum speed 94a, maximum speed 94b, forward speed 94c, power 96, maximum power 96a, power required 96c, force 126, gap volume 119, piston volume 124, orifice volume 128, total flow volume 129, gap distance 118, gap area 120, gap flow speed 122, as well as other suitable parameters, discussed above.

As further shown in FIG. 16, the vacuum transport tube vehicle system 10 provides for pump elimination 186 of pumps, seal elimination 188 of seals, such as pressure seals or modular pressure seals, and close tolerance manufacturing elimination 190 of an interface 192 between the inner surface 34a of the vacuum transport tube 16 and each vacuum transport tube vehicle 12, as compared to existing vacuum transport tube evacuation systems and methods that use expensive pumps, expensive seals, and/or close manufacturing tolerances.

As further shown in FIG. 16, the vacuum transport tube vehicle system 10 comprises one or more pressure barriers 136 (see also FIG. 3A) positioned in the interior 32a of the vacuum transport tube 16 and positioned or located aft of the one or more vacuum transport tube vehicles 12. The one or more pressure barriers 136 may comprise solid steel plates that are not susceptible to air leaks, or another suitable type of pressure barrier.

As further shown in FIG. 16, the vacuum transport tube vehicle system 10 may further comprise a route end boundary assembly 170 positioned at a route end 38a of the vacuum transport tube route 38. As shown in FIGS. 14A-14I, discussed in detail above, the route end boundary assembly 170 comprises a first route end pressure barrier 172, a second route end pressure barrier 174, and a flapper valve 176.

In another embodiment, as shown in FIG. 16, the vacuum transport tube vehicle system 10 may comprise a multi-stage vehicle arrangement 180 (see FIGS. 15, 16), as discussed in detail above. The multi-stage vehicle arrangement 180 comprises two or more vacuum transport tube vehicles 12 connected together, in series or in succession, via one or more connector elements 182 (see FIG. 15) to form the multi-stage vehicle arrangement 180 which may function as a single vehicle.

Figure 17:
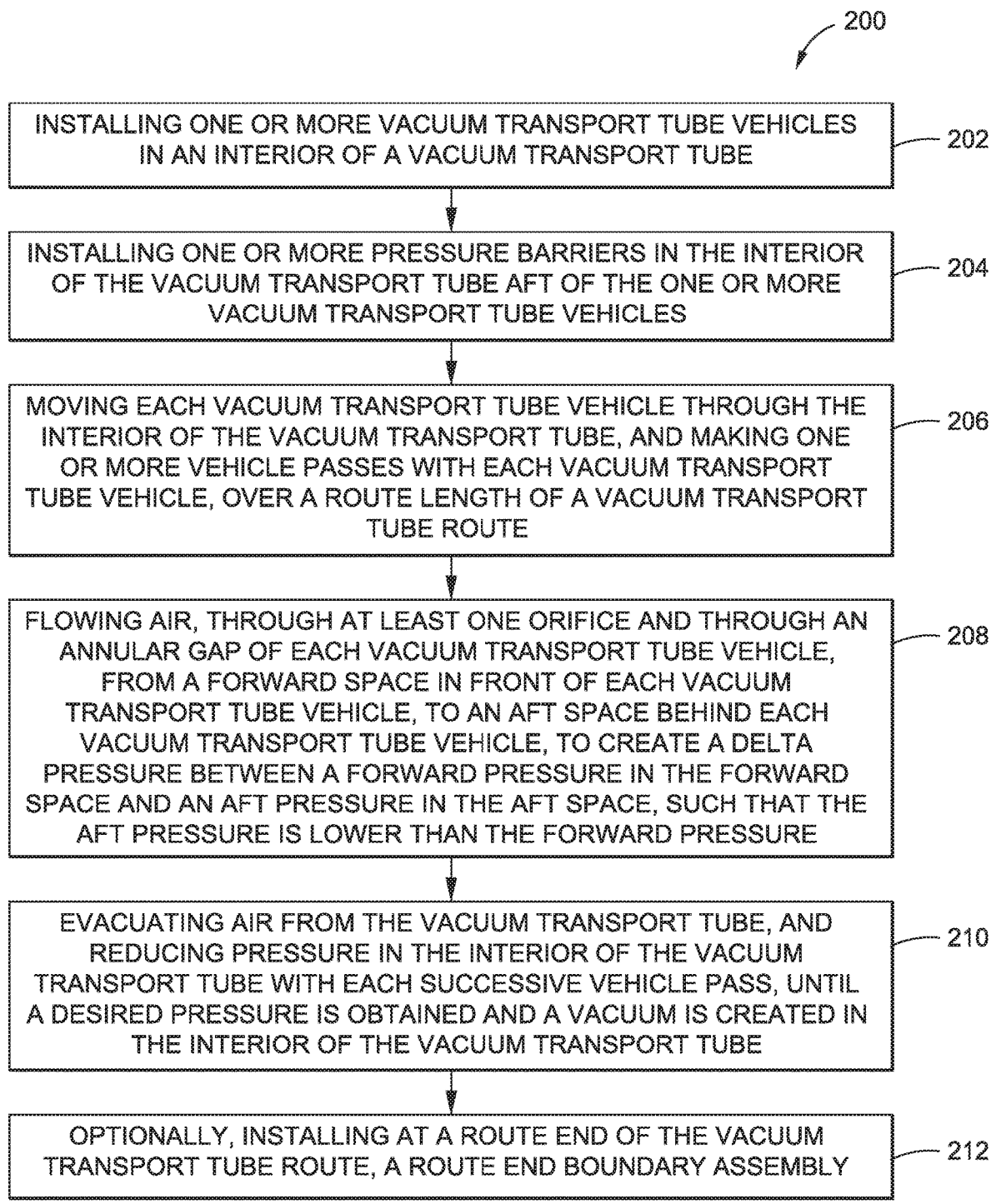
FIG. 17 is an illustration of a flow diagram showing an exemplary embodiment of a method of the disclosure.

Now referring to FIG. 17, FIG. 17 is an illustration of a flow diagram showing an exemplary embodiment of a method 200 of the disclosure. In another embodiment, there is provided the method 200 (see FIG. 17) of evacuating a vacuum transport tube 16 (see FIG. 2A), such as initially evacuating air 40 (see FIG. 2A) from a vacuum transport tube 16 (see FIG. 2A), to create a vacuum 42 (see FIG. 16) within the vacuum transport tube 16.

As shown in FIG. 17, the method 200 comprises step 202 of installing one or more vacuum transport tube vehicles 12 (see FIG. 2A) in an interior 32a (see FIG. 2A) of the vacuum transport tube 16 (see FIG. 2A). The vacuum transport tube 16 (see FIG. 2A) has an inner surface 34a (see FIG. 2A) and an outer surface 34b (see FIG. 2A).

As discussed in detail above, each of the one or more vacuum transport tube vehicles 12 (see FIG. 2B) comprises a first end 54 (see FIG. 2B) comprising a piston head 54a (see FIG. 2B). The first end 54 having a first end outer diameter 56 (see FIG. 2B) and a first end outer surface 58 (see FIG. 2B). An annular gap 116 (see FIG. 2B) is formed between the first end outer surface 58 (see FIG. 2B) and the inner surface 34a (see FIG. 2B) of the vacuum transport tube 16 (see FIG. 2B).

Each of the one or more vacuum transport tube vehicles 12 (see FIG. 2B) further comprises a second end 66 (see FIG. 2B) having a second end outer diameter 68 (see FIG. 2B). Each of the one or more vacuum transport tube vehicles 12 (see FIG. 2B) further comprises a body 70 (see FIG. 2B) disposed between the first end 54 and the second end 66. The body 70 (see FIG. 2B) comprises a piston 70a (see FIG. 2B) having a structural framework 72 (see FIG. 2B).

Each of the one or more vacuum transport tube vehicles 12 (see FIG. 2B) further comprises at least one orifice 84 (see FIG. 2B), as discussed above, extending from a first inlet portion 86 (see FIG. 2F) in the first end 54 (see FIGS. 2B, 2F) through to a second outlet portion 88 (see FIGS. 2B, 2F) of the vacuum transport tube vehicle 12 (see FIGS. 2B, 2F). The second outlet portion 88 (see FIG. 2F) is positioned aft of the first inlet portion 86 (see FIG. 2F).

Each of the one or more vacuum transport tube vehicles 12 (see FIG. 2B) further comprises a drive assembly 100 (see FIG. 2B), as discussed above, coupled to the body 70

(see FIG. 2B) for driving the vacuum transport tube vehicle 12 (see FIG. 2B) through the vacuum transport tube 16 (see FIG. 2B). Each of the one or more vacuum transport tube vehicles 12 (see FIG. 2B) further comprises a power system 110 (see FIG. 2B) coupled to the drive assembly 100 (see FIG. 2B) for powering the drive assembly 100 (see FIG. 2B).

The step of installing 202 (see FIG. 17) one or more vacuum transport tube vehicles 12 (see FIG. 2A) in the interior 32a (see FIG. 2A) of the vacuum transport tube 16 (see FIG. 2A) comprises preferably installing an amount of ten (10) vacuum transport tube vehicles 12, or less, depending on if the power available to each car is increased (i.e., increased power per car may decrease the number of cars), to twenty (20) vacuum transport tube vehicles 12, such as cars 13 (see FIG. 16) in series, or in succession, within the vacuum transport tube 16. More preferably, the step of installing 202 comprises installing an amount of three (3) vacuum transport tube vehicles 12 to twenty (20) vacuum transport tube vehicles 12, such as cars 13 (see FIG. 16) in series, or in succession, within the vacuum transport tube 16. However, the vacuum transport tube vehicle system 10 may comprise more than twenty (20) vacuum transport tube vehicles 12, or cars 13, or one to nine (1-9) vacuum transport tube vehicles 12, or cars 13, within the vacuum transport tube 16.

The step of installing 202 (see FIG. 17) one or more vacuum transport tube vehicles 12 (see FIG. 2A) in the interior 32a (see FIG. 2A) of the vacuum transport tube 16 (see FIG. 2A) may comprise, in one embodiment, installing a multi-stage vehicle arrangement 180 (see FIG. 15) comprising two or more vacuum transport tube vehicles 12 (see FIG. 15) connected together, in series, or in succession, within the vacuum transport tube vehicle 16 (see FIG. 15). The multi-stage vehicle arrangement 180 is discussed in detail above in connection with FIG. 15.

As shown in FIG. 17, the method 200 further comprises step 204 of installing one or more pressure barriers 136 (see FIG. 3A) in the interior 32a (see FIG. 2A) of the vacuum transport tube 16 (see FIGS. 2A, 3A) aft of the one or more vacuum transport tube vehicles 12 (see FIGS. 2A, 3A).

As shown in FIG. 17, the method 200 further comprises step 206 of moving each vacuum transport tube vehicle (12) through the interior (32a) of the vacuum transport tube (16), and making one or more vehicle passes (53) with each vacuum transport tube vehicle (12) over a route length (36) of a vacuum transport tube route (38). The step of moving 206 (see FIG. 18) each vacuum transport tube vehicle 12 through the interior 32a of the vacuum transport tube 16 may comprise, in one embodiment, moving each vacuum transport tube vehicle 12 with the drive assembly 100 (see FIG. 2D) comprising a plurality of drive wheels 102 (see FIG. 2D) arranged in a circumferential arrangement 104 (see FIG. 2D) around the body 70 (see FIG. 2D).

The step of moving 206 (see FIG. 18) each vacuum transport tube vehicle 12 through the interior 32a of the vacuum transport tube 16 may comprise, in another embodiment, moving each vacuum transport tube vehicle 12 via a magnetic levitation (mag-lev) propulsion system 24 (see FIGS. 1B, 16) comprising a plurality of guide magnets 26 (see FIG. 1B) and a plurality of vehicle magnets 28 (see FIG. 1B), to create both lift and substantially frictionless propulsion to move each vacuum transport tube vehicle 12 (see FIG. 2A) through the vacuum transport tube 16 (see FIG. 2A).

As shown in FIG. 17, the method 200 further comprises step 208 of flowing air 40 (see FIG. 2B), through the at least one orifice 84 (see FIG. 2B) and through the annular gap 116 (see FIG. 2B) of each vacuum transport tube vehicle 12 (see FIG. 2B), from a forward space 44 (see FIG. 2B) in front of each vacuum transport tube vehicle 12 (see FIG. 2B), to an aft space 48 (see FIG. 2B) behind each vacuum transport tube vehicle 12, to create a delta pressure 52 (see FIG. 16) between a forward pressure 46 (see FIG. 2A) in the forward space 44 (see FIGS. 2A, 2B) and an aft pressure 50 (see FIG. 2A) in the aft space 48 (see FIGS. 2A, 2B), such that the aft pressure 50 is lower than the forward pressure 46, as the vacuum transport tube vehicle 12 moves.

The step of flowing 208 (see FIG. 17) air 40 (see FIG. 2B) through the annular gap 116 (see FIG. 2B) comprises flowing air 40 through the annular gap 116 having a gap distance 118 (see FIG. 2C) in a range of from about 0.25 inch to about 1.0 inch between the inner surface 34a (see FIG. 2A) of the vacuum transport tube 16 (see FIG. 2A) and the first end outer surface 58 (see FIG. 2B) at the first end 54 (see FIG. 2E) of the vacuum transport tube vehicle 12 (see FIG. 2E), when the vacuum transport tube vehicle 12 is installed in or moving or traveling through the interior 32a of the vacuum transport tube 16.

As shown in FIG. 17, the method 200 further comprises step 210 of evacuating air 40 (see FIG. 2A) from the vacuum transport tube 16 (see FIG. 2B), and reducing pressure 43 (see FIG. 7A) in the interior 32a (see FIG. 2A) of the vacuum transport tube 16 (see FIG. 2A) with each successive vehicle pass 53 (see FIG. 16), until a desired pressure 43a (see FIG. 16) is obtained and a vacuum 42 (see FIG. 16) is created in the interior 32a (see FIG. 2A) of the vacuum transport tube 16 (see FIG. 2A).

As shown in FIG. 17, the method 200 further comprises optional step 212 of installing at a route end 38a (see FIG. 14A) of the vacuum transport tube route 38 (see FIG. 14A), a route end boundary assembly 170 (see FIG. 14A). The route end boundary assembly 170 (see FIG. 14A) comprises a first route end pressure barrier 172 (see FIG. 14A), a second route end pressure barrier 174 (see FIG. 14A), and a flapper valve 176 (see FIG. 14A).

Disclosed embodiments of the vacuum transport tube vehicle system 10 (see FIGS. 2A, 2B, 16), the vacuum transport tube vehicle 12 (see FIGS. 2A, 2B), and the method 200 (see FIG. 17) provide for one or more vacuum transport tube vehicles 12 (see FIGS. 2A, 2B) that function like a piston inside a vacuum transport tube 16 (see FIG. 2A), and enable the economic and quick evacuation 41 (see FIG. 16), such as an initial evacuation 41a (see FIG. 16), of air 40 (see FIGS. 2A, 16), or other fluids, from inside the vacuum transport tube 16 (see FIG. 2A), over the route length 36 (see FIG. 16) of the vacuum transport tube route 38 (see FIG. 16), to eliminate or greatly reduce aerodynamic drag through the vacuum transport tube 16. Using the vacuum transport tube vehicle 12 (see FIGS. 2A, 2B) like a piston inside the cylindrical vacuum transport tube 16 (see FIG. 2A) allows for eliminating the use of commercially available pumping equipment, which may be very costly and may add additional weight to the vehicle. In addition, disclosed embodiments of the vacuum transport tube vehicle system 10 (see FIGS. 2A, 2B, 16), the vacuum transport tube vehicle 12 (see FIGS. 2A, 2B), and the method 200 (see FIG. 17) allow for a reduction in the cost, expense, and time to perform the evacuation 41, such as the initial evacuation 41a (see FIG. 16), of air 40 (see FIGS. 2A, 16), or other fluids, from inside the vacuum transport tubes 16 (see FIG. 2A).

Moreover, disclosed embodiments of the vacuum transport tube vehicle system 10 (see FIGS. 2A, 2B, 16), the vacuum transport tube vehicle 12 (see FIGS. 2A, 2B), and the method 200 (see FIG. 17) provide for pump elimination 186 (see FIG. 16) of expensive pumps, seal elimination 188 (see FIG. 16) of expensive seals, such as pressure seals or modular pressure seals, and close tolerance manufacturing elimination 190 (see FIG. 16) of the interface 192 (see FIG. 16) between the inner surface 34a (see FIG. 2A) of the vacuum transport tube 16 (see FIG. 2A) and each vacuum transport tube vehicle 12 (see FIG. 2A), as compared to existing vacuum transport tube evacuation systems and methods. The selection of geometry and piston speeds of the vacuum transport tube vehicle 12 (see FIG. 2A) moving or traveling through the vacuum transport tube 16 (see FIG. 2A) eliminate the need for expensive seals or close tolerance manufacturing of the interface 192 (see FIG. 16) between the vacuum transport tube vehicle 12 (see FIG. 2A) and the inner surface 34a (see FIG. 2A) of the vacuum transport tube 16 (see FIG. 2A). The orifice 84 (see FIGS. 2B, 2C) allows for the speed 94 (see FIG. 16) at a minimum speed 94a (see FIG. 16), or a low-speed regime, to be equal for several vacuum transport tube vehicles 12 (see FIGS. 2A, 3A, 4A).

The vacuum transport tube vehicle 12 (see FIGS. 2A, 2B) disclosed herein does not use a pressure seal to prevent the air 40 (see FIG. 2A) from escaping past the vacuum transport tube vehicle 12, but instead is constructed such that there is a small annular gap 116 (see FIGS. 2B, 2C) that is formed between the vacuum transport tube vehicle 12 (see FIG. 2B) and the inner surface 34a (see FIG. 2A) of the vacuum transport tube 16 (see FIG. 2A), when the vacuum transport tube vehicle 12 is installed or positioned within and moves or travels through the interior 32a (see FIG. 2A) of the vacuum transport tube 16 (see FIG. 2A). This approach greatly reduces the manufacturing costs, since the vacuum transport tube vehicle 12 that allows an annular gap 116 (see FIG. 2C) having a gap distance 118 (see FIG. 2C) in a range of about 0.25 inch to about 1 inch may be easily manufactured. This gap distance 118 (see FIG. 2C) range provides for close tolerance manufacturing elimination 190 (see FIG. 16), and thus, the manufacturing tolerances of the inner surface 34a (see FIG. 2A) of the vacuum transport tube 16 and the vacuum transport tube vehicle 12 (see FIGS. 2A, 2B) that is close to the inner surface 34a need not be a high tolerance, and using lower tolerance manufacturing reduces the cost of manufacturing. Further, the maintenance costs may be greatly reduced because there is no seal or wiper to wear out.

In addition, disclosed embodiments of the vacuum transport tube vehicle system 10 (see FIGS. 2A, 2B, 16), the vacuum transport tube vehicle 12 (see FIGS. 2A, 2B), and the method 200 (see FIG. 17) enable a relatively inexpensive vacuum 42 (see FIG. 16) to be created and maintained in vacuum transport tubes 16 (see FIG. 2A, 16), using one or more vacuum transport tube vehicles 12 configured for moving air 40 (see FIGS. 2A, 2B) from a first end 54 (see FIG. 2B) through an orifice 84 (see FIG. 2B) to an opposite end, such as to the second end 66 (see FIG. 2B), or through another side or body orifice in the vacuum transport tube vehicle 12, aft of the first end 54. The orifice 84 (see FIG. 2B, 2C) is preferably variable for fluid control, such as control of air 40 (see FIG. 2A), in achieving speed 94 (see FIG. 16) and power 96 (see FIG. 16) of the vacuum transport tube vehicle 12 (see FIGS. 2A, 2B). As the vacuum transport tube vehicle 12 (see FIGS. 2A, 2B) is propelled in a forward direction of travel 18a (see FIG. 2A), it pushes the air 40 (see FIG. 2A) in front of it out of the way, and lets only a small amount of air past it. Thus, a lower pressure results in the aft space 48 (see FIG. 2A) aft of the vacuum transport tube vehicle 12 (see FIGS. 2A-2B) because air 40 is not allowed to flow into the aft space 48 which has been enlarged by the movement of the vacuum transport tube vehicle 12 (see FIGS. 2A-2B) in the forward direction of travel 18a (see FIG. 2A).

Figure 18A:
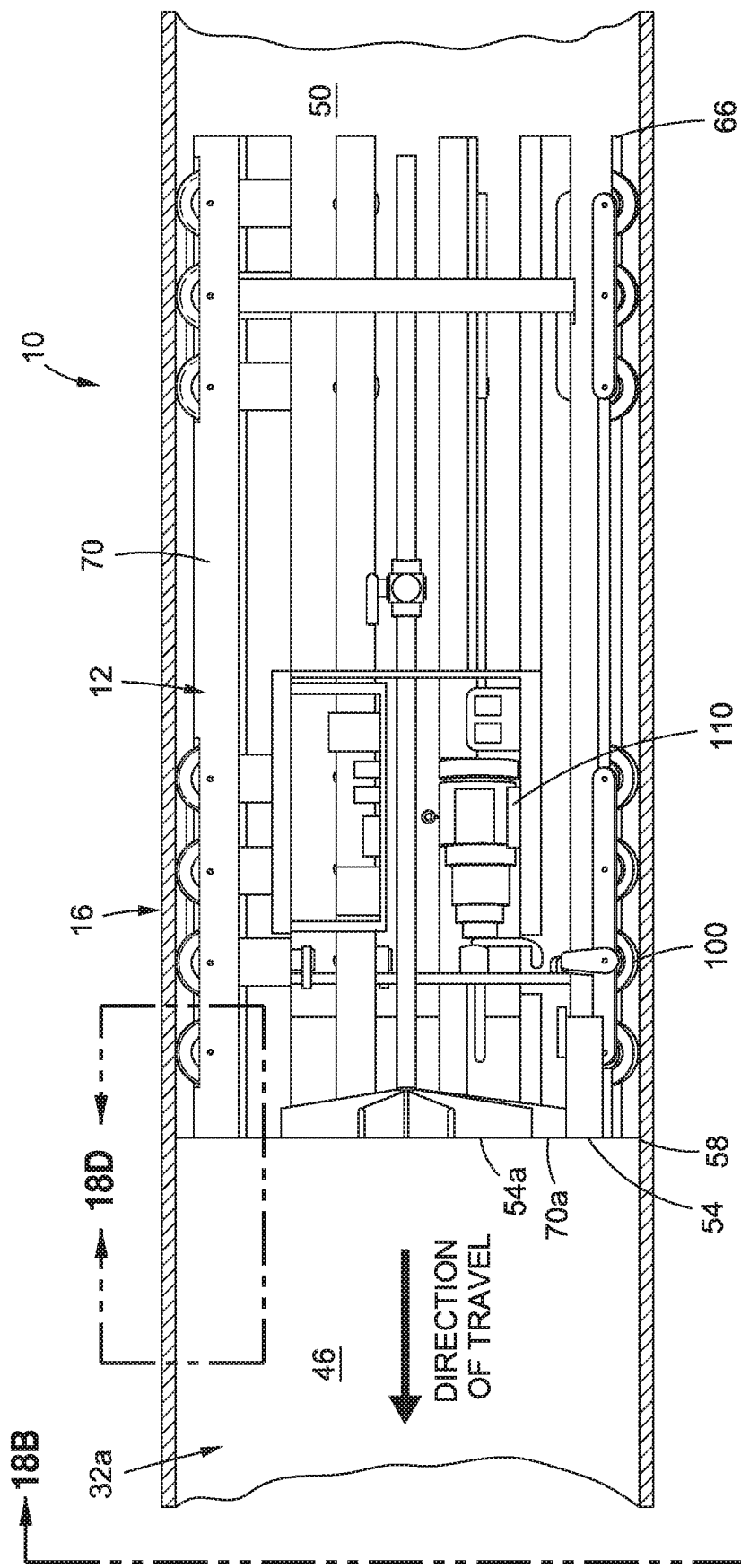
FIG. 18A is an illustration of a sectional side view of an example of a vacuum transport tube vehicle having a first end outer diameter that is fixed.

Referring now to FIGS. 18A-18B, shown is an example of a vacuum transport tube vehicle 12 configured similar to the above-described examples shown in FIGS. 2B-2C. In this regard, the vacuum transport tube vehicle 12 in FIGS. 18A-18B includes a first end 54, a second end 66, and a body 70 disposed between the first end 54 and the second end 66. As described above, the body 70 comprises a piston 70a having a piston head 54a and a first end outer surface 58. In addition, the vacuum transport tube vehicle 12 includes a drive assembly 100 coupled to the body 70 for driving the vacuum transport tube vehicle 12 through the vacuum transport tube 16. The vacuum transport tube vehicle 12 includes a power system 110 for powering the drive assembly 100. In contrast to the vacuum transport tube vehicle 12 shown in FIGS. 2B-2C, the vacuum transport tube vehicle 12 in FIGS. 18A-18B may lack an orifice 84 (FIG. 2C) extending from the first end 54 to the second end 66. However, in any of the examples disclosed herein, the vacuum transport tube vehicle 12 may include an orifice 84.

When the vacuum transport tube vehicle 12 of FIGS. 18A-18B is installed in a vacuum transport tube 16 (FIG. 18B-18C), an annular gap 116 is formed between the first end outer surface 58 and an inner surface 34a of the vacuum transport tube 16 as shown in FIG. 18C. As described above, the annular gap 116 allows air to flow between the vacuum transport tube vehicle 12 and the vacuum transport tube 16 as the vacuum transport tube vehicle 12 moves through the vacuum transport tube 16, and a delta pressure 52 (FIG. 16) is created between the first end 54 of the vacuum transport tube vehicle 12 and the second end 66 of the vacuum transport tube vehicle 12. The delta pressure 52 is the pressure difference between the forward pressure 46 in front of the first end 54 of the vacuum transport tube vehicle 12, and the aft pressure 50 behind the second end 66 of the vacuum transport tube vehicle 12. As described above, the aft pressure 50 is lower than the forward pressure 46. In this regard, the vacuum transport tube vehicle 12 is configured to create a vacuum with a desired pressure in the interior 32a of the vacuum transport tube 16 during one or more vehicle passes through the vacuum transport tube 16 such that the pressure in the interior 32a of the vacuum transport tube 16 is reduced after each vehicle pass.

In the example of FIGS. 18A-18D, the first end outer diameter 56 of the piston head 54a is fixed. The value of the first end outer diameter 56 may be selected based on the manufacturing tolerances of the vacuum transport tube inner diameter 31. In this regard, the first end outer diameter 56 is selected such that the gap distance 118 of the annular gap 116 ensures that the piston head 54a will not contact or scrape the inner surface 34a of the vacuum transport tube 16 when the vacuum transport tube vehicle 12 moves along the interior 32a of the vacuum transport tube 16. FIG. 18D is a side cross-sectional view of a vacuum transport tube vehicle 12 having a uniform or straight inner surface 34a of the vacuum transport tube 16, such that the gap distance 118 between the piston head 54a and the inner surface 34a of the vacuum transport tube 16 will be substantially constant as the vacuum transport tube vehicle 12 moves through the vacuum transport tube 16.

FIG. 18E shows a portion of an example of a vacuum transport tube 16 having waviness in the inner surface 34a profile. The waviness may be described as irregularities or non-uniformities 272 (FIG. 18E) in the inner surface 34a profile of the vacuum transport tube 16 that result in variations in the gap distance 118 (FIG. 18C) of the annular gap 116 (FIG. 18E) between the inner surface 34*a* of the vacuum transport tube 16 and the fixed diameter of the first end outer surface 58 as the vacuum transport tube vehicle 12 moves through the vacuum transport tube 16. Non-uniformities 272 in the inner surface 34*a* profile may occur in the longitudinal direction of the vacuum transport tube 16 and/or in the angular direction of the vacuum transport tube 16, resulting in variations in the gap distance 118 in the longitudinal direction of the vacuum transport tube 16 and/or in the angular direction around the circumference of the vacuum transport tube 16. The degree of waviness is exaggerated in FIGS. 18E-20D to better illustrate the concepts disclosed herein. Waviness or non-uniformities 272 in the inner surface 34*a* profile may be the result of manufacturing tolerances of the vacuum transport tube 16, and may be caused by variations in thickness of the vacuum transport tube 16 wall, and/or the result of non-circularity in one or more lengthwise sections of the vacuum transport tube 16. Alternatively or additionally, non-uniformities 272 in the inner surface 34*a* of the vacuum transport tube 16 may be the result of environmental factors associated with the operation of the vacuum transport tube vehicle system 10 (FIG. 18A).

Referring to FIGS. 19A-19B, shown is an example of a blade-actuator assembly 211 included with a vacuum transport tube vehicle 12. FIG. 19A shows a side view of the blade-actuator assembly 211 at a circumferential location of the vacuum transport tube 16, and FIG. 19B is a cross-sectional view of the vacuum transport tube vehicle 12 showing a portion of the blade-actuator assembly 211 of FIG. 19A. The vacuum transport tube vehicle 12 in FIGS. 19A-19B is configured similar to the above-described vehicle examples. For example, the vacuum transport tube 16 has a first end 54, a second end 66 (FIG. 18A), and a body 70 disposed between the first end 54 and the second end 66. The body 70 comprises a piston 70*a*. The first end 54 comprises a piston head 54*a* having a piston perimeter portion 71.

Referring still to FIGS. 19A-19B, as described below, the blade-actuator assembly 211 is configured to actively accommodate non-uniformities 272 in the inner surface 34*a* profile of a vacuum transport tube 16 during movement of the vacuum transport tube vehicle 12 through the vacuum transport tube 16, and thereby allow the annular gap 116 to be maintained at a constant and relatively short gap distance 118. By maintaining a relatively short gap distance 118, the blade-actuator assembly 211 advantageously reduces the amount of air that flows between the vacuum transport tube vehicle 12 and the inner surface 34*a* of the vacuum transport tube 16 during movement of the vacuum transport tube vehicle 12, and thereby improves the efficiency with which the vacuum transport tube vehicle 12 generates a desired vacuum level within the vacuum transport tube 16, relative to a vacuum transport tube vehicle 12 lacking a blade-actuator assembly 211 and which therefore requires a larger gap distance 118 to avoid contact between the vacuum transport tube vehicle 12 and the inner surface 34*a* of the vacuum transport tube 16. The presently-disclosed blade-actuator assembly 211 may be incorporated into any one of the vacuum transport tube vehicle 12 examples disclosed herein.

As shown in FIGS. 19A-19B and 21A-21E, the blade-actuator assembly 211 comprises a circumferential blade member 213 and a plurality of blade segment actuators 234. The blade member 213 extends continuously (e.g., 360 degrees) around the piston head 54*a* and is located proximate the piston perimeter portion 71. Although the blade member 213 is shown located forward of the piston head 54*a*, the blade member 213 and/or the blade segment actuators 234 may be located aft of the piston head 54*a*. The blade member 213 is sealed to the piston head 54*a* as described below, and has a blade perimeter portion 214 (FIG. 21E) defining a first end outer surface 58. As shown in FIG. 21E, the first end outer surface 58 is the radially outermost portion of the blade member 213. The annular gap 116 is formed between the first end outer surface 58 and the inner surface 34*a* of the vacuum transport tube 16 when the vacuum transport tube vehicle 12 is installed in an interior 32*a* (FIG. 18A) of the vacuum transport tube 16.

As shown in FIGS. 19A-19B and 21A-21E, the plurality of blade segment actuators 234 (FIG. 21B) are arranged circumferentially around the piston perimeter portion 71 and are coupled to the blade member 213 at a corresponding plurality of blade circumferential locations 216 (FIGS. 19B and 21B). In the example shown, the plurality of blade segment actuators 234 may be equi-angularly spaced around the piston perimeter portion 71. However, in other examples, the blade segment actuators 234 may be non-equi-angularly spaced. The blade segment actuators 234 are each configured to actively adjust the radial position of the blade member 213 at a corresponding blade circumferential location 216. The blade member 213 is formed of a circumferentially flexible material allowing for independent radial positioning of the blade member 213 at each of the blade circumferential locations 216.

As shown in FIGS. 19A-19B, the blade-actuator assembly 211 includes a plurality of distance sensors 260 and one or more processors 280. The plurality of distance sensors 260 are mounted in fixed position forward of the blade member 213. In the example shown, the distance sensors 260 are mounted on a sensor support bracket 266 extending forwardly from the piston head 54*a*. The distance sensors 260 are each configured to continuously measure the local radial distance 268 respectively between the distance sensors 260 and the inner surface 34*a* of the vacuum transport tube 16 respectfully at locations axially aligned with the blade circumferential locations 216 (FIG. 21D). The distance sensors 260 are configured to continuously generate sensor signals representative of the measurements of the local radial distance 268 during movement of the vacuum transport tube vehicle 12 through the vacuum transport tube 16.

The one or more processors 280 are configured to continuously receive the sensor signals from the distance sensors 260, and command the blade segment actuators 234 to adjust the radial position of the blade member 213 respectively at the blade circumferential locations 216 in a manner maintaining the annular gap 116 at each blade circumferential location 216 at a constant gap distance 118 during movement of the vacuum transport tube vehicle 12. The processor 280 may determine the amount of adjustment of the radial position of the blade member 213 at each blade circumferential location 216 based on: the instantaneous local radial distance 268 at each distance sensor 260, the axial distance (e.g., a constant value) from each distance sensor 260 to the corresponding blade segment actuator 234, and on the instantaneous velocity of the vacuum transport tube vehicle 12 within the vacuum transport tube 16. The instantaneous velocity of the vacuum transport tube vehicle 12 may be continuously measured and continuously provided to the processor 280 by a vehicle speed sensor (not shown) that may be included with the vacuum transport tube vehicle 12. In this regard, for each one of the blade circumferential locations 216, the processor 280 continuously calculates the radial location of the inner surface 34a of the vacuum transport tube 16, and commands the radial segment actuators to adjust the radial position of the blade segment to accommodate variations in the inner surface 34a profile so as to maintain a constant gap distance 118 at each blade circumferential location 216. The processor 280 may comprise any type of computing device, including computing hardware and software, for continuously commanding the radial segment actuators.

As shown in FIG. 19A, the sensor signals generated by each distance sensor 260 are representative of the inner surface 34a profile in the longitudinal direction of the vacuum transport tube 16. In this regard, the sensor signals generated at a given circumferential location represent the longitudinal cross-sectional profile of the inner surface 34a of the vacuum transport tube 16 at the given circumferential location. Referring to FIG. 19B, the sensor signals generated by the circumferential arrangement of distance sensors 260 additionally provides a means for detecting and measuring non-uniformities 272 in the radial cross-sectional profile of the inner surface 34a of the vacuum transfer tube. For example, the processor 280 may be configured to continuously determine or measure non-circularity in the inner surface 34a of the vacuum transport tube 16 during movement of the vacuum transport tube vehicle 12 by continuously comparing the local radial distance 268 measurements from sensor signals generated by adjacently located distance sensors 260. In addition, the local radial distance 268 measurements may be used to assess the quality of the installation of the vacuum transport tube vehicle system 10. For example, measurements of the non-circularity of the cross-section of the vacuum transport tube 16 may be compared to design requirements to determine whether the non-circularity measurements are within design tolerances. The collective set of measurements from different vacuum transport tube vehicle system 10 installations may be compared to determine a reasonable expectation for maximum non-circularity in the construction of a vacuum transport tube 16. Such data can also be used to help evaluate the relative merits of different types of construction of the vacuum transport tube 16.

FIG. 19B shows a single processor 280 configured to receive sensor signals from the distance sensors 260 (FIG. 19A), and command the blade segment actuators 234 to adjust the radial position of the blade member 213 at the blade circumferential locations 216. In this regard, a single processor 280 may receive sensor signals from all of the distance sensors 260 around the circumference of the piston head 54a. However, the blade-actuator assembly 211 may include a plurality of processors 280 equal in quantity to the quantity of blade segment actuators 234, and each processor 280 may be dedicated to one of the distance sensors 260 and blade segment actuators 234.

Figure 20A:
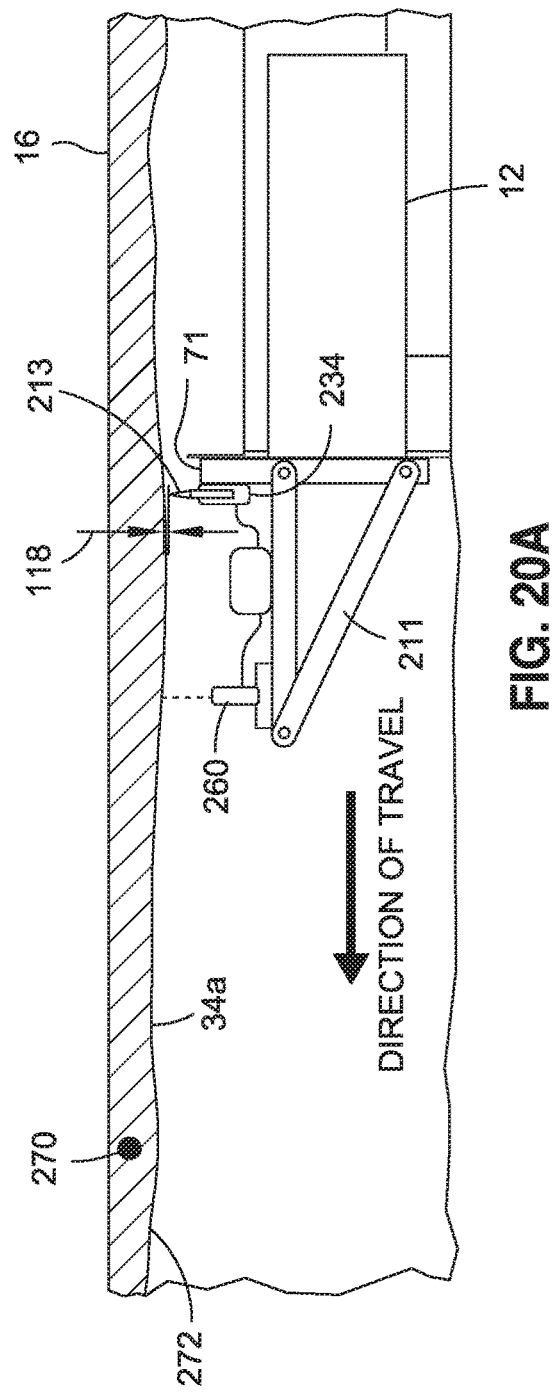
Figure 20B:
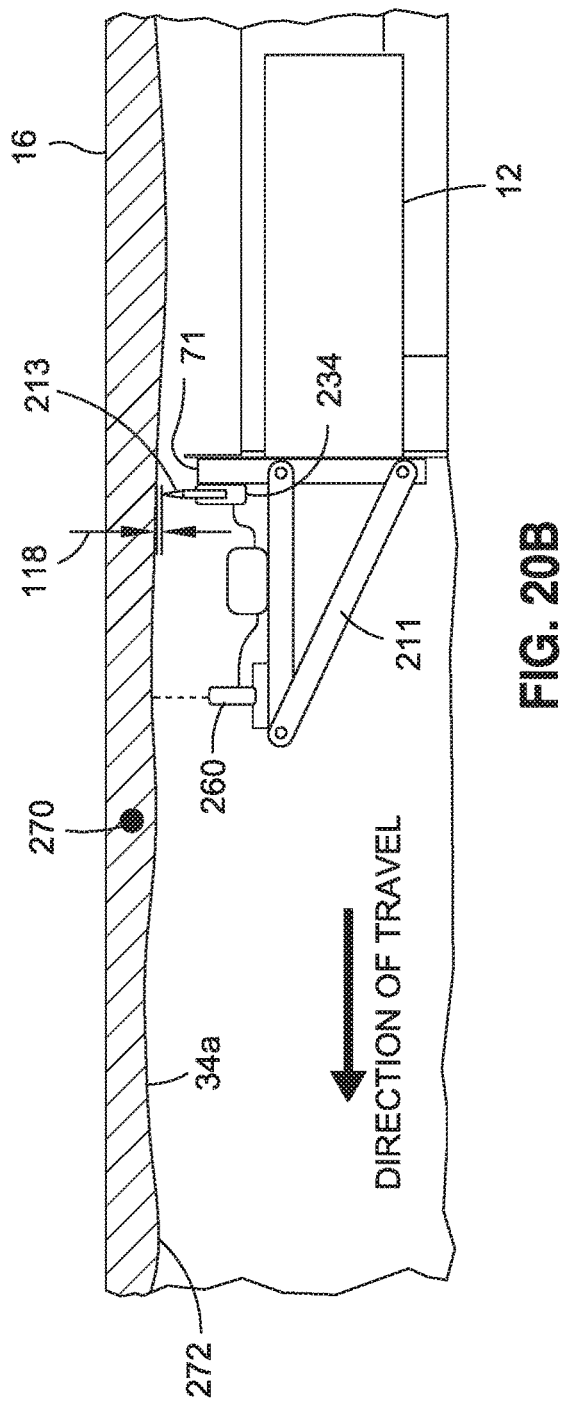

Referring to FIGS. 20A-20D, shown is a sequence of sectional side views of a portion of a vacuum transport tube vehicle 12 showing an example of the blade-actuator assembly 211, and illustrating relative movement of the vacuum transport tube vehicle 12 within a vacuum transport tube 16 having non-uniformities 272 in the inner surface 34a profile. In each one of FIGS. 20A-20D, shown is a motion marker 270 superimposed on the vacuum transport tube 16 to help illustrate the operation of the blade-actuator assembly 211. In this regard, the motion marker 270 is not an actual feature of the vacuum transport tube 16. In the sequence of views of FIGS. 20A-20D, the vacuum transport tube vehicle 12 is stationary and the vacuum transport tube 16 moves to the right, as indicated by the location of the motion marker 270 which moves progressively further to the right in the FIGS. FIG. 20B shows that the blade segment actuator 234 has moved the blade member 213 upwardly compared to the previous FIG. 20A, in order to follow the inner surface 34a profile of the vacuum transport tube 16 as measured by the distance sensor 260 in FIG. 20A. FIG. 20C shows that the blade segment actuator 234 has moved the blade member 213 slightly downwardly compared to FIG. 20B, in order to follow the inner surface 34a profile of the vacuum transport tube 16 as measured by the distance sensor 260 in FIG. 20B. FIG. 20D shows that the blade segment actuator 234 has moved the blade member 213 slightly upwardly compared to FIG. 20C, in order to follow the inner surface 34a profile of the vacuum transport tube 16 as measured by the distance sensor 260 in FIG. 20C.

The active adjustment of the radial position of the blade member 213 at each blade circumferential location 216 provides a means for accommodating non-uniformities 272 in the inner surface 34a profile of the vacuum transport tube 16 while maintaining the blade member 213 at each blade circumferential location 216 (FIG. 21C) in close, non-contacting proximity to the inner surface 34a of the vacuum transport tube 16. In this regard, the blade-actuator assembly 211 maintains the annular gap 116 at each blade circumferential location 216 at a substantially constant and relatively short gap distance 118 during movement of the vacuum transport tube vehicle 12 through the vacuum transport tube 16. As mentioned above, the active adjustment of the radial position of the blade member 213 at the blade circumferential locations 216 allows for maintaining the annular gap 116 at a reduced gap distance 118 during movement of the vacuum transport tube vehicle 12 through the vacuum transport tube 16, thereby improving the vacuum transport tube vehicle 12 efficiency in creating an aft pressure 50 (FIG. 18A) behind the vacuum transport tube vehicle 12 that is lower than a forward pressure 46 (FIG. 18A) in front of the vacuum transport tube vehicle 12 to result in a vacuum of a desired pressure in the interior 32a (FIG. 18A) of the vacuum transport tube 16 caused by one or more vehicles 12 passing through the vacuum transport tube 16. In addition, actively adjusting the blade member 213 to remain in close, non-contacting proximity to the inner surface 34a of the vacuum transport tube 16 results in reduced manufacturing costs by allowing for larger manufacturing tolerances in the vacuum transport tube vehicle 12, and larger manufacturing tolerances in the vacuum transport tube 16, such as larger tolerances for the vacuum transport tube inner diameter 31. Furthermore, maintaining the blade member 213 in non-contacting relation to the inner surface 34a of the vacuum transport tube 16 may reduce operational costs by avoiding the maintenance otherwise associated with the piston head 54a contacting or scraping the inner surface 34a of the vacuum transport tube 16.

Referring to FIGS. 21A-21E, shown is a further example of a blade-actuator assembly 211 mounted to the piston head 54a of a vacuum transport tube vehicle 12. FIG. 21A is a perspective view of the vacuum transport tube vehicle 12 which may be configured similar to the above-described examples. As noted above, the blade-actuator assembly 211 includes a plurality of blade segment actuators 234 arranged circumferentially around the piston perimeter portion 71 and coupled to the blade member 213 at a corresponding plurality of blade circumferential locations 216 as shown in FIGS. 21C-21D. Each one of the blade segment actuators 234 may be operated in conjunction with a corresponding distance sensor 260 mounted at a location forward of the blade segment actuator 234. Each one of the blade segment actuators 234 is coupled to the blade member 213 which extends circumferentially around the piston head 54a. Although shown having an orifice 84 as described above, the vacuum transport tube vehicle 12 may be provided in an alternative arrangement in which the orifice 84 is omitted.

FIGS. 21B, 21D and 21E show a portion of the blade-actuator assembly 211 and a portion of the blade member 213. Also shown are some of the blade segment actuators 234 for adjusting the radial position of the blade member 213 at the respective blade circumferential locations 216 (FIG. 21D). The distance sensors 260 are each shown mounted on a sensor support bracket 266 which extends forward of the blade segment actuators 234. Each sensor support bracket 266 may have a horizontal beam cantilevered out from the piston head 54a. However, in other examples, the sensor support bracket 266 may include a diagonal brace as shown in FIG. 19A. Each sensor support bracket 266 may have a vertical beam to which the distance sensor 260 may be mounted. As mentioned above, each distance sensor 260 is configured to continuously measure the local radial distance 268 respectively between the distance sensor 260 and the inner surface 34a of the vacuum transport tube 16 at a location forward of and axially aligned with the blade segment actuator 234. As may be appreciated, the sensor support bracket 266 may be provided in any one of a variety of alternative configurations for supporting the distance sensors 260, and is not limited to the configuration shown in the figures. For example, a circumferential arrangement of distance sensors 260 may be mounted on a circumferential ring (not shown) that may be coupled to the piston head 54a. However, the sensor support bracket 266 shown in FIGS. 21B, 21D and 21E may represent a modular approach that may facilitate quick installation and removal of individual distance sensors 260.

The distance sensors 260 may be provided in any one of a variety of configurations capable of measuring the distance to the inner surface 34a of the vacuum transport tube 16. For example, one or more of the distance sensors 260 may be provided as a laser distance measuring device 262 (e.g., time-of-flight laser measuring device; triangulation laser measuring device) configured to emit a laser beam 264 (FIG. 21E). Each one of the distance sensors 260 may be oriented such that the laser beam 264 is locally perpendicular to the inner surface 34a of the vacuum transport tube 16. Although shown as laser distance measuring devices 262, the distance sensors 260 may be provided in alternative configurations including, but not limited to, a light-emitting-diode distance measuring device, an interferometer distance measuring device, and an ultrasonic distance measuring device or other configurations.

Referring still to FIGS. 21B, 21D and 21E, the blade member 213 may comprise a plurality of discrete blade segments 218 circumferentially arranged in spaced relation to each other proximate the blade perimeter portion 214. The plurality of blade segments 218 may be respectively coupled to the plurality of blade segment actuators 234. In the example shown, the blade segments 218 may be equal in quantity to the quantity of blade segment actuators 234. Each one of the blade segments 218 may be formed of a rigid or stiff material such as a metallic, polymeric (e.g., plastic or graphite-epoxy composite) material formed as a solid or hollow block. Each one of the blade segments 218 may have tapered sides intersecting or interconnected at an apex and defining a generally wedge-shaped cross section as shown in FIG. 21E. The apex of each one of the blade segments 218 may be rounded as shown, and may define the blade perimeter portion 214 of the blade member 213.

Referring still to FIG. 21E, the blade member 213 may further include a contiguous seal portion 220 formed of circumferentially flexible material. For example, the seal portion 220 may be formed of a non-porous elastomeric material such as silicone, rubber, or other elastomeric material that is stretchable and flexible or bendable in the out-of-plane direction. The seal portion 220 may extend circumferentially between and may overlap the outer surfaces of the blade segments 218. In addition, the seal portion 220 of the blade member 213 may extend radially between the piston head 54a and the blade segments 218 in a manner preventing air leakage between the blade member 213 and the piston head 54a. For example, as shown in FIG. 21E, the seal portion 220 of the blade member 213 may include a seal overmolding 222 covering the tapered sides of the blade segments 218. In this regard, the seal portion 220 forms an outer layer over the blade segments 218. The radially outermost surface of the seal portion 220 comprises the blade perimeter portion 214 which forms the radially inner side of the annular gap 116 between the blade member 213 and the inner surface 34a of the vacuum transport tube 16.

In FIG. 21E, the seal portion 220 may comprise a seal membrane 224 which extends radially between the blade segments 218 and the piston head 54a for sealing the blade member 213 to the piston head 54a. The seal membrane 224 may have a bulbous cross-sectional shape to accommodate adjustments of the radial position of the blade member 213 at the blade circumferential locations 216. In addition, the seal portion 220 may comprise a generally planar seal flange 226 for attaching the seal membrane 224 to the piston head 54a. In the example shown, the piston head 54a may include a spacer block 228 to which the blade segment actuators 234 may be mounted. The spacer block 228 may provide clearance for flexing of the bulbous cross-sectional shape of the seal membrane 224 during radial movement of the blade member 213 at the blade circumferential locations 216. The spacer block 228 may be configured as a ring-shaped spacer block 228 or as a circumferential arrangement of discrete spacer blocks 228 mounted to the piston head 54a.

Referring to FIGS. 21B, 21D and 21E, the plurality of blade segment actuators 234 are shown as linear actuators 236 each having an axially extendable pushrod 238 (FIG. 21E). Each one of the linear actuators 236 may be mounted to the piston head 54a such that the pushrod 238 is oriented in a radial direction. Each pushrod 238 has a rod end 240 (FIG. 21E). In the example shown, the rod end 240 of each one of the pushrods 238 may be directly coupled to one of the blade segments 218. Upon receiving the command by the processor 280 (FIG. 19A), each one of the blade segment actuators 234 is configured to adjust the radial position of the blade member 213. In any one of the examples disclosed herein, the linear actuators 236 may be high-speed linear actuators 236 to allow the blade segments 218 to be rapidly positioned when the vacuum transport tube vehicle 12 moves at relatively high speeds. In any one of the examples disclosed herein, the blade segment actuators 234 may be configured to maintain the gap distance 118 of the annular gap 116 within a range of 0.005 to 0.100 inch at each of the blade circumferential locations 216 during movement of the vacuum transport tube vehicle 12 through the vacuum transport tube 16. As mentioned above, the relatively short gap distance 118 improves the vacuum transport tube vehicle 12 efficiency in generating a vacuum of a desired pressure in the interior 32a of the vacuum transport tube 16.

Referring to FIG. 22 is a side view of a further example of the blade-actuator assembly 211 that may be included with a vacuum tube transport vehicle 12. The seal portion 220 may encapsulate the lever arms 250, and may also extend circumferentially between the lever arms 250. In the example shown, the blade-actuator assembly 211 includes a plurality of lever arms 250 respectively at the plurality of the blade segment actuators 234. The lever arms 250 are oriented at a lever angle that is non-parallel and non-perpendicular to the direction of travel of the vacuum transport tube vehicle 12, and resulting in the seal portion 220 having a conical shape. The seal portion has a seal forward side generally facing toward the direction of travel of the vacuum tube transport vehicle 12. In an alternative example not shown, the lever arms 250 may be oriented parallel to the direction of travel of the vacuum transport tube vehicle 12, resulting in the seal portion 220 having a cylindrical shape.

In FIG. 22, each lever arm 250 has a pivoting end 252 and a terminal end 254. The pivoting end 252 may be hingedly coupled to a lever mounting plate 246 mounted to or integrally formed with the piston head 54a. The pivoting end 252 of the lever arm 250 may be pivotably engaged to a groove 248 formed in the perimeter edge of the lever mounting plate 246. The blade segment 218 at each lever arm 250 may be defined by the seal portion 220 of the blade member 213, which encapsulates the lever arm 250, as described in greater detail below. Alternatively, the terminal end 254 of each lever arm 250 may be fixedly coupled to a blade segment 218 which may be a discrete component (not shown) separate from the lever arm 250 similar to the above-described arrangement shown in FIGS. 21B and 21E.

In FIG. 22, the plurality of blade segment actuators 234 are linear actuators 236 each having an axially extendable pushrod 238 oriented in a radial direction as described above. The pushrod 238 of each blade segment actuator 234 may be directly coupled (e.g., via a clevis fitting 242 and pin 244) to the lever arm 250 at a location nearer the pivoting end 252 than the terminal end 254. By locating the pushrod 238 attachment point nearer the pivoting end 252 than the terminal end 254, the lever arm 250 provides mechanical amplification of the speed and the range of motion of the blade segment 218 when actuated by the blade segment actuator 234. The blade segment actuators 234 in FIG. 22 may each be configured as a piezo-electric actuator which may provide improved positioning accuracy and relatively rapid response time in radially positioning the blade member 213. The relatively short stroke of piezo-electric actuators may be accommodated by the mechanical advantage of the lever arm 250 which amplifies the radial movement at the terminal end 254 of the lever arm 250. The relatively high frequency of piezo-electric actuators may dictate that the lever arm 250 has a higher bending stiffness than would be required for a non-piezo-electric actuator. A higher bending stiffness of the lever arm 250 may be accommodated by increasing the thickness of the lever arm 250 at the location proximate the pivoting end 252.

For the blade-actuator assembly 211 configuration shown in FIG. 22, the seal portion 220 of the blade member 213 may extend circumferentially between adjacent pairs of the lever arms 250 similar to the arrangement shown in FIG. 21B. In addition, as mentioned above, the seal portion 220 may encapsulate the lever arms 250 and the lever mounting plate 246 in a manner preventing air leakage between the blade member 213 and the piston head 54a. Furthermore, the encapsulation of the blade-actuator assembly 211 by the seal portion 220 may hold together the assembly of lever arms 250 and lever mounting plate 246. As mentioned above, the blade segment 218 may be integral with the seal portion 220 of the blade member 213. For example, at the terminal ends 254 of the lever arms 250, the seal overmolding 222 may have a generally wedge-shaped cross section as shown in FIG. 22. The wedge-shaped cross-section of the seal overmolding 222 may define the blade segment 218 at each one of the blade segment actuators. The wedge-shaped cross-section of the seal overmolding 222 extends circumferentially around the piston head 54a. The apex of the wedge-shaped cross section may define the blade perimeter portion 214 of the blade member 213.

FIG. 23 is a side view of a portion of a vacuum transport tube vehicle 12 showing an example of a blade-actuator assembly 211 having a force-balancing mechanism 290 at each one of the lever arms 250. The blade-actuator assembly 211 may include a plurality of the force-balancing mechanism 290 respectively at the plurality of blade segment actuators 234. The force-balancing mechanisms 290 may collectively generate a balancing force 294 to counteract a piston head force 296 exerted on a seal forward side of the blade member 213 as a result of the delta pressure 52 (FIG. 16) between the forward pressure 46 in front of the vacuum transport tube vehicle 12 being higher than the aft pressure 50 behind the vacuum transport tube vehicle 12 during movement of the vacuum transport tube vehicle 12 through the vacuum transport tube 16. Collectively, the force-balancing mechanisms 290 may substantially reduce or prevent the piston head force 296 from being imposed on the blade segment actuators 234. By reducing or preventing the piston head force 296 from being carried by the blade segment actuators 234, the response time of the blade segment actuators 234 may be improved. In addition, power consumption of the blade segment actuators 234 may be reduced. Furthermore, the service life of the blade segment actuators 234 may be increased.

In FIG. 23, the force-balancing mechanism 290 at each blade segment actuator 234 may be configured as a coil spring 292 (e.g., tension spring) extending between the lever arm 250 and the piston head 54a. However, in other examples not shown, the force-balancing mechanism 290 at each blade segment actuator 234 may be provided in alternative configurations. For example, each one of the force-balancing mechanisms 290 may be provided as a torsion spring coupled to the pivoting end 252 of the lever arm 250 and preloaded to generate a balancing force 294 to substantially counteract the piston head force 296 exerted on the blade member 213 as a result of the forward pressure 46 being higher than the aft pressure 50 during movement of the vacuum transport tube vehicle 12 to the vacuum transport tube 16. In some examples (not shown) of the blade-actuator assembly 211, the coil spring 292 at each blade segment actuator 234 may extend between the lever arm 250 and the sensor support bracket 266, and which would represent a configuration in which the balancing force 294 applied by the coil spring 292 is non-adjustable. The coil spring 292 may be attached to the terminal end 254 of the lever arm 250 in order to maximize the mechanical advantage of the coil spring 292 in counteracting the piston head force 296 on the blade member 213.

In the example of FIG. 23, the lower end of the coil spring 292 is coupled to a dedicated secondary actuator 300 mounted to the sensor support segment bracket. Each dedicated secondary actuator 300 may be configured as a linear actuator 236 having a pushrod 238 to which the coil spring 292 is attached. The secondary actuators 300 are each configured to actively adjust the balancing force 294 as the delta pressure 52 changes over time during movement of the vacuum transport tube vehicle 12 through the vacuum transport tube 16. For example, as described above, FIG. 8 shows the pressure ratio (e.g., delta pressure 52) between the forward pressure 46 and aft pressure 50 changing (e.g., declining) during the pass of each of the first 10 cars (i.e., vehicles 12) through the vacuum transport tube 16, such that the secondary actuator 300 at each blade segment actuator 234 may gradually reduce the magnitude of the balancing force 294 exerted on the lever arm 250 as each vehicle 12 moves from the beginning to the end of the vacuum transport tube 16. For each of cars 11 through 18, FIG. 8 shows the pressure ratio being relatively low and substantially constant as each car passes through the transfer tube, such that the force-balancing mechanism 290 may apply a minimal and substantially constant balancing force 294 to the lever arm 250 of cars 11 through 18.

FIG. 24 is a side view of a portion of the vacuum transport tube vehicle 12 showing a further example of a force-balancing mechanism 290 in which the coil spring 292 is coupled by a cable 302 to a common secondary actuator 300 mounted to the center of the piston head 54a. In this regard, each one of the coil springs 292 for the plurality of blade segment actuators 234 may be coupled to one or more common secondary actuators 300 located on the piston head 54a. In the example shown, common secondary actuator 300 may be centered on the piston head 54a and may be coincident with vehicle centerline 11. Although a single common secondary actuator 300 is shown, in an example not shown, a plurality of common secondary actuators 300 may be mounted in a circular arrangement on the piston head 54a and ganged together to operate in unison for adjusting the balancing force 294 on the plurality of coil springs 292 at the respective plurality of blade segment actuators 234.

In FIG. 24, the cable 302 of each coil spring 292 extends radially inwardly toward the common secondary actuator 300 at the center of the piston head 54a. Each one of the cables 302 may be coupled to a circular array of bellcranks 304. For example, each cable 302 may be coupled to a first arm of a bellcrank 304 which may be pivotably mounted to the piston head 54a via a bellcrank mounting frame 306 surrounding the common secondary actuator 300. Each bellcrank 304 has a second arm that is pivotably coupled to a pushrod 238 of the common secondary actuator 300. The balancing force 294 exerted by each coil spring 292 may be actively adjusted by extending or retracting the pushrod 238 of the common secondary actuator 300. Due to the slow rate of change of the delta pressure 52 as each vehicle 12 passes through the vacuum transport tube 16, and therefore the piston head force 296, a single common secondary actuator 300 can control a plurality of coil springs 292.

FIG. 25 is a side view of a portion of vacuum transport tube vehicle 12 showing a still further example of a force-balancing mechanism 290 comprised of a pressure membrane 308. In FIG. 25, each one of the coil springs 292 is coupled to the pressure membrane 308 which may be integrated into the piston head 54a and arranged such that the pressure membrane 308 is subjected to both the forward pressure 46 and the aft pressure 50 when the delta pressure 52 (FIG. 16) is generated as a result of the movement of the vacuum transport tube vehicle 12 through the vacuum transport tube 16. The pressure membrane 308 may be an annular-shaped sheet of elastomeric material (e.g., silicon, rubber, etc.) integrated into the piston head 54a and which may be centered on the piston head 54a. In a further example not shown, the pressure membrane 308 may be configured as a disc-shaped sheet of material. The cable 302 from each coil spring 292 may extend radially inwardly toward a pulley 316 supported by a pulley bracket 318 mounted to the sensor support bracket 266 at the location of each blade segment actuator 234. Each cable 302 may make a 90-degree bend around the pulley 316 such that each cable 302 is oriented parallel to the vehicle centerline 11 and attached to the pressure membrane 308. In this regard, the plurality of cables 302 from the corresponding plurality of coil springs 292 may be attached to the pressure membrane 308 in a circular array of cable attachment locations. The pressure membrane 308 may be sized to apply a balancing force 294 on each lever arm 250 of a magnitude that approximately counterbalances the piston head force 296 exerted on the blade member 213. In this regard, the pressure membrane 308 may be configured to deflect (e.g., in an out-of-plane direction) by an amount proportional to changes in the delta pressure 52, causing a corresponding adjustment in the balancing force 294 exerted by each coil spring 292 on the blade member 213. Advantageously, the pressure membrane 308 provides a passive means for adjusting the balancing force 294 in proportion to changes in the delta pressure 52 as the vacuum transport tube vehicle 12 passes through the vacuum transport tube 16. In a further example not shown, instead of a pulley 316 (FIG. 25) for bending each cable 90 degrees for attachment to a pressure membrane 308, a bellcrank 304 (e.g., FIG. 24) may be used for coupling each cable 302 to the pressure membrane 308.

FIG. 26 is a side view of a portion of the vacuum transport tube vehicle 12 showing a still further example of a force-balancing mechanism 290 in which a coil spring 292 is integrated into each blade segment actuator 234. As shown in FIG. 26, the blade segment actuator 234 includes a pushrod 238 coupled to the lever arm 250. The pushrod 238 has a pushrod 238 extension that extends out of a back end of the blade segment actuator 234. The coil spring 292 may be mounted on the pushrod 238 extension and sandwiched between a pushrod nut 310 threadably engaged to a terminal end 254 of the pushrod 238 extension on one side of the coil spring 292, and a jackscrew 312 located on an opposite side of the coil spring 292. The jackscrew 312 may be adjusted via a servo-driven adjusting collar 314 that may be threadably engaged to the jackscrew 312. The coil spring 292 may be preloaded by the jackscrew 312 to apply a balancing force 294 on the lever arm 250 in an amount that counterbalances the piston head force 296 exerted on the blade member 213 by the delta pressure 52 during movement of the vacuum transport tube vehicle 12 through the vacuum transport tube 16. The servo-driven adjusting collar 314 may be rotated for axially extending and retracting the jackscrew 312 out of the back end of the blade segment actuator 234 as a means to actively adjust the preload (i.e., the balancing force 294) exerted on the pushrod 238 in proportion to changes in the delta pressure 52. Advantageously, the force-balancing mechanism 290 shown in FIG. 26 combines the brute force balancing function with the quick-responding actuation of the lever arm 250 into a common unit.

Referring to FIGS. 27A-27B, shown is an example of a vacuum transport tube vehicle 12 having a plurality of diaphragm assemblies 384 positioned in front of the piston head 54a and mounted in spaced relation to each other. In the example shown, the vacuum transport tube vehicle 12 includes three (3) diaphragm assemblies 384, one of which comprises the piston head 54a having the above-described blade-actuator assembly 211. However, any one of the above-described vacuum transport tube 16 examples may include any number of diaphragm assemblies 384. Each diaphragm assembly 384 includes a diaphragm plate 286 oriented perpendicular to the direction of travel and having a plate perimeter portion 288. The diaphragm plate 286 may have a circular shape. A blade-actuator assembly 211 as described above is coupled to each diaphragm plate 286.

Each diaphragm assembly 384 creates an aft pressure 50 directly behind the diaphragm plate 286 (e.g., between the diaphragm plate 286 and the piston head 54a) that is lower than the forward pressure 46 in front of the diaphragm plate 286, and which results in the aft pressure 50 behind the vacuum transport tube vehicle 12 being lower than the aft pressure 50 behind a vacuum transport tube vehicle 12 lacking the diaphragm assembly 384. A vacuum transport tube vehicle 12 having a plurality of diaphragm assemblies 384 may generate vacuum pressure behind the vacuum transport tube vehicle 12 more efficiently than a vacuum transport tube vehicle 12 lacking a plurality of diaphragm assemblies 384. In this regard, a vacuum transport tube vehicle system 10 may generate the same level of vacuum with fewer vehicles 12 than a vacuum transport tube vehicle system 10 with a larger number of vehicles 12. For example, to achieve a vacuum level of $10^{-3}$ Torr may require ten (10) vehicles that lack multiple diaphragms. The same vacuum level ($10^{-3}$ Torr) may be achieved by only two vehicles having multiple diaphragms.

Although FIGS. 27A-27B show each diaphragm assembly 384 as having a circumferential array of distance sensors 260, in a further example not shown, the vehicle 12 may include distance sensors 260 on only the forwardmost diaphragm assembly 384, and none of the remaining diaphragm assemblies 384 may have distance sensors 260. For such an arrangement, measurements of the local radial distance 268 by the distance sensors 260 on the forwardmost diaphragm assembly 384 may be used for adjusting the blade segment actuators 234 of all of the diaphragm assemblies 384 in the series. The one or more processors 280 may account for the different time delay between measuring the local radial distance 268 and actuating the blade segment actuators 234 on each diaphragm assembly 384.

One or more of the above-described examples of vacuum transport tube vehicles 12 may be implemented in a vacuum transport tube vehicle system 10. Similar to the arrangement shown in FIGS. 3A-16, the vacuum transport tube vehicle system 10 may include one or more of the above-described vacuum transport tube vehicles 12 for moving through the interior 32a of the vacuum transport tube 16 and evacuating air from the interior 32a of the vacuum transport tube 16 over a route length 36 of a vacuum transport tube route 38. As described above and shown in FIGS. 14A-14I, the vacuum transport tube vehicle system 10 may include a route end boundary assembly 170 positioned at each route end of a vacuum transport tube route 38. The route end boundary assembly 170 includes first and second route end pressure barriers which are respectively movable between open and closed pressure barrier positions 172a, 172b, 174a, 174b for forming an airlock 178 for the vacuum transport tube vehicle 12 at the route end. In addition, the route end boundary assembly 170 includes a flapper valve 176 between the first and second route end pressure barriers 172, 174. As described above, the flapper valve 176 is configured to open and close a portion of the interior 32a of the vacuum transport tube 16 to outside air or to a plenum as the vacuum transport tube vehicle 12 enters the airlock 178.

One or more of the vacuum transport tube vehicles 12 in the vacuum transport tube vehicle system 10 may have a blade-actuator assembly 211 as described above in relation to FIGS. 19A-27B. The blade-actuator assembly 211 includes a circumferential blade member 213 sealed to the piston head 54a, and has a plurality of blade segment actuators 234 arranged circumferentially around the piston perimeter portion 71 and coupled to the blade member 213 at a corresponding plurality of blade circumferential locations 216. As described above, The blade segment actuators 234 are configured to adjust the radial position of the blade member 213 at the corresponding blade circumferential locations 216 in a manner accommodating non-uniformities 272 in the inner surface 34a profile of the vacuum transport tube 16, and in a manner maintaining the annular gap 116 at a relatively short and substantially constant gap distance 118 during movement of the vacuum transport tube vehicle 12 through the vacuum transport tube 16. For example, as described above, the blade segment actuators 234 of one or more of the vacuum transport tube vehicles 12 may be configured to maintain the gap distance 118 within a range of 0.005 to 0.100 inch at each of the blade circumferential locations 216 during movement of the vacuum transport tube vehicle 12 through the vacuum transport tube 16. The vacuum transport tube vehicle system 10 may include any number of vacuum transport tube vehicles 12.

Referring now to FIG. 28, shown is a flow diagram of operations included in a method 400 of evacuating a vacuum transport tube 16. The method 400 includes step 402 of moving one or more vacuum transport tube vehicles 12 through an interior 32a of a vacuum transport tube 16. Step 402 may comprise moving from 2-10 vacuum transport tube vehicles 12 through the vacuum transport tube 16 until a vacuum of a desired pressure is obtained in the interior 32a of the vacuum transport tube 16. However, the method 400 may include moving any number of vehicles 12 through the vacuum transport tube 16, and is not limited to moving ten vehicles 12. As described above and shown in FIGS. 19A-27B, one or more of the vacuum transport tube vehicles 12 may have a blade-actuator assembly 211 having a circumferential blade member 213 defining a first end outer surface 58. In addition, the blade-actuator assembly 211 includes a plurality of blade segment actuators 234 arranged circumferentially around the piston perimeter portion 71 and coupled to the blade member 213 at a corresponding plurality of blade circumferential locations 216. As described above, an annular gap 116 (e.g., FIGS. 21E-22) is formed between the inner surface 34a of the vacuum transport tube 16 and the first end outer surface 58 as defined by the blade member 213

Step 402 of moving one or more vacuum transport tube vehicles 12 through the vacuum transport tube 16 comprise driving at least one vehicle 12 through the vacuum transport tube 16 using a drive assembly 100. As described above and shown in FIG. 2D, the drive assembly 100 may comprise a plurality of drive wheels 102 arranged in a circumferential arrangement around the body 70 for engaging the inner surface 34a of the vacuum transport tube 16. Alternatively, the drive assembly 100 may comprise a magnetic levitation (mag-lev) propulsion system 24 comprising a plurality of guide magnets 26 mounted to the vacuum transport tube 16, and a plurality of vehicle magnets 28 mounted to the body 70, and which cooperate to create both lift and substantially frictionless propulsion to move the vacuum transport tube vehicle 12 through the vacuum transport tube 16, as described above and shown in FIG. 2F.

Referring briefly to FIGS. 14A-14I, as described above, the method 400 may include moving one or more vehicles over a route length 36 of a vacuum transport tube route 38 having a route end boundary assembly 170 positioned at a route end as shown in FIGS. 14A-14B, and moving the vacuum transport tube vehicle 12 through a first route end pressure barrier in an open pressure barrier position while the second route end pressure barrier is in a closed pressure barrier position and the flapper valve 176 is in an open flapper valve position as shown in FIGS. 14F-14G for venting the interior 32a of the vacuum transport tube 16 to outside air or to a plenum. In addition, the method 400 may include moving the first route end pressure barrier to a closed pressure barrier position and moving the flapper valve 176 to a closed flapper valve position as shown in FIGS. 14G-14H.

Step 404 of the method 400 includes flowing air, through the annular gap 116 (e.g., FIG. 19A) during movement of the one or more vacuum transport tube vehicles 12 through the vacuum transport tube 16, from a forward space in front of each of each vehicle 12, to an aft space behind each vehicle 12, to create an aft pressure 50 in the aft space lower than a forward pressure 46 in the forward space. For examples of vacuum transport tube vehicles 12 having an orifice 84 as described above and shown in FIGS. 2E-2F, the method 400 may include flowing air through the orifice 84 in addition to flowing air through the annular gap 116. The step of flowing air through the orifice 84 may comprise adjusting the orifice diameter 92 for controlling the amount of air flowing through the orifice 84 as described above, and controlling the delta pressure 52 between the aft pressure 50 and the forward pressure 46 as a result of controlling the orifice diameter 92. The method 400 may additionally include adjusting the delta pressure 52 by controlling the velocity of the vacuum transport tube vehicle 12 through the vacuum transport tube 16, and/or controlling the power level required for driving the vacuum transport tube vehicle 12 through the vacuum transport tube 16, as described above.

Step 406 of the method 400 includes actively adjusting, using the plurality of blade segment actuators 234 of at least one vehicle during movement through the vacuum transport tube 16, a radial position of the blade member 213 at the corresponding blade circumferential locations 216 in a manner accommodating non-uniformities 272 in the inner surface 34a profile measured at a location forward of the blade segment actuators 234. In addition, step 406 includes maintaining the annular gap 116 at a substantially constant and relatively short gap distance 118. For example, as mentioned above, the method may include maintaining the gap distance 118 within a range of 0.005 to 0.100 inch at each of the blade circumferential locations 216 during movement of one or more vehicles 12 through the vacuum transport tube 16.

Step 406 of actively adjusting the radial position of the blade member 213 at the blade circumferential locations 216 of at least one vehicle 12 may include continuously measuring, using a plurality of circumferentially arranged distance sensors 260 mounted forward of the blade member 213, the local radial distance 268 respectively between the distance sensors 260 and the inner surface 34a of the vacuum transport tube 16 at locations axially aligned with the blade circumferential locations 216. For example, FIG. 19A shows a distance sensor 260 configured as a laser distance measuring device 262 emitting a laser beam 264 for measuring the distance between the laser distance measuring device 262 and the inner surface 34a of the vacuum transport tube 16. The method 400 additionally includes continuously generating sensor signals representative of measurements of the local radial distance 268 by the distance sensors 260, and continuously commanding, using at least one processor 280 (FIG. 19B), one or more of the blade segment actuators 234 to adjust the radial position of the blade member 213 at one or more corresponding blade circumferential locations 216 based on the sensor signals and an instantaneous velocity of the vacuum transport tube vehicle 12. The method 400 may additionally include maintaining the annular gap 116 at each blade circumferential location 216 at a constant gap distance 118 as a result of actively adjusting the radial position of the blade member 213 at one or more of the blade circumferential locations 216. For example, FIGS. 20A-20D illustrate the blade segment actuator 234 continuously adjusting the radial position of the blade member 213 at the blade circumferential location 216 in response to changing values of the local radial distance 268 measured by the distance sensor 260 as a result of non-uniformities 272 in the inner surface 34a profile during movement of the vacuum transport tube vehicle 12 within the vacuum transport tube 16.

Referring with the FIGS. 21B-21D, step 406 of actively adjusting the radial position of the blade member 213 may comprise actuating a plurality of discrete blade segments 218 circumferentially arranged in spaced relation to each other proximate the blade perimeter portion 214 and operatively coupled respectively to the plurality of blade segment actuators 234. As described above, the plurality of blade segment actuators 234 may be linear actuators 236 each having an axially extendable pushrod 238. In FIG. 21D, the blade segment actuators 234 may each may be directly coupled to one of the blade segments 218 and configured to adjust the radial position of the blade member 213 at the blade circumferential location 216 of the blade segment 218. Step 406 may additionally include sealing against air leakage between the blade member 213 and the piston head 54a using a seal portion 220 extending circumferentially between adjacent pairs of the blade segments 218, as shown in FIG. 21B. As described above, the blade member 213 may be flexible in the circumferential direction and may extend between and overlap the blade segments 218. In addition, as shown in FIG. 21E, the seal portion 220 extends radially between the piston head 54a and the blade segments 218 to thereby prevent air leakage between the piston head 54a and the blade member 213.

Referring to FIG. 22, the step of actuating the plurality of blade segments 218 may comprise pivoting, using a linear actuator 236, a lever arm 250 at each one of the blade circumferential locations 216. As described above, the pivoting end 252 of each lever arm 250 is pivotably coupled to the piston head 54a, and the terminal end 254 of each lever arm 250 is fixedly coupled to one of the blade segments 218. As described above, the seal portion 220 may over mold the lever arms 250, and may define the blade segment 218 at each one of the lever arms 250.

Referring to FIGS. 23-26, the method 400 may further comprise generating, using a plurality of force-balancing mechanisms 290 respectively coupled to the plurality of lever arms 250, a balancing force 294 configured to counteract the above-described piston head force 296 exerted on the seal forward side as a result of the forward pressure 46 in front of the vacuum transport tube vehicle 12 being higher than the aft pressure 50 behind the vacuum transport tube vehicle 12. In the example of FIGS. 23-26, the force-balancing mechanism 290 is configured as a coil spring 292 which may be sized to generate the balancing force 294 that is approximately equal in magnitude to the piston head force 296, such as the piston head force 296 generated when the vacuum transport tube vehicle 12 is in the constant pressure ratio regime, as described above.

Referring still to FIGS. 23-26, the method 400 may include actively adjusting the balancing force 294 generated by the force-balancing mechanisms 290 (e.g., coil springs 292) using an adjustment mechanism such as a dedicated secondary actuator 300 (e.g., a linear actuator) mounted to the piston head 54a proximate each one of the blade segment actuators 234 as shown in FIG. 23 and described above. In this regard, the method 400 may include actively adjusting, using the dedicated secondary actuators 300, the balancing force 294 as the delta pressure 52 changes over time during movement of the vacuum transport tube vehicle 12 through the vacuum transport tube 16. As an alternative to a plurality of dedicated secondary actuators 300, the step of actively adjusting the balancing force 294 may be performed by a common secondary actuator 300 located on the piston head 54*a*, as shown in FIG. 24 and described above.

In a still further alternative, the step of adjusting the balancing force 294 may be passively performed by a pressure membrane 308 incorporated into the piston head 54*a*, and coupled via cables 302 (FIG. 25) and/or bellcranks 304 (e.g., FIG. 24) to the coil spring 292 at each blade segment actuator 234, as shown in FIG. 25. As described above, such a pressure membrane 308 may be subjected to both the forward pressure 46 and the aft pressure 50 during movement of the vacuum transport tube vehicle 12 through the vacuum transport tube 16. Passive adjustment of the balancing force 294 may result from out-of-plane deflection of the pressure membrane 308 in response to changes in the delta pressure 52, as described above. In yet a further alternative, the step of adjusting the balancing force 294 may be performed by a servo-driven adjusting collar 314 rotatable on a jackscrew 312 for adjusting the magnitude of compression force exerted by a coil spring 292 integrated into each one of the blade segment actuators 234, as described above and shown in FIG. 26.

Step 408 of the method 400 includes evacuating air from the vacuum transport tube 16, and reducing pressure in the interior 32*a* of the vacuum transport tube 16 with one or more vehicle passes, until a vacuum of a desired pressure is obtained in the interior 32*a* of the vacuum transport tube 16. As described above, the evacuation of air from the vacuum transport tube 16 is the result of creating an aft pressure 50 in the aft space lower than the forward pressure 46 in the forward space during each vehicle passed through the vacuum transport tube 16. Referring briefly to FIGS. 27A-27B shown is the above-described vehicle 12 having two (2) diaphragm assemblies 384 in addition to the piston head 54*a* which also functions as a diaphragm assembly 384, as described above. The method 400 may comprise generating, using the diaphragm assemblies 384, an aft pressure 50 directly behind the diaphragm assembly 384 that is lower than the forward pressure 46 in front of the same diaphragm assembly 384. As a result of the delta pressure 52 on opposite sides of each diaphragm assembly 384, the method may include generating an aft pressure 50 behind the vacuum transport tube vehicle 12 that is lower than an aft pressure 50 behind a vacuum transport tube vehicle 12 lacking multiple diaphragm assemblies 384. As described above, the diaphragm assemblies 384 improve the efficiency with which the vacuum transport tube vehicle 12 generates a vacuum when moving through the vacuum transport tube 16.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation. Any claimed embodiment of the disclosure does not necessarily include all of the embodiments of the disclosure.

What is claimed is:

1. A vacuum transport tube vehicle for evacuating a vacuum transport tube, comprising:
a first end, a second end, and a body comprising a piston between the first end and the second end, the first end comprising a piston head having a piston perimeter portion;
a blade-actuator assembly, comprising:
a circumferential blade member sealed to the piston head and having a blade perimeter portion defining a first end outer surface, wherein an annular gap is formed between the first end outer surface and an inner surface of the vacuum transport tube when the vehicle is installed in an interior of the vacuum transport tube;
a plurality of blade segment actuators arranged circumferentially around the piston perimeter portion and coupled to the blade member at a corresponding plurality of blade circumferential locations, the blade segment actuators configured to actively adjust a radial position of the blade member at the corresponding blade circumferential locations in a manner accommodating non-uniformities in an inner surface profile, and maintaining the annular gap at a substantially constant and relatively short gap distance during movement of the vehicle through the vacuum transport tube; and
wherein movement of the vehicle through the vacuum transport tube creates an aft pressure behind the vehicle that is lower than a forward pressure in front of the vehicle to result in a vacuum of a desired pressure in the interior of the vacuum transport tube caused by one or more vehicle passes through the vacuum transport tube.

2. The vacuum transport tube vehicle of claim 1, further comprising:
a plurality of distance sensors circumferentially arranged and mounted forward of the blade member, and configured to continuously measure a local radial distance respectively between the distance sensors and the inner surface of the vacuum transport tube at locations axially aligned respectively with the blade circumferential locations, and continuously generate sensor signals representative of measurements of the local radial distance during movement of the vehicle within the vacuum transport tube; and
at least one processor configured to continuously receive the sensor signals from the distance sensors, and command the blade segment actuators, based on the sensor signals and an instantaneous velocity of the vehicle, to actively adjust the radial position of the blade member in a manner maintaining the annular gap at each blade circumferential location at the substantially constant and relatively short gap distance during movement of the vehicle.

3. The vacuum transport tube vehicle of claim 2, wherein at least some of the plurality of distance sensors are one of:
an optical distance measuring device, a laser distance measuring device, a light-emitting-diode distance measuring device, an interferometer distance measuring device, or an ultrasonic distance measuring device.

4. The vacuum transport tube vehicle of claim 1, wherein:
the plurality of blade segment actuators are configured to maintain the gap distance within a range of 0.005 to 0.100 inch at each of the blade circumferential locations during movement of the vehicle through the vacuum transport tube.

5. The vacuum transport tube vehicle of claim 1, wherein the blade member comprises:

a plurality of blade segments circumferentially arranged and coupled respectively to the plurality of blade segment actuators; and a seal portion extending circumferentially between the blade segments, and extending radially between the piston head and the blade segments in a manner preventing air leakage between the blade member and the piston head.

6. The vacuum transport tube vehicle of claim 5, wherein:
the plurality of blade segment actuators are linear actuators each having an axially extendable pushrod oriented in a radial direction, each pushrod directly coupled to one of the blade segments for adjusting the radial position of the blade member respectively at the blade circumferential location.

7. The vacuum transport tube vehicle of claim 5, further comprising a pivoting assembly, including:
a plurality of lever arms each having a pivoting end and a terminal end, the pivoting end pivotably coupled to the piston head, the terminal end fixedly coupled to one of the blade segments;
the plurality of blade segment actuators are linear actuators each having an axially movable pushrod oriented in a radial direction, each pushrod coupled to the lever arm at a location nearer the pivoting end than the terminal end; and
wherein axial movement of the pushrod of each linear actuator causes the respective lever arm to pivot about the pivoting end for adjusting the radial position of the blade member respectively at the blade circumferential location.

8. The vacuum transport tube vehicle of claim 7, wherein:
each one of the blade segment actuators is a piezo-electric actuator.

9. The vacuum transport tube vehicle of claim 7, further comprising:
a plurality of force-balancing mechanisms respectively coupled to the plurality of lever arms, and configured to collectively generate a balancing force counteracting a piston head force exerted on the seal portion and blade member as a result of the forward pressure in front of the vehicle being higher than the aft pressure behind the vehicle.

10. The vacuum transport tube vehicle of claim 7, wherein:
the seal portion encapsulates the plurality of lever arms and the blade segments in a manner preventing air leakage between the blade member and the piston head.

11. The vacuum transport tube vehicle of claim 1, further comprising:
at least one diaphragm assembly mounted in forward spaced relation to the piston head, the diaphragm assembly comprising:
a diaphragm plate having a plate perimeter portion;
a blade-actuator assembly coupled to the diaphragm plate; and
wherein the at least one diaphragm assembly creates an aft pressure directly behind the diaphragm plate that is lower than a forward pressure in front of the diaphragm plate, and resulting in an aft pressure behind the vehicle that is lower than an aft pressure behind a vehicle lacking the at least one diaphragm assembly.

12. The vacuum transport tube vehicle of claim 1, further comprising:
at least one orifice extending from a first inlet portion in the first end through to a second outlet portion in the second end;

the orifice having an orifice diameter that is adjustable for controlling an amount of air flowing through the orifice as a means for controlling a delta pressure between the aft pressure behind the vehicle and the forward pressure in front of the vehicle; and
the orifice diameter being adjustable based on at least one of a velocity of the vehicle and an amount of power required for driving the vehicle through the vacuum transport tube.

13. The vacuum transport tube vehicle of claim 1, further comprising a drive assembly comprising one of:
a plurality of drive wheels arranged in a circumferential arrangement around the body for engaging the inner surface of the vacuum transport tube and driving the vehicle through the vacuum transport tube;
a magnetic levitation (mag-lev) propulsion system comprising a plurality of guide magnets mounted to the vacuum transport tube, and a plurality of vehicle magnets mounted to the body, the guide magnets and the vehicle magnets cooperating to create both lift and substantially frictionless propulsion to move the vehicle through the vacuum transport tube.

14. A vacuum transport tube vehicle for evacuating a vacuum transport tube, comprising:
a first end, a second end, and a body disposed between the first end and the second end, the body comprising a piston having a piston head and a first end outer surface, wherein:
an annular gap is formed between the first end outer surface and an inner surface of the vacuum transport tube when the vehicle is installed in the vacuum transport tube;
the annular gap allowing air to flow therethrough when the vehicle moves through the vacuum transport tube, and a delta pressure is created between a forward pressure in front of the first end of the vehicle and an aft pressure behind the second end of the vehicle, such that the aft pressure is lower than the forward pressure;
a blade-actuator assembly, comprising:
a circumferential blade member sealed to the piston head and having a blade perimeter portion defining a first end outer surface;
a plurality of blade segment actuators arranged circumferentially around the piston perimeter portion and coupled to the blade member at a corresponding plurality of blade circumferential locations, the blade segment actuators configured to actively adjust a radial position of the blade member at the corresponding blade circumferential locations in a manner accommodating non-uniformities in an inner surface profile, and maintaining the annular gap at a substantially constant and relatively short gap distance during movement of the vehicle through the vacuum transport tube;
a drive assembly coupled to the body for driving the vehicle through the vacuum transport tube;
a power system coupled to the drive assembly for powering the drive assembly; and
wherein the vehicle is configured to create a vacuum with a desired pressure in an interior of the vacuum transport tube during one or more vehicle passes through the vacuum transport tube such that the pressure in the interior of the vacuum transport tube is reduced after each vehicle pass.

15. A vacuum transport tube vehicle system for evacuating a vacuum transport tube, comprising:

a vacuum transport tube having an inner surface and an interior;

one or more vacuum transport tube vehicles configured for moving through the interior of the vacuum transport tube and evacuating air from the interior of the vacuum transport tube over a route length of a vacuum transport tube route, each of the one or more vehicles comprising:

a first end, a second end, and a body comprising a piston between the first end and the second end, the first end comprising a piston head having a piston perimeter portion;

a blade-actuator assembly, comprising:

a circumferential blade member sealed to the piston head and having a blade perimeter portion defining a first end outer surface, wherein an annular gap is formed between the first end outer surface and an inner surface of the vacuum transport tube when the vehicle is installed in an interior of the vacuum transport tube;

a plurality of blade segment actuators arranged circumferentially around the piston perimeter portion and coupled to the blade member at a corresponding plurality of blade circumferential locations, the blade segment actuators configured to actively adjust a radial position of the blade member at the corresponding blade circumferential locations in a manner accommodating non-uniformities in an inner surface profile, and maintaining the annular gap at a substantially constant and relatively short gap distance during movement of the vehicle through the vacuum transport tube; and wherein the one or more vehicles are configured to create a vacuum of a desired pressure in the interior of the vacuum transport tube caused by one or more vehicle passes through the vacuum transport tube such that the pressure in the interior of the vacuum transport tube is reduced after each vehicle pass.

16. The vacuum transport tube vehicle system of claim 15, further comprising:

a route end boundary assembly positioned at a route end of the vacuum transport tube route, the route end boundary assembly comprising a first route end pressure barrier, a second route end pressure barrier, and a flapper valve;

the first and second route end pressure barrier are each movable between an open pressure barrier position and a closed pressure barrier position, and are configured to form an airlock for the vehicle at the route end; and the flapper valve being located between the first and second route end pressure barrier, and configured to open and close a portion of the interior of the vacuum transport tube to outside air or to a plenum as the vehicle enters the airlock defined by the first and second route end pressure barrier in the closed pressure barrier position.

17. The vacuum transport tube vehicle system of claim 15, wherein at least one of vehicles comprises:

a plurality of distance sensors circumferentially arranged and mounted forward of the blade member, and configured to continuously measure a local radial distance respectively between the distance sensors and the inner surface of the vacuum transport tube at locations axially aligned with the blade circumferential locations, and continuously generate sensor signals representative of measurements of the local radial distance during movement of the vehicle within the vacuum transport tube; and at least one processor configured to continuously receive the sensor signals from the distance sensors, and command the blade segment actuators, based on the sensor signals and an instantaneous velocity of the vehicle, to actively adjust the radial position of the blade member in a manner maintaining the annular gap at each blade circumferential location at the substantially constant and relatively short gap distance during movement of the vehicle.

18. The vacuum transport tube vehicle system of claim 15, wherein:

the plurality of blade segment actuators are configured to maintain the gap distance within a range of 0.005 to 0.100 inch at each of the blade circumferential locations during movement of the one or more vehicles through the vacuum transport tube.

19. The vacuum transport tube vehicle system of claim 15, wherein at least one of the one or more vacuum transport tube vehicles comprises:

at least one orifice extending from a first inlet portion in the first end through to a second outlet portion in the second end;

the orifice having an orifice diameter that is adjustable for controlling an amount of air flowing through the orifice as a means for controlling a delta pressure between an aft pressure behind the vehicle and a forward pressure in front of the vehicle; and the orifice diameter being adjustable based on at least one of a velocity of the vehicle and an amount of power required for driving the vehicle through the vacuum transport tube.

20. The vacuum transport tube vehicle system of claim 15, wherein:

the one or more vacuum transport tube vehicles comprise 2-10 vacuum transport tube vehicles, installed in series within the vacuum transport tube.

21. The vacuum transport tube vehicle system of claim 15, wherein at least one of the vehicles has a drive assembly comprising one of:

a plurality of drive wheels arranged in a circumferential arrangement around the body for engaging the inner surface of the vacuum transport tube and driving the vehicle through the vacuum transport tube;

a magnetic levitation (mag-lev) propulsion system comprising a plurality of guide magnets mounted to the vacuum transport tube, and a plurality of vehicle magnets mounted to the body, the guide magnets and the vehicle magnets cooperating to create both lift and substantially frictionless propulsion to move the vehicle through the vacuum transport tube.

22. A method of evacuating a vacuum transport tube, comprising the steps of:

moving one or more vacuum transport tube vehicles through an interior of the vacuum transport tube having an inner surface and an interior, at least one of the vehicles comprising:

a first end, a second end, and a body comprising a piston between the first end and the second end, the first end comprising a piston head having a piston perimeter portion;

a blade-actuator assembly, comprising:

a circumferential blade member sealed to the piston head and having a blade perimeter portion defining a first end outer surface, wherein an annular gap is formed between the first end outer surface and an inner surface of the vacuum transport tube;

a plurality of blade segment actuators arranged circumferentially around the piston perimeter portion and coupled to the blade member at a corresponding plurality of blade circumferential locations;

flowing air, through the annular gap of each vehicle during movement through the vacuum transport tube, from a forward space in front of each of each vehicle, to an aft space behind each vehicle, to create an aft pressure in the aft space lower than a forward pressure in the forward space;

actively adjusting, using the plurality of blade segment actuators of at least one vehicle during movement through the vacuum transport tube, a radial position of the blade member at the corresponding blade circumferential locations in a manner accommodating non-uniformities in an inner surface profile measured at a location forward of the blade segment actuators, and maintaining the annular gap at a substantially constant and relatively short gap distance; and evacuating air from the vacuum transport tube, and reducing pressure in the interior of the vacuum transport tube with one or more vehicle passes, until a vacuum of a desired pressure is obtained in the interior of the vacuum transport tube.

23. The method of claim 22, further comprising:

moving the one or more vehicles through the vacuum transport tube over a route length of a vacuum transport tube route having a route end boundary assembly positioned at a route end, the route end boundary assembly comprising a first route end pressure barrier, a second route end pressure barrier, and a flapper valve;

moving the vehicle through the first route end pressure barrier in an open pressure barrier position while the second route end pressure barrier is in a closed pressure barrier position and the flapper valve is in an open flapper valve position for venting the interior of the vacuum transport tube to outside air or to a plenum; and moving the first route end pressure barrier to a closed pressure barrier position and moving the flapper valve to a closed flapper valve position when the vehicle is located between the first and second route end pressure barrier.

24. The method of claim 22, wherein actively adjusting the radial position of the blade member at the blade circumferential locations of at least one vehicle during movement through the vacuum transport tube comprises:

continuously measuring, using a plurality of circumferentially arranged distance sensors mounted forward of the blade member, a local radial distance respectively between the distance sensors and the inner surface of the vacuum transport tube at locations axially aligned respectively with the blade circumferential locations;

continuously generating sensor signals representative of measurements of the local radial distance by the distance sensors;

continuously commanding, using a processor, one or more of the blade segment actuators to adjust the radial position of the blade member at one or more corresponding blade circumferential locations based on the sensor signals and an instantaneous velocity of the vehicle; and maintaining the annular gap at each blade circumferential location at the substantially constant and relatively short gap distance as a result of actively adjusting the radial position of the blade member at one or more of the blade circumferential locations.

25. The method of claim 22, wherein maintaining the annular gap at each blade circumferential location at the constant gap distance comprises:

maintaining the gap distance within a range of 0.005 to 0.100 inch at each of the blade circumferential locations during movement of the one or more vehicles through the vacuum transport tube.

26. The method of claim 22, wherein moving one or more vacuum transport tube vehicles through the vacuum transport tube comprises:

moving from 2-10 vehicles through the vacuum transport tube until a vacuum of a desired pressure is obtained in the interior of the vacuum transport tube.

27. The method of claim 22, wherein moving one or more vehicles through the vacuum transport tube comprises:

driving at least one vehicle through the vacuum transport tube using a drive assembly, comprising one of:

a plurality of drive wheels arranged in a circumferential arrangement around the body for engaging the inner surface of the vacuum transport tube and driving the vehicle through the vacuum transport tube; and a magnetic levitation (mag-lev) propulsion system comprising a plurality of guide magnets mounted to the vacuum transport tube, and a plurality of vehicle magnets mounted to the body, the guide magnets and the vehicle magnets cooperating to create both lift and substantially frictionless propulsion to move the vehicle through the vacuum transport tube.

* * * * *